United States Patent
Mohan et al.

(10) Patent No.: US 8,271,541 B2
(45) Date of Patent: Sep. 18, 2012

(54) METHOD AND APPARATUS FOR DEVELOPING COMPOSITE APPLICATIONS

(75) Inventors: Ramachandran P. Mohan, Cupertino, CA (US); Shariq Mansoor, Cupertino, CA (US)

(73) Assignee: Fusionops Corporation, Sunnyvale, CA (US)

( * ) Notice: Subject to any disclaimer, the term of this patent is extended or adjusted under 35 U.S.C. 154(b) by 417 days.

(21) Appl. No.: 11/530,115

(22) Filed: Sep. 8, 2006

(65) Prior Publication Data

US 2007/0016615 A1 Jan. 18, 2007

Related U.S. Application Data

(63) Continuation-in-part of application No. 10/815,545, filed on Mar. 31, 2004, now Pat. No. 7,530,050.

(51) Int. Cl.
G06F 7/00 (2006.01)
G06F 17/30 (2006.01)

(52) U.S. Cl. ........ 707/803; 707/804; 707/805; 707/807; 717/104; 717/106

(58) Field of Classification Search .......... 707/102, 707/104.1, 803, 790, 791, 797, 798, 802, 707/804, 805, 807; 717/104, 106
See application file for complete search history.

(56) References Cited

U.S. PATENT DOCUMENTS

| | | | |
|---|---|---|---|
| 4,315,315 A | | 2/1982 | Kossiakoff |
| 5,241,645 A | * | 8/1993 | Cimral et al. ............. 703/2 |
| 5,276,884 A | * | 1/1994 | Mohan et al. ............. 711/163 |
| 5,479,643 A | | 12/1995 | Bhaskar et al. |
| 5,479,646 A | | 12/1995 | Proebsting |
| 5,485,569 A | | 1/1996 | Goldman et al. |
| 5,495,567 A | * | 2/1996 | Iizawa et al. ............. 715/762 |
| 5,506,983 A | * | 4/1996 | Atkinson et al. ............. 707/1 |
| 5,724,556 A | * | 3/1998 | Souder et al. ............. 703/2 |
| 5,745,687 A | * | 4/1998 | Randell ............. 709/201 |
| 5,761,508 A | | 6/1998 | Okuno |
| 5,790,789 A | * | 8/1998 | Suarez ............. 709/202 |
| 5,878,407 A | * | 3/1999 | Olgac ............. 707/1 |
| 5,991,535 A | | 11/1999 | Fowlow et al. |
| 6,000,000 A | | 12/1999 | Hawkins et al. |
| 6,018,627 A | * | 1/2000 | Iyengar et al. ............. 717/103 |
| 6,023,580 A | | 2/2000 | Sifter |
| 6,163,317 A | * | 12/2000 | de Judicibus ............. 715/853 |
| 6,185,734 B1 | * | 2/2001 | Saboff et al. ............. 717/164 |
| 6,189,138 B1 | | 2/2001 | Fowlow et al. |
| 6,199,197 B1 | | 3/2001 | Engstrom et al. |

(Continued)

FOREIGN PATENT DOCUMENTS

WO   WO 02/082229 A2 * 10/2002

OTHER PUBLICATIONS

Griss, Martin L., et al., "Building Object-Oriented Instrument Kits", HPL-96-22, Hewlett-Packard Co., © 1996, pp. 1-17.*

(Continued)

Primary Examiner — Hares Jami

(57) ABSTRACT

The claimed subject matter provides a system and/or a method that facilitates creating a composite application. A model architecture component can model a business rule utilizing at least one node in a novel hierarchical structure. A run-time engine can automatically create a complex, long-running composite application based at least in part upon the hierarchical node structure such that representative process segments of the application are invoked by the business rule which, in turn, is invoked by internal, externally generated, asynchronous events.

17 Claims, 55 Drawing Sheets

U.S. PATENT DOCUMENTS

| | | | |
|---|---|---|---|
| 6,205,575 B1 | 3/2001 | Sherman et al. | |
| 6,223,345 B1* | 4/2001 | Jones et al. | 717/100 |
| 6,226,656 B1* | 5/2001 | Zawadzki et al. | 715/235 |
| 6,266,805 B1* | 7/2001 | Nwana et al. | 717/104 |
| 6,275,979 B1 | 8/2001 | Graser et al. | |
| 6,308,163 B1* | 10/2001 | Du et al. | 705/8 |
| 6,314,555 B1* | 11/2001 | Ndumu et al. | 717/101 |
| 6,336,217 B1 | 1/2002 | D'Anjou et al. | |
| 6,425,121 B1 | 7/2002 | Phillips | |
| 6,437,805 B1 | 8/2002 | Sojoodi et al. | |
| 6,505,343 B1 | 1/2003 | Menon et al. | |
| 6,507,856 B1* | 1/2003 | Chen et al. | 715/205 |
| 6,519,601 B1* | 2/2003 | Bosch | 707/100 |
| 6,553,361 B1* | 4/2003 | Compton et al. | 706/47 |
| 6,564,368 B1* | 5/2003 | Beckett et al. | 717/113 |
| 6,601,233 B1* | 7/2003 | Underwood | 717/102 |
| 6,601,234 B1 | 7/2003 | Bowman-Amuah | |
| 6,622,168 B1* | 9/2003 | Datta | 709/219 |
| 6,684,385 B1* | 1/2004 | Bailey et al. | 717/109 |
| 6,701,513 B1 | 3/2004 | Bailey | |
| 6,745,382 B1 | 6/2004 | Zothner | |
| 6,789,252 B1* | 9/2004 | Burke et al. | 717/100 |
| 6,801,227 B2* | 10/2004 | Bocionek et al. | 715/777 |
| 6,810,401 B1* | 10/2004 | Thompson et al. | 707/101 |
| 6,823,522 B1* | 11/2004 | Lamb | 719/316 |
| 6,826,727 B1* | 11/2004 | Mohr et al. | 715/235 |
| 6,862,573 B2* | 3/2005 | Kendall et al. | 705/7 |
| 6,963,847 B1 | 11/2005 | Kennedy et al. | |
| 6,986,145 B2* | 1/2006 | Gangopadhyay | 719/316 |
| 7,003,526 B1* | 2/2006 | Lee et al. | 707/687 |
| 7,039,875 B2* | 5/2006 | Khalfay et al. | 715/762 |
| 7,082,599 B1 | 7/2006 | Morganelli et al. | |
| 7,103,605 B1 | 9/2006 | Hazi et al. | |
| 7,197,740 B2* | 3/2007 | Beringer et al. | 717/108 |
| 7,249,044 B2 | 7/2007 | Kumar et al. | |
| 7,454,750 B2* | 11/2008 | Fitts et al. | 718/100 |
| 7,523,191 B1* | 4/2009 | Thomas et al. | 709/224 |
| 7,587,669 B2* | 9/2009 | Rana | 715/242 |
| 7,774,791 B1* | 8/2010 | Appelbaum et al. | 719/318 |
| 7,836,103 B2* | 11/2010 | Li et al. | 707/809 |
| 2001/0052112 A1* | 12/2001 | Mohan et al. | 717/1 |
| 2002/0123984 A1* | 9/2002 | Prakash | 707/1 |
| 2002/0156814 A1* | 10/2002 | Ho | 707/514 |
| 2002/0198876 A1* | 12/2002 | Zielinski et al. | 707/4 |
| 2003/0004836 A1* | 1/2003 | Otter et al. | 705/27 |
| 2003/0110472 A1* | 6/2003 | Alloing et al. | 717/122 |
| 2004/0070617 A1* | 4/2004 | Sippl et al. | 345/764 |
| 2004/0128618 A1* | 7/2004 | Datta | 715/513 |
| 2004/0133855 A1* | 7/2004 | Blair et al. | 715/517 |
| 2004/0187140 A1* | 9/2004 | Aigner et al. | 719/328 |
| 2004/0205630 A1* | 10/2004 | Parks et al. | 715/526 |
| 2004/0210445 A1* | 10/2004 | Veronese et al. | 705/1 |
| 2005/0005262 A1* | 1/2005 | Mohan et al. | 717/109 |
| 2005/0065936 A1* | 3/2005 | Goering | 707/100 |
| 2007/0179827 A1* | 8/2007 | Gupta et al. | 705/8 |

OTHER PUBLICATIONS

Herbst, H., "Business Rules in Systems Analysis: A Meta-Model and Repository System", Information Systems, vol. 21, No. 2, © 1966, pp. 147-166.*

Shan, Ming-Chien, et al., "HP Workflow Research: Past, Present and Future", HPL-97-105, Hewlett-Packard Co., © 1997, pp. 1-15.*

Ashish, Naveen, et al., "Semi-Automatic Wrapper Generation for Internet Information Sources", COOPIS '97, Jun. 24-27, 1997, pp. 160-169.*

Herzner, Wolfgang, et al., "CDAM—Compound Document Access and Management: An Object Oriented Approach", ACM SIGOIS Bulletin, vol. 12, Issue 1, Jul. 1991, pp. 1-18.*

Huang, H., et al., "Business Rule Extraction from Legacy Code", COMPSAC '96, Aug. 21-23, 1996, pp. 162-167.*

Vanderdonckt, Jean M., et al., "Encapsulating Knowledge for Intelligent Automatic Interaction Objects Selection", INTERCHI '93, Apr. 24-29, 1993, pp. 424-429.*

Szekely, Pedro, "Template-Based Mapping of Application Data to Interactive Displays", Proc. of the 3rd Annual ACM SIGGRAPH Symposium on User Interface Software and Technology, Snowbird, UT, © 1990, pp. 1-9.*

Preiss, Bruno R., Data Structures and Algorithms with Object-Oriented Design Patterns in C++, John Wiley & Sons, © 1997, pp. 1-12.*

Nunn, Ian, et al., "Automated Assembly of Software Components Based on XML-Coded Instructions", SAC 2002, Madrid, Spain, © 2002, pp. 937-942.*

"Depth-First Search", wikipedia, downloaded from: en.wikipedia.org/wiki/Depth-first_search on Sep. 9, 2010, pp. 1-5.*

Bickmore, Timothy, et al., "Web Page Filtering and Re-Authoring for Mobile Users", The Computer Journal, vol. 42, No. 6, © 1999, pp. 534-546.*

Buyukkokten, Orkut, et al., "Accordion Summarization for End-Game Browsing on PDAs and Cellular Phones", SIGCHI '01, Seattle, WA, Mar. 31-Apr. 4, 2001, pp. 213-220.*

Hwang, Yonghyun, et al., "Structure-Aware Web Transcoding for Mobile Devices", IEEE Internet Computing, Sep. / Oct. 2003, pp. 14-21.*

Wood, Lauren, "Programming the Web: The W3C DOM Specification", IEEE Internet Computing, Jan. / Feb. 1999, pp. 48-54.*

Le, Daniel X., et al., "Automated Document Labeling for Web-Based Online Medical Journals", © 2003, pp. 1-5.*

Eidson, Thomas M., "A Component-Based Programming Model for Composite, Distributed Applications", ICASE Report No. 2001-15, NASA/CR-2001-210873, NASA Langley Research Center, Hampton, VA, May 2001, 14 pages.*

Ito, Kimihito, et al., "A Visual Environment for Dynamic Web Application Composition", HT '03, Nottingham, UK, Aug. 26-30, 2003, pp. 184-193.*

Truyen, Eddy, et al., "Customization of Component-based Object Request Brokers Through Dynamic Reconfiguration", IEEE Proc. of Tools Europe 2000, IEEE, © 2000, pp. 181-194.*

Eidson, Thomas, et al., "Applying Aspect-Orient Programming Concepts to a Component-based Programming Model", IPDPS 2003, IEEE Computer Society, Apr. 22-26, 2003, 7 pages.*

Mayer, Anthony, et al., "ICENI Dataflow and Workflow: Composition and Scheduling in Space and Time", UK e-Science All Hands Meeting, IOP Publishing Ltd., © 2003, pp. 627-634.*

Burnett, et al. Visual Object Oriented Programming Concepts and Environments, 1995.

Softwire Graphical Programming for Visual Basic, 2000, SoftWIRE version 2.0, pp. 1-40.

Template Software, Workflow Template Process Template, Developing a WFT Workflow System, Chapters 1-4, and 8-9 and Index.

Thayer. Visual Basic Unleashed, Sep. 11, 1998, pp. 7-74, 213-255, 269-278, 427-556, 606-612, 689-736, 781-791, 890-913.

OA dated Nov. 2, 2007 for U.S. Appl. No. 10/815,545, 15 pages.

OA dated Mar. 20, 2008 for U.S. Appl. No. 10/815,545, 15 pages.

OA dated Jun. 6, 2007 for U.S. Appl. No. 10/815,545, 14 pages.

\* cited by examiner

Sample Business Process

Node Example Details - Links and User Interface Specifications

Reusable Process Definitions

Node Conditional Logic

Sample Application Screen Shots

 The process node represents a complete process and contains global variables for the process

 The display node represents the logic to display titles, screen descriptions and display objects such as radio buttons, pull-down menus, checkboxes etc. The individual display objects may have a wide range of animated behaviors and may accept input that is stored in global variables.

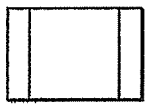 The purchase node represents the placing of a certain number of specific items for purchase on a shopping cart paradigm for later checkout. e.g., place a 4X CD-ROM, associated documentation and a software driver in the shopping cart

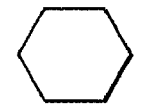 The interface node represents the interaction with external applications using a pre-defined interface known as an API (application programming interface) e.g., issue a call to a relational database requesting records that match a certain criteria

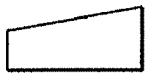 The computation node represents the computation of a variable using a formula e.g., $A = B*3 + 4*D**2/5.4$

 Links represent the conditions under which a subsequent node will be executed e.g., $A < 5$ AND $B > C$ Node Types and Links

FIG. 7

Display Node

Display Components

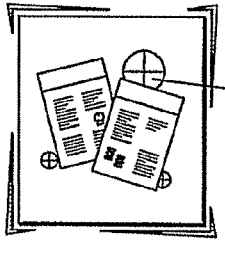
Templates provide a means to define an overall look & feel for a specific screen display
Templates may be associated with a website (lowest priority) or a specific process or with a specific display node (highest priority)
The highest priority template is the one selected
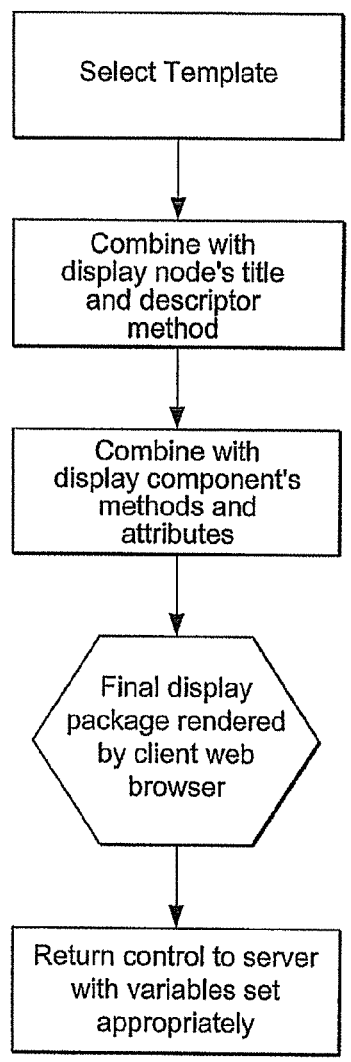
Dynamic display creation process
FIG. 10

Template-enabled browser device independence

Template-enabled personalization of broswer user interface

Overlapped Business Process Design and Website Design Methodology

Information and Control Flow

Opening Process Builder Screen

Category Properties

New Process Node

Checking Out A Process

Process Node Properties

List of Variable Types
FIG. 20

Naming Variables
FIG. 21

User Interface Block Node Properties

Component Definition Box, General Tab

Variable Definition Box, User Interface Block Node

Component Definition Box, Properties Tab

Selecting a User Interface Node

| Interaction Node Properties - 460117 | |
|---|---|
| General \| Properties | |
| Property | Value |
| backbuttoncaption | |
| backbuttonimage | |
| backbuttonvisible | false |
| bgcolor | |
| caption | |
| captionbgcolor | |
| captioncolor | |
| debug | |
| description | |
| email | |
| enabled | |
| fontcolor | |
| fontface | |
| fontsize | |
| fontstyle | |
| fontweight | |
| keephistory | |
| nextbuttoncaption | |
| nextbuttonimage | |
| nextbuttonvisible | |
| requiredfieldindicator | |
| resetbuttonvisible | |
| template | MSTemplate |
| title | |

✓ Ok    ✗ Cancel

Interaction Node's Properties

FIG. 30

Process Node Menu, Save Process

Login Process URL, Basic Fields

Task Node Properties

Step Definition Box

Selecting a Step Function

Database Variable Interface Options

Database Variables, Mapping Parameters

Decision Node

Decision Node's Properties Dialog Box

Decision Node Wizard Box

DBList's Properties Dialog Box

Data Node

| Wizard Name | Description |
|---|---|
| Script | Write Customer java Code |
| Assign Variable | Assign Variable |
| DB List | Operations on DB List |
| Node Properties | Set Node Properties |
| Node Component Properties | Set Node Component Properties |
| XML | XML |
| Variable Functions | |
| DB Record | Operations on DB Record |
| Assign Expression | Assign Expression |

Wizard Box

Node Components Properties Dialog Box

Do While Loop Node's Properties Dialog Box

Do While Loop Node Wizard Box

DBList's Properties Dialog Box

Login Process URL, Basic Fields

_US 8,271,541 B2_

METHOD AND APPARATUS FOR DEVELOPING COMPOSITE APPLICATIONS

CROSS REFERENCE TO RELATED APPLICATION(S)

This application is a continuation-in-part of and claims the benefit of U.S. patent application Ser. No. 10/815,545 filed on Mar. 31, 2004, entitled "METHOD AND APPARATUS FOR DEVELOPING SOFTWARE," which has issued as U.S. Pat. No. 7,530,050, the entirety of which is incorporated herein by reference.

BACKGROUND

The Internet has become a major channel for companies to conduct business. A wide range of business transactions including business to business, business to consumers, auctions, reverse auctions and vertical networks of businesses have driven growth.

The unique aspects of this digital connectivity has spurred new forms of commerce transactions, eliminated geographic and time zone constraints, placed suppliers and customers in direct contact and essentially transformed the landscape of commerce. The speed of this transformation and the radical impact this has had on company fortunes has pushed businesses to rapidly reorganize and re-engineer themselves, internally and externally with customers/suppliers. This, in turn, has placed new requirements on IT departments.

Incorporating the web as a legitimate business channel has been a real struggle for most companies. Businesses have had to balance the pressures to 'get on the net' quickly against a long list of issues, including: determining what part of the company should get on the net first, evaluating how this should happen, developing an overall strategy for getting the entire company on the net, designing websites, connecting to internal computer applications, collaborating internally and externally, training to eliminate significant ignorance of web technology and what the emerging business models really mean, and marketing with regard to brand implications.

The complexities of defining what and how business will be conducted at the company website along with the intricacies of implementing the website and the myriad connections to internal applications has made the entire application extremely difficult to manage.

A typical website implementation team consists of a few business domain experts but is largely dominated by web designers, content developers, database architects, middleware and other IT specialists. Given the large Web and IT focus on a typical e-commerce project, there is reduced emphasis on a clear definition of the business requirements that must be implemented, disconnects between what the website implements and the required business requirements and most importantly, the inability of the website to respond quickly to business changes. This has resulted in companies continuously changing business applications to accommodate changing external requirements and frustrated customers who do not understand the underlying business application and the critical connection between how the site must be used to get results.

There is a need for an efficient method for implementing web and other user interfaces based on clearly defined business rules and enable business objectives and business application capabilities to drive web and other user interface implementation. There is another need for a method and apparatus creating and updating software that eliminates the need for complex technical programming and maintenance.

There is a further need for a method and apparatus for creating software that enables complex business rules easily.

SUMMARY

An object of the present invention is to provide an improved method and apparatus for creating software.

Another object of the present invention is to provide a method and apparatus for creating software in order to implement websites based on pre-defined business rules enabling business objectives and to enable business application capabilities to drive website implementation.

Yet another object of the present invention is to provide a method and apparatus for creating software that eliminates the need for complex technical programming and maintenance for websites.

A further object of the present invention is to provide a method and apparatus for creating software that is based on complex business rules defined with a simple set of constructs.

A further object of the present invention is to provide a method and apparatus for creating software for implementing a website that separates the business application and rules design from the graphic design/look & feel design of the website.

Another object of the present invention is to provide a method and apparatus for creating software that implements websites by separating the execution of business rules on a server from the rendering of the user interface on client machines.

A further object of the present invention is to provide a method and apparatus for creating software that combines dynamically created content with a template module to create customized look and feel based on personalization and other considerations.

Another object of the present invention is to provide a method and apparatus for creating software that combines dynamically created content with a template module to enable a physical media independent web device driver.

Yet another object of the present invention is to provide a method and apparatus for creating software that separates nodes and links both at a conceptual level and as permanently stored objects.

Another object of the present invention is to provide a method and apparatus for creating software using selected node layouts that represent a plurality of application logics.

Yet another object of the present invention is to provide a method and apparatus for creating software that uses a user interaction which is executable on multiple channels.

A further object of the present invention is to provide a method and apparatus for creating software with a user interface that includes GUI components and a template for the physical layout of static and dynamic portions of a user display.

Another object of the present invention is to provide a method and apparatus for creating software using nodes that are visual representations of software functions.

Yet another object of the present invention is to provide a method and apparatus for creating software by creating application logic that is directly executed without compilation of the application logic.

These and other objects are achieved in a method for creating software. A plurality of nodes and a directory of applications are provided. Each application is created by use of at least a portion of the plurality of the nodes. At least a portion of the plurality of nodes are selected to create a selected node layout that represent a plurality of application logics. The selected node layout is executed by a server program.

In another embodiment, a method for creating software provides a plurality of nodes and a directory of applications. Each application is created by use of at least a portion of the plurality of the nodes. At least a portion of the plurality of nodes are selected to create a selected node layout that represent a plurality of application logics. The application logic is defined by selecting at least one of GUI parameters and options in each selected node. The selected node layout is executed by a server program.

In another embodiment of the present invention, a method for creating software provides a plurality of nodes and a directory of applications. Each application is created by use of at least a portion of the plurality of the nodes. At least a portion of the plurality of nodes are selected to create a selected node layout that represent a plurality of application logics. External application interfaces are defined. The selected node layout is then executed by a server program.

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate automatically generating a composite application controlled by a business rule utilizing a hierarchically structured architecture to optimize process flow. A model architecture component can represent a business rule with at least one node structure, wherein the node structure can formulate the business rule and ensure a separation of aesthetics and functionalities associated with a composite application. Based on the node structure that corresponds to the business rule, a dynamic engine can process such structure in order to automatically create the composite application such that a process workflow of the composite application can be dictated by the business rule node representation.

Moreover, the model architecture component can provide the clustering of nodes to formulate the business rule while providing a visual layout of the workflow and/or composite application. In addition, a plurality of processes, including one or more nodes, can be strung together in order to automatically create a complex and/or composite application, wherein the composite application can be, for instance, a long-running business application, a web page, a document, an electronic mail message, an electronic document, a hypertext markup language (HTML) document, a complex interactive web site, etc.

In accordance with one aspect of the claimed subject matter, the model architecture component can utilize a depth-first execution (DFE) approach that allows a complex process and/or a user interface to be generated in real-time without custom programming. Furthermore, the dynamic engine can utilize proprietary algorithms for code generation, user interface creation, and process execution to facilitate eliminating the need for custom programming in creating composite applications and/or complex applications. The model architecture component and/or the dynamic engine can provide flexibility of function and orchestration of processes utilizing a pre-defined business rule.

In accordance with another aspect of the claimed subject matter, the model architecture component can utilize a business rule (BR) component that can separate composite application functionality from any other data. In particular, the BR component can implement node association to correspond to a portion of a business rule. The model architecture component can also utilize an aesthetics component that can separate an aesthetic feature data from any other data. In general, the BR component and the aesthetics component can distinctly separate aesthetic data and business rule and/or functionality data. Thus, a particular functionality can be employed, yet such aesthetic features are not intertwined and/or co-mingled so as to provide extreme flexibility in selecting the appearance of the composite application. In other aspects of the claimed subject matter, methods are provided that facilitate employing a dynamic complex application accessible via a plurality of devices based on a business rule represented by a collection of node structures.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF DRAWINGS

FIG. 7 illustrates the mapping of node and template elements to the physical website display.

FIG. 10 illustrates one embodiment of a layout of a template and the application for website screen display generation of the present invention.

FIG. 20 is a screen shot illustrating variable attribute definitions

FIG. 21 is a screen shot that specifies the name of a variable.

FIG. 30 is a screen shot illustrating an interaction node properties.

DETAILED DESCRIPTION OF INVENTION

Figure 1:
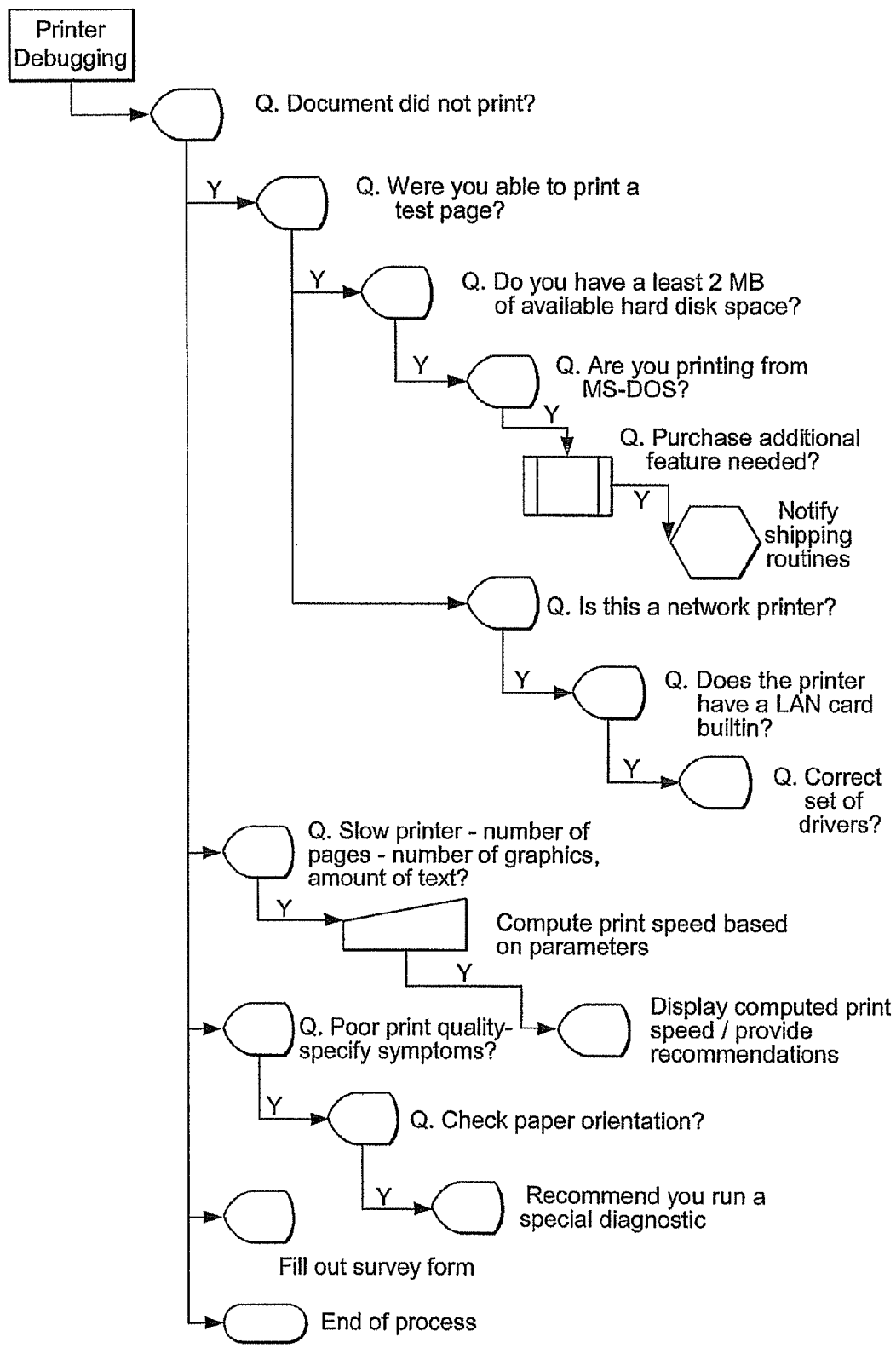
FIG. 1 is a flow chart illustrating one embodiment of the present invention using a solution engine that executes business application/rules defined in a knowledge base specified by analyst/online agents using a visual design tool.

One embodiment of the present invention is a method for creating software with a plurality of nodes and a directory of applications. Each application is created by use of at least a portion of the plurality of the nodes. At least a portion of the plurality of nodes are selected to create a selected node layout that represent a plurality of application logics.

The application logic is automatically validated against errors by validating each node in the selected layout against a pre-defined set of parameters and values. At least a portion of the plurality of the nodes are aggregated to create an aggregated node which represents an application logic. Created aggregated nodes can be reused as part of other application logics by making it a child of another node in the selected layout.

The selected node layout is executed by a server program.

The application logic is directly executed without compilation of application logic. Each node in the selected node layout is stored in the database along with all the selected parameters and parent child relationships. Once the selected node layout is stored in the server database, the server program extracts the selected node layout from the database and executes a single node at a time. At least a portion of the application logic includes a user interaction. The user interaction permits a user to interact with the server program and is executable on multiple channels including but not limited to web, voice, e-mail and wireless channels. The user interface provides a way for the server program to display information to the end-user and to allow the end-user to respond or direct the execution of the server program.

Each node is a visual representation of a software function and includes inputs to a software function. The plurality of nodes includes a variety of different nodes including but not limited to the following: application node, user interface node, interaction node, data node, task node, decision node, while loop node, do while loop node, transaction node, rollback node, asynchronous node and wait node. The application node is the root node and is used to define the global properties of the application, including but not limited to variables and constants. The application assigns a sequence of nodes and actions for a specific purpose.

Individual node execution measurements include usage counts, total execution time, average execution time and the like. A descriptive view provides details of the functional use of the selected layout. A history of different versions of the application logic is provided. Access control to the application logic permits a single access by only one user at a time for purposes of modification and multiple access for purposes of viewing.

The user interface node preferably has GUI components and a template for the physical layout of static and dynamic portions of a user display. Templates are HTML files that determine how the information identified in the User Interface, User Interface Block, and Interaction nodes is displayed. Templates provide the look and feel of user interaction.

Templates and template components are applied in the Interaction node and User Interface Block node components, respectively. A user can apply a template to the Interaction node by assigning a template name as a value for the Template property. If the user does not assign a value to the Template property, the default template will be applied.

Dynamic portions of the user display are used by the server program at run-time to layout application specific GUI components. At run-time the server program loads the defined template, dynamically generates the GUI component definitions and populates the dynamic portion of the template.

The user interface node, user interaction block and interaction node create a screen that is viewable by the user. The user interface block node is the child of user interface node and is used to create GUI components such as text or text boxes. The interaction node is used to display information to, receive information from, and send information to the user. It is also used to create an interaction using one or more user interface nodes.

The data node manipulates the data throughout the entire selected node layout, including but not limited to performing functions, tasks, evaluating expressions, assigning values to variables, embedding Java and the like. The task node interfaces with external systems or other applications based on predefined interface manager definitions. The decision node creates a condition or business rule within the user's application. The condition or business rule must be true or false in order for the application to move to the appropriate next step. If the condition or business rule is true, the application proceeds along "Path A" and along "Path B" when it is false. A loop is created by the while loop within the application as long as a certain condition remains true.

The while loop node checks the condition before beginning the loop. The do while loop is another node that creates a continuous loop within the selected node layout as long as a certain condition remains true. The do while loop is similar to the while loop except that it checks the condition after the first loop has been executed. The transaction node is used to mark the beginning of a transaction. Any children of the transaction node are included in the transaction. The transaction is rolled back if either a rollback node is encountered or any error occurs. The Rollback node is used for an explicit roll back of the transaction node and is a descendent of a transaction node. The asynchronous node is used to conduct a parallel execution of the child branch. The wait node is the parent node of the asynchronous node and waits until a specific condition is met or all child asynchronous nodes are done applicationing. Then, the rest of the application continues.

A node palette contains the user Interface, user interface block, interaction, data, task, decision, while loop, do while loop, transaction, rollback, asynchronous and wait nodes. The Application Diagram is the workspace for building applications. Nodes are added to the application by clicking and dragging the node type from the node Palette onto the application diagram. Properties for each node as needed by right-clicking on the node and entering information in properties dialog boxes. The application is then saved, tested and implemented.

Software programs that are created are organized in a hierarchical structure. A node palette lists the node types available for building the software application. Nodes are the building blocks for a application. Software developers use a application diagram as a workspace. Nodes are used to build applications. To create software, specific tasks that each node is to accomplish are defined and their sequence is established. Node properties include, (i) variables to store data with constant values, calculated values, or interactive result values, (ii) components that are defined within the user interface block node and used to present and collect information between the application and the user, (iii) expressions that define the values to be stored in the variables, including operators such as math functions, Boolean operators, date/time functions, and the like.

The look and feel of the user interface is created with the use of the user interface, user interface block and the interaction nodes. These nodes are used create the blank form, add information to that form, and then display the information to, and receive the information from, the software developer. These nodes define how the information is seen by the software developer. Templates are visual renditions of a user Interface node and can be designed in an external system.

The method and apparatus of the present invention can be used for defining a business application and associated business rules along with a corresponding user interface to generate a fully functional and scaleable website. Business rules are defined and a user interface created to deliver services, products and information over the Internet.

An operational website is created that implements these rules for use by website users using web browsers on client machines.

The business rules and the user interface elements are defined using a visual definition tool on a server machine. The business rules define all the services provided at the software consisting of business application elements such as global variables applicationing elements, conditional elements and flow of control rules. The user interface elements and the methods to manifest these elements are kept separate-enabling enforcement of corporate look & feel standards, industry elements, frame-specific functions, personalization and device independence. The server system stores the business rules and the user interface elements in a repository and uses this to generate a website.

As customers and other users request services from this website, the server system uses the pre-defined business rules to analyze the customer's request, execute the corresponding business rule—which may consist of checking the user request/input with a backend system, performing some calculations and based on the result perform a wide range of actions from simply serving up a specific user interaction or interfacing with an external application to exchange information and respond to the customer request. All of the interaction with the customer is performed using the user interface elements defined. These interface elements consist of a standard look and feel elements and also a set of user-definable display objects. Customers can define an attractive, engaging interface that is also powerful.

FIG. 1 provides an overview of the components of a complete website consisting of web servers connected on one side to the end-users via the Internet and on the other side to a backend complex comprising functional servers, interface routines and analyst/management tools. Specialized routines on the web servers interface with the solution engine using networked objects to track, control and manage user sessions. The solution engine, in turn, interfaces with specialized engines such as the observation, personalization and pricing engine as directed by specific nodes. A pool of standard interface routines is provided to allow the specialized engines and analyst/management tools to access databases, external applications and service providers.

Figure 2:
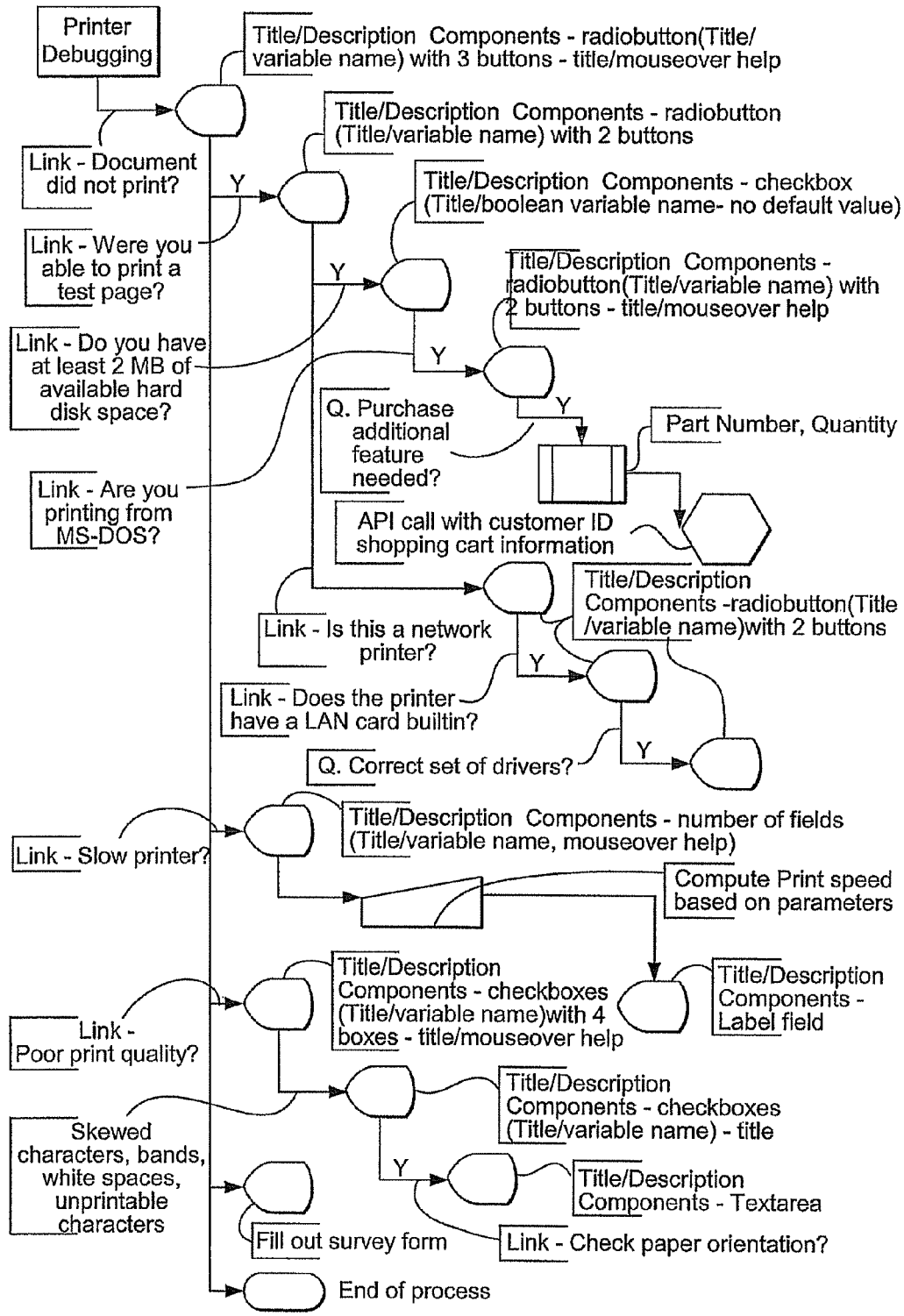
FIG. 2 is a flow chart illustrating a specific business application that can be used with the present invention, and depicts the steps in diagnosing and recommending a work-around/solution for problems associated with a printer connected to a personal computer.

A representative business application is described in FIG. 2. In this instance, the sequence of steps describing the service application for a customer having a problem with a printer is shown and is typically what company service representatives would use. Key paths that are followed include, (i) functional checks, did the document print?, performance checks, is the printer printing slowly and (iii) quality checks, is the print quality poor.

In the functional track, the questions 'were you able to print a test page'; 'do you have at least 2 MB of available hard disk space' focus on a missing piece of software that is downloaded/shipped once this is confirmed. A second path of diagnostic questions 'is this a network printer'; 'does the printer have a built-in LAN card' is asked to identify an incorrect set of installed drivers. The next diagnostic path focuses on potential performance problems 'is your printer printing slowly' and verifies performance parameters to check against benchmarks and based on any identified anomalies recommends a course of action. The final diagnostic path focuses on quality-related issues 'is your print quality poor' and recommends some steps based on the specific quality issues identified. For each of these diagnostic paths, escalation to a specialist is recommended if any of the diagnostic questions results in a negative response.

In one embodiment of the present invention, a visual design tool is used to layout the business application described in FIG. 2 along with additional information describing display elements, including but not limited to text, graphics and the like, used to interact with the end customer on a web browser. This is more fully shown in FIG. 3. These display elements can be specified directly or sketched out in a web page design tool and imported. Each of the nodes is connected to another via a link node that specifies a set of conditions that must be tested before a path is traversed.

Figure 3:
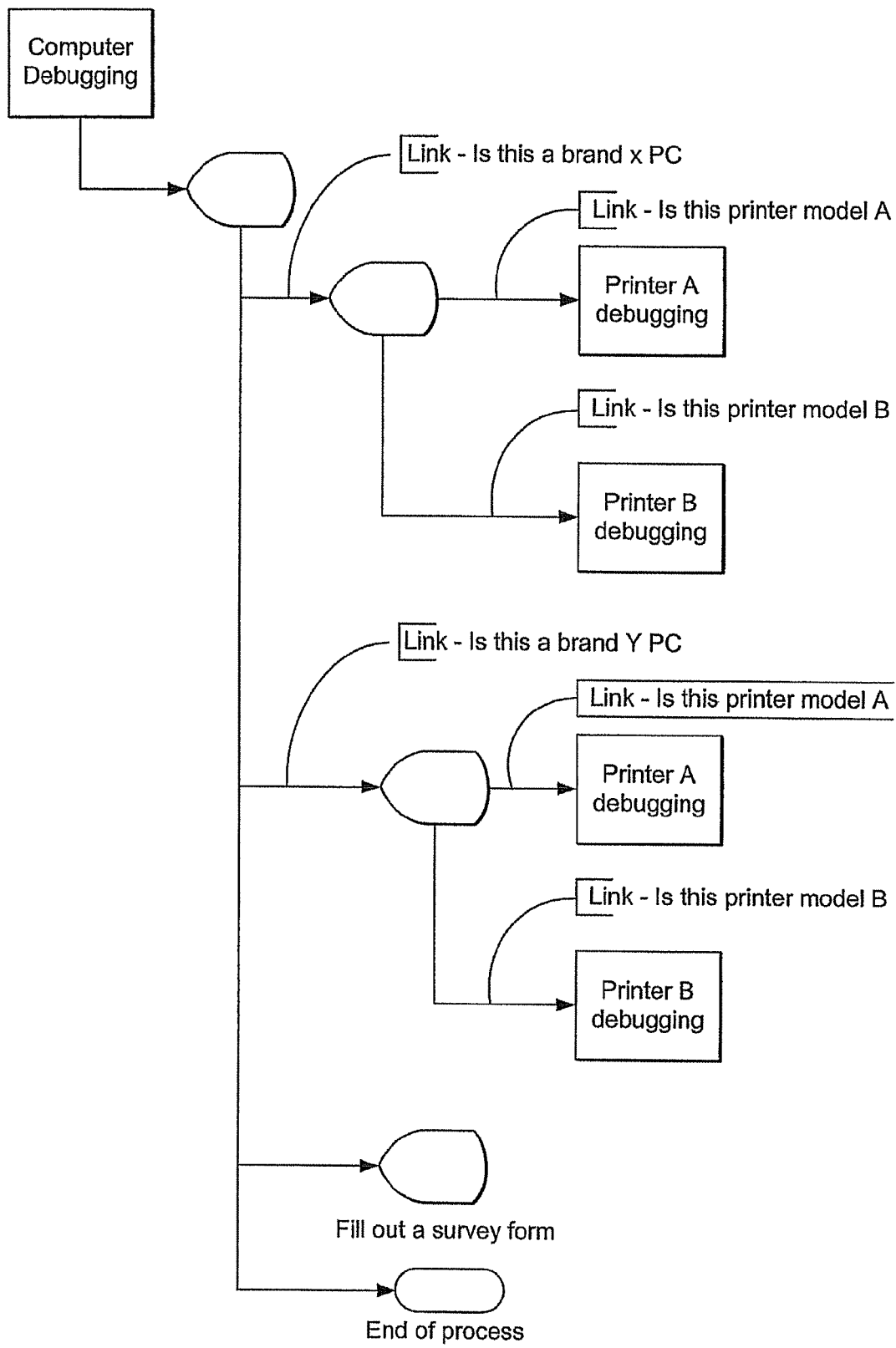
FIG. 3 is a flow chart that illustrates elements used to represent a business application and business rules—nodes and links used by the present invention.

Mapping between the business application is illustrated in FIG. 2. The website specification of FIG. 3 is almost identical except for the additional display content specific information. The application, rules and display content are stored in a knowledge base. At this point the website is fully operational and ready to application any requests relevant to this application.

Figure 4:
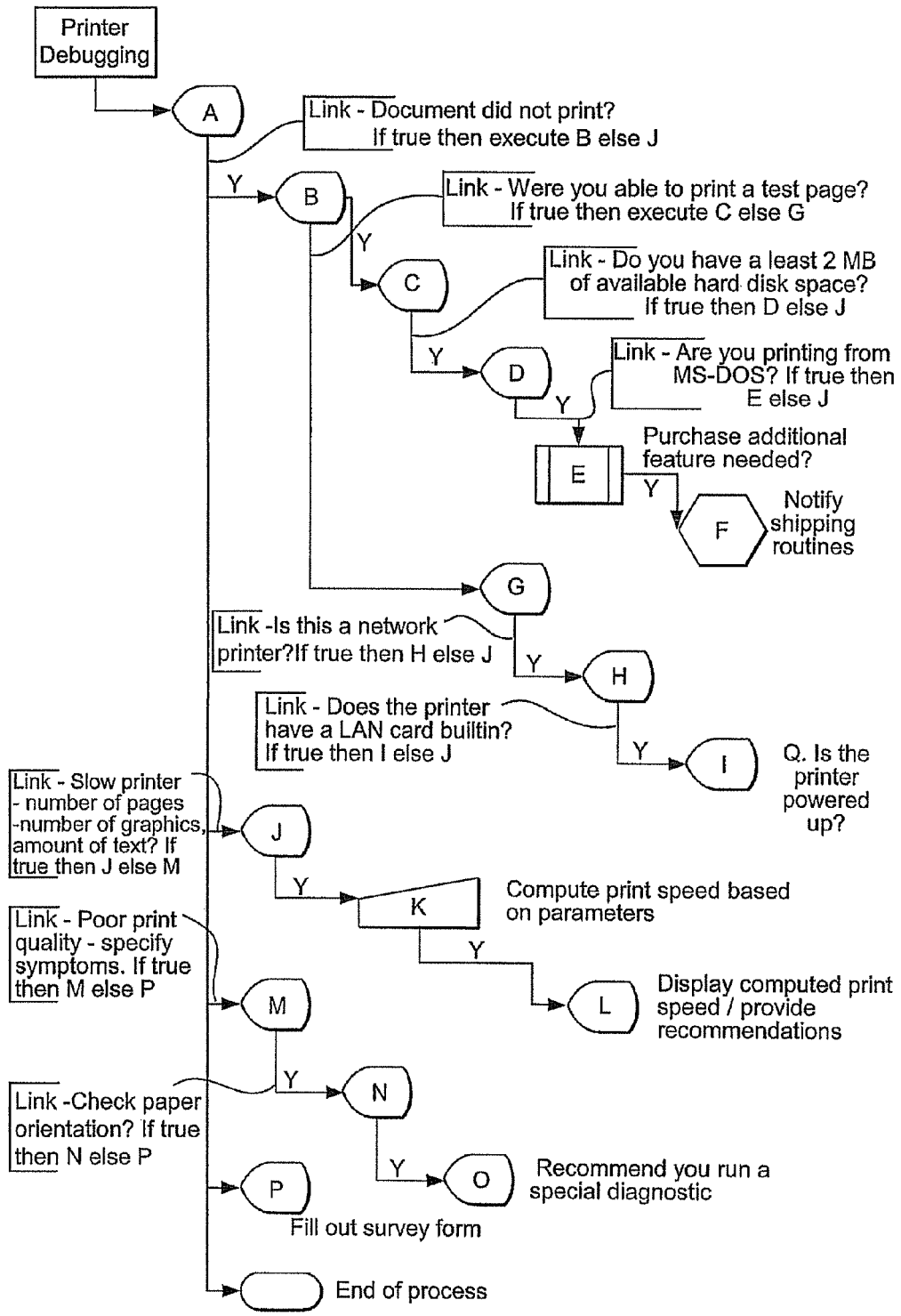
FIG. 4 is a flow chart that represents an embodiment of the present invention where an application defined to assist in debugging problems with a specific model of a printer is reused and operates differently based on the context.

FIG. 4 represents a general application for assisting users with a range of PC-models configured with a range of printers. The diagnostic application for isolating and resolving problems with an 'A'-model printer is shown being reused in multiple PC-type contexts. Based on the context of the invocation, the printer debugging application can be designed to operate differently.

A server system is used to implement the website and receives control when a client web browser issues a connection request to a specific pre-defined web page located on the server as shown in FIG. 1. This web page is associated with a specific application. When a client browser signals applicationing complete for this page, the server receives control and signals the solution engine with the application-id and any parameters passed from the client browser. The solution engine applications the tree of nodes and links associated with this application-id.

Figure 5:
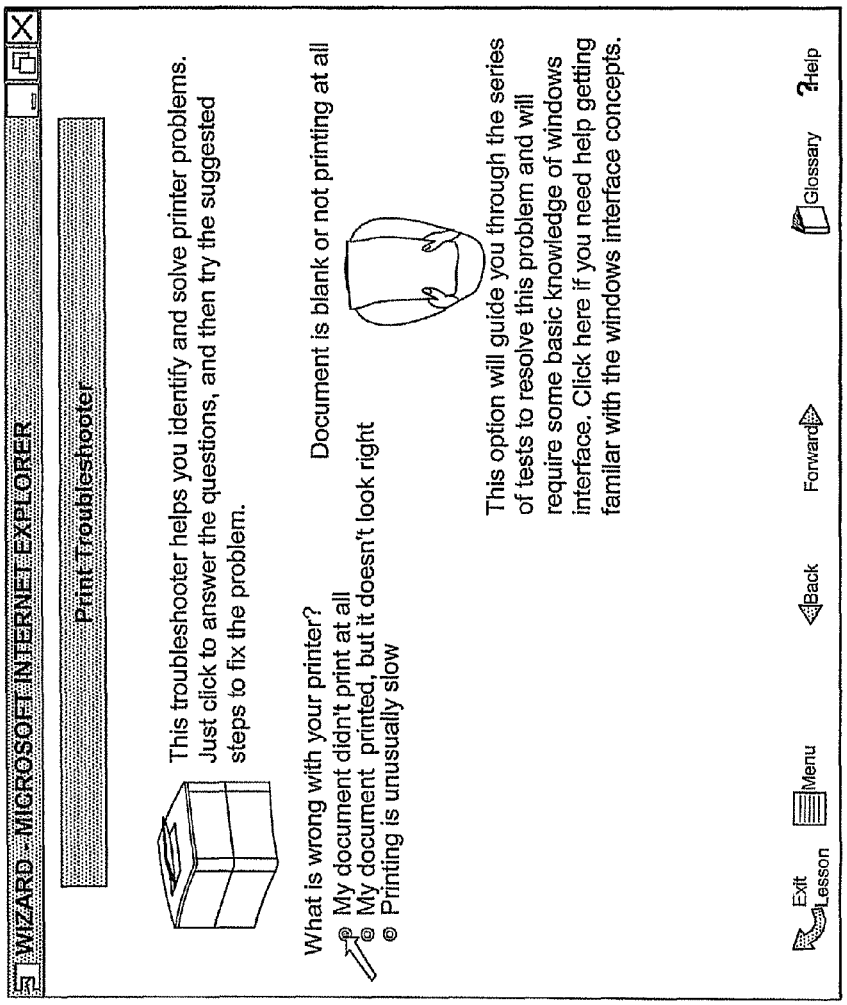
FIG. 5 illustrates the use of nodes and links to represent the business application shown in FIG. 2 and the applicationing sequence used by the solution engine.

FIG. 5 illustrates the applicationing logic for the application defined in FIG. 2 and FIG. 3. Node A represents the first page displayed by the client browser and the link (Document did not print?) is tested. If this is tested true node B is applicationed; else the next link (Is the printer slow?) is evaluated. In general, the server system evaluates a link and if the condition is true applications the next node and its child nodes until it encounters a link that tests untrue or reaches the last node in a chain. When this happens, it reverses its execution path till it encounters a node that has a child on an untested path and tests the link on the path if one exists before applicationing the child node. Essentially, every path stemming from a node is tested before the server system continues on its reverse path. This is done until all paths have been traversed; at which point the server system deems the application completed.

Figure 6:
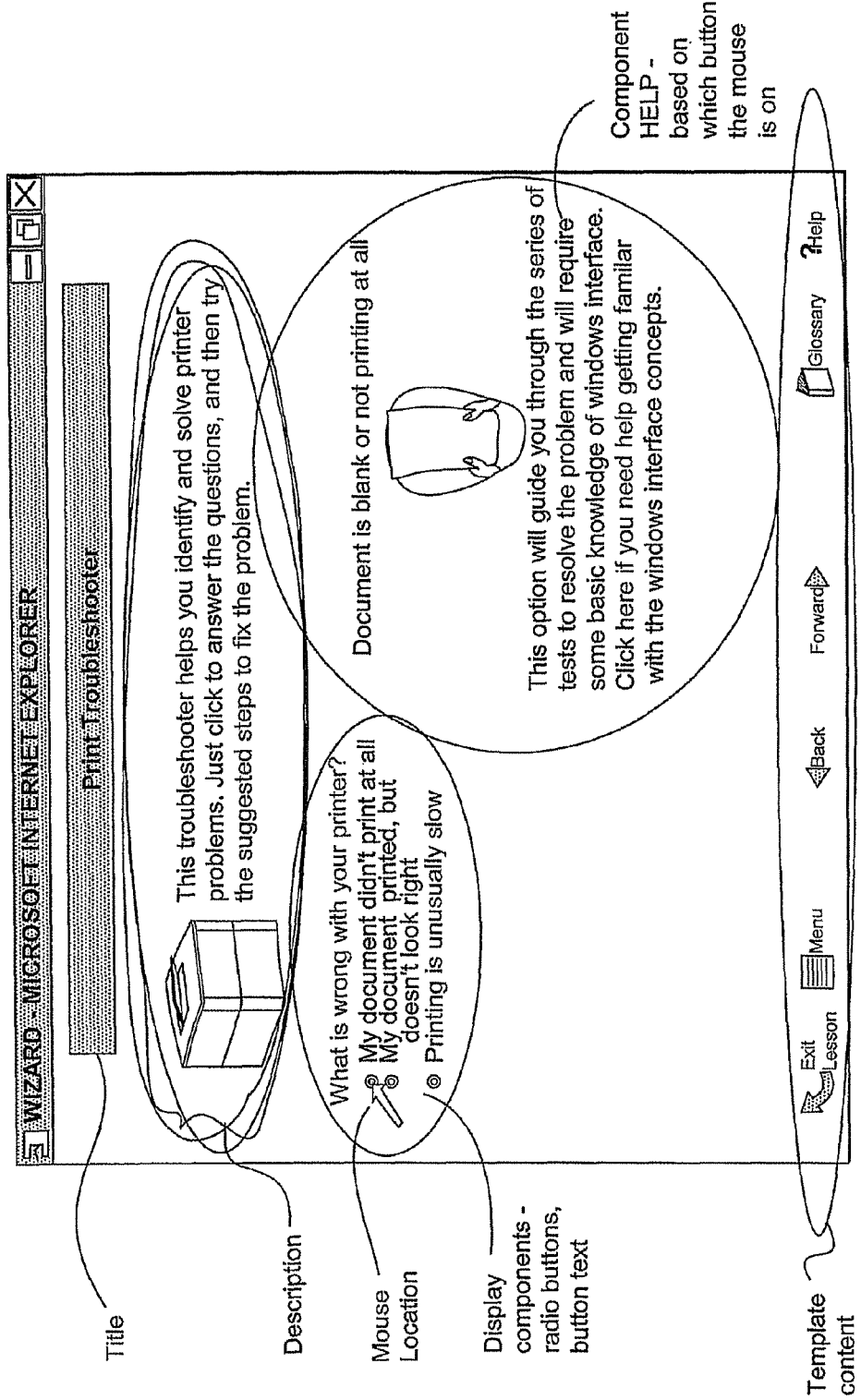
FIG. 6 is a sample screen shot from a website that was generated using rules defined in FIG. 5.

FIG. 6 illustrates a web page generated by the server system based on the application, rules and display specifications in FIG. 3. The server generates this page using display specifications in a template page and overlaying this with display components from the business application map, see FIG. 3. The title, description, display components and associated HELP are directly derived from the business application map. Positioning of the mouse pointer and the related HELP content pop-up are examples of the dynamic, content specific information that can be displayed. As the mouse moves over the other choices on FIG. 3, the component HELP associated with that choice is displayed.

Figure 8:
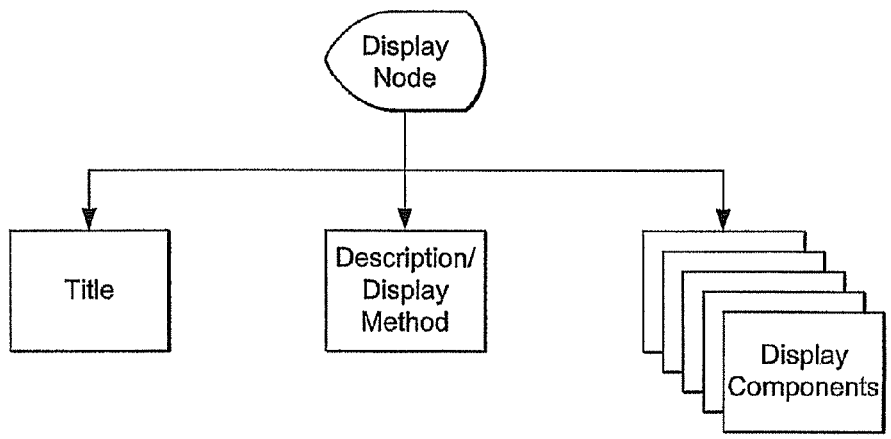
FIG. 8 illustrates a representative set of nodes, of the present invention, and their associated capabilities.
Figure 9:
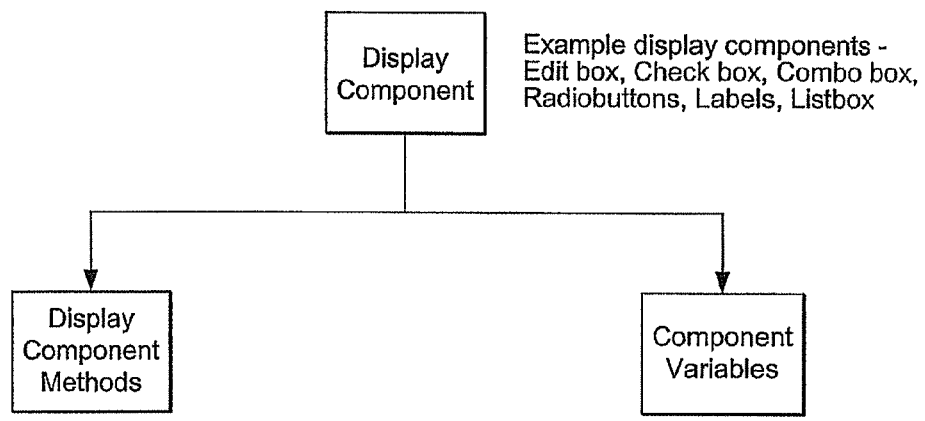
FIG. 9 is a schematic illustration of one embodiment of the display node and the display component of the present invention.

A basic set of building blocks for defining a website is shown in FIG. 8. These blocks include nodes that provide applicationing capability and links that test for conditions to enforce business rules. Based on the specific application being defined appropriate nodes are selected to represent the actual business application. Additional node types may be defined as needed. The display node represents an interaction with a web client browser and may be used to specify the content and layout of a web page. The structure of the display node, as shown in FIG. 9, consists of a foundation page consisting of static content (Title, Description) and display components that represent interactional elements used to display content and accept user input interactively. Display components as depicted in FIG. 10 consist of display widgets, associated content/text, HELP text and variables associated with the selection with defaults, min/max settings as appropriate. The defaults and min/max values can be set to variables as opposed to constants providing additional flexibility. The HELP text is, in one embodiment, displayed as a mouse rollover event.

Analysts using the visual design tool to layout a business application using display nodes can do so without any consideration of the physical device that will be used to interact with the web client. These display nodes are simply stored as text, content, widgets and HELP content in the knowledgebase.

Templates enable the physical manifestation of display nodes, which contain the logic and additional content. They use the data associated with the display node to interpret and convey text and content and most critically, they define the behaviors of the display components. This enables a display node to drive a web browser on a PC, or a web browser on a cellular phone or a conventional telephone dialed in to a Computer-Telephony-Integration enabled browser.

Figure 11:
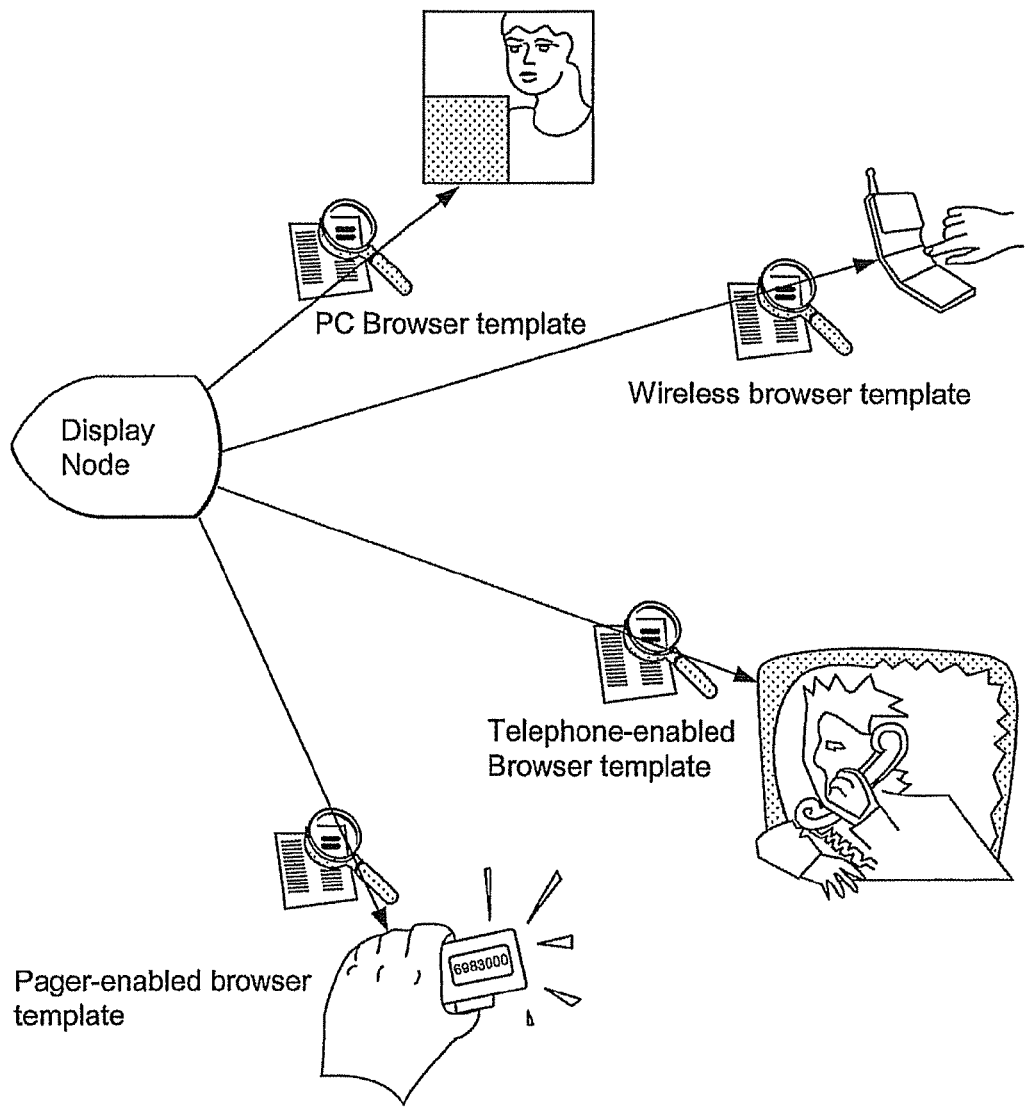
FIG. 11 illustrates how template based interaction of the present invention provides a method for user interactions to be defined and implemented independent of the physical characteristics of the user device.
Figure 12:
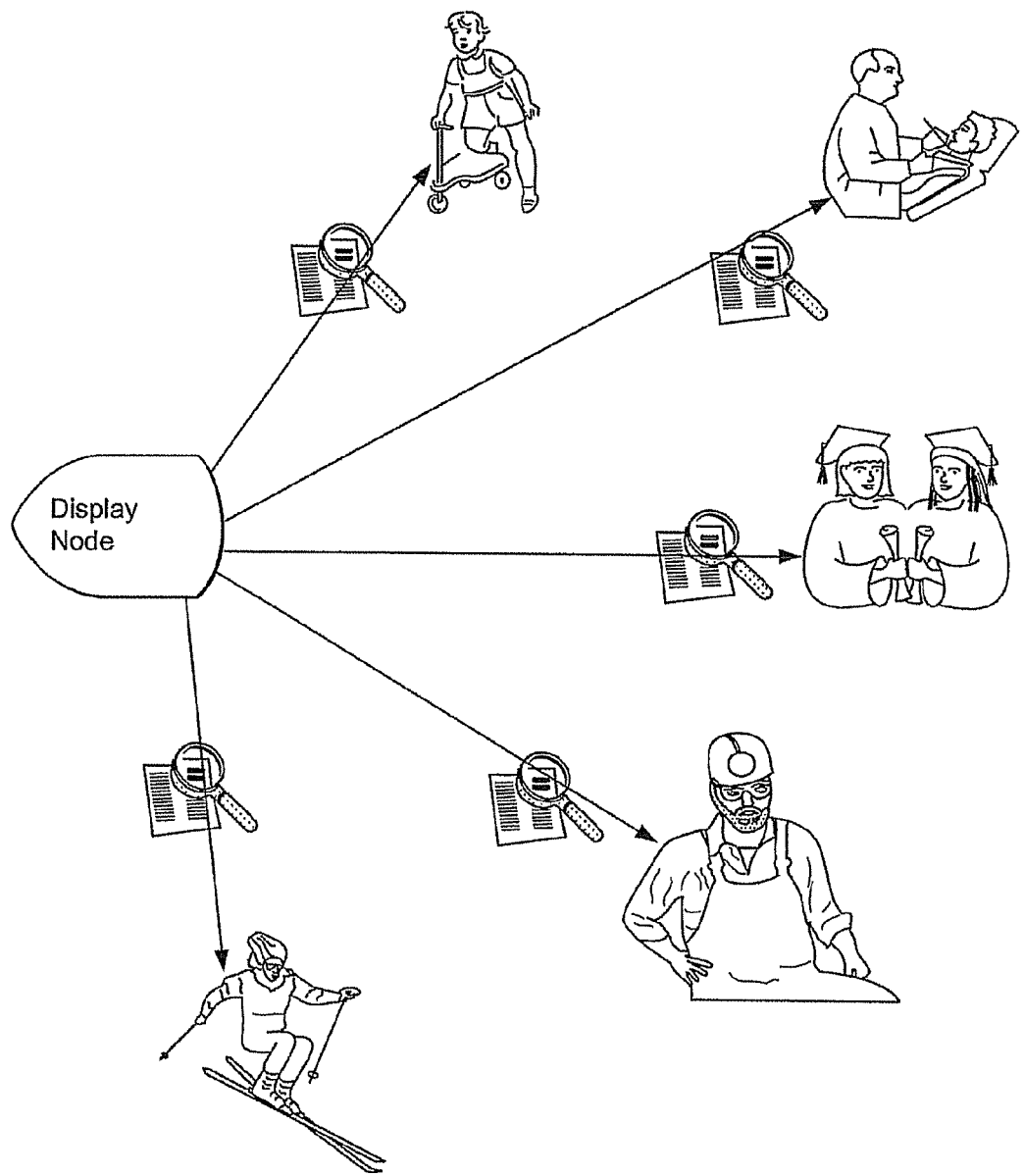
FIG. 12 illustrates how template based interaction of the present invention enables personalization—to display user relevant content and user preferred display formats.

FIG. 11 illustrates the role of the template in the applicationing of interface nodes. Templates may be viewed as the engine that is fueled by the display node logic and contents. A single type of fuel (display node content), as in FIG. 12, drives many engines—cell-phone enabled browsers, telephones, and conventional PC-based browsers, handheld PDAs etc. Additionally, engines may be used to provide many forms of personalization (FIG. 12) based on the end customer—a regional, ethnic, professional look and feel.

Figure 13:
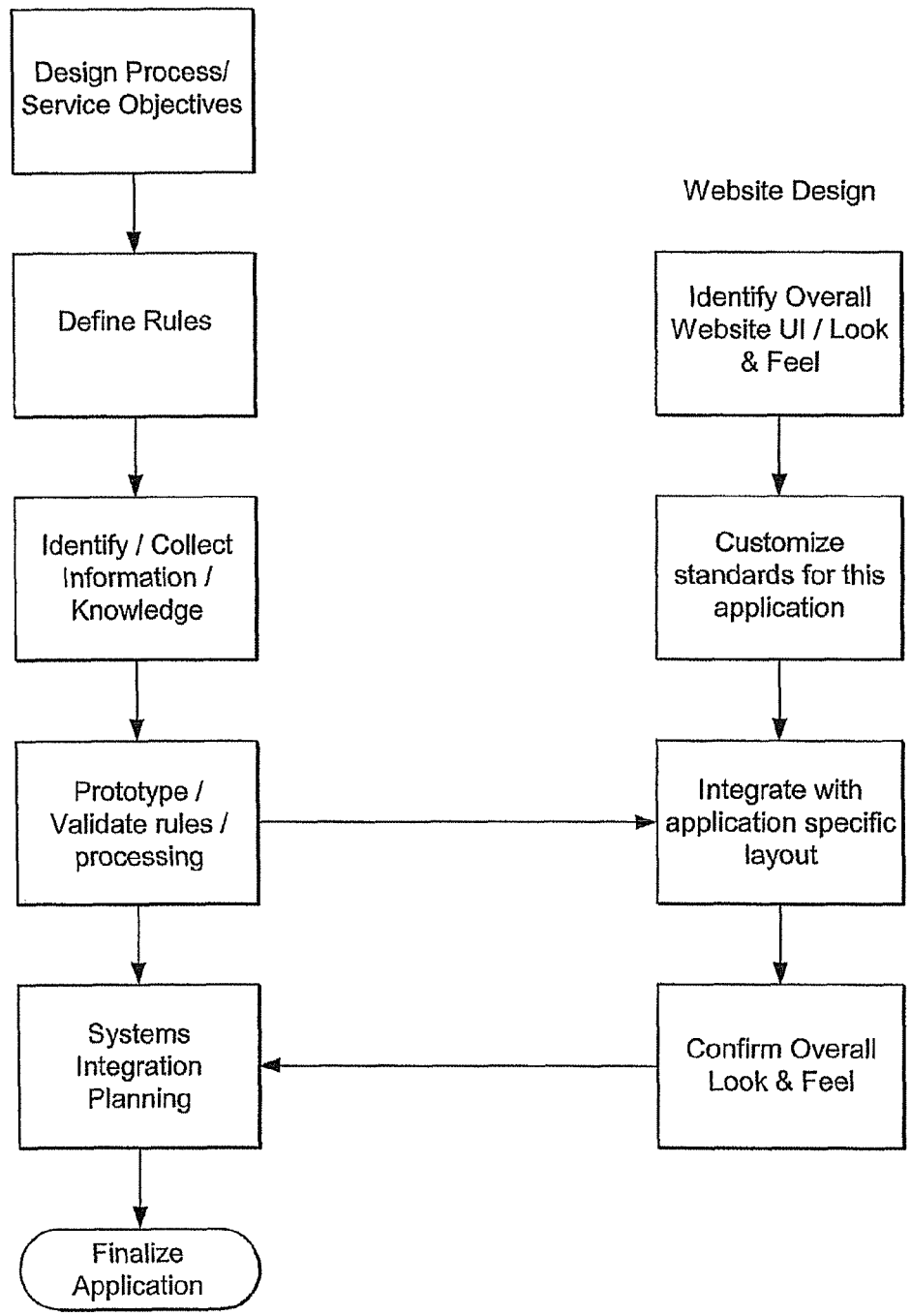
FIG. 13 is a flow chart that illustrates one embodiment of a methodology of the present invention for concurrent business application definition and web-site design.
Figure 14:
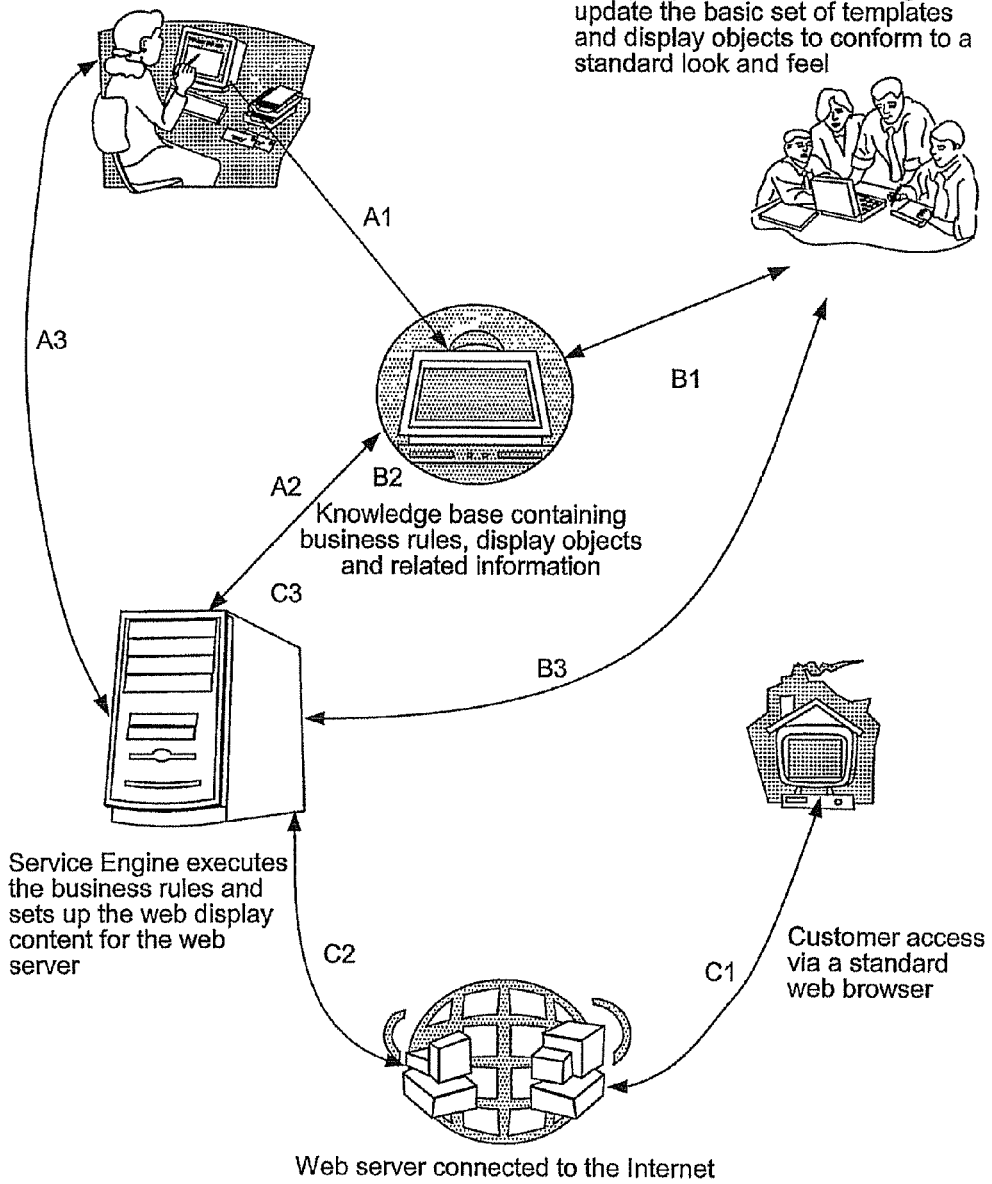
FIG. 14 is a flow chart that illustrates one embodiment of the present invention of a complete view of applications and information flow using the FIG. 13 methodology.

FIG. 13 illustrates a methodology that facilitates rapid implementation of website solutions. The delineation of business application and rules definition from the technical details of website user interface design are uniquely enabled by this invention. FIG. 14 illustrates the information flow in the three key use models for a website designed based on the principles described by the present invention.

EXAMPLE 1

The following sections outline the steps taken to build a simple login application, which consist of:
  Presenting an opening screen to the user.
  Requesting the user ID and password.
  Verifying the user ID and password.
  Issuing an error message for incorrect logins.

Summary

The following is a summary of the steps taken to complete a sample application:
  Identifying A Application
  Outlining the Application Sequence
  Building a Application with Application Builder
    Opening a Application
  Step 1 Start Application Builder.
  Step 2 Add a new category.
    1. Right-click on the root Application node.
    2. Select New Category.
    3. Right-click the new Category folder.
    4. Specify a name for the category.
    5. Click OK.
  Step 3 Select a new application to build.
    1. Right-click on the category folder just created.
    2. Select New Application.
  Step 4 Check out the application for editing.
    1. Right-click on the Application node.
    2. Select Check Out.
  Step 5 Name the Application.
    1. Double-click on the Application node.
    2. Type a title and name for the new application.
    3. Click OK.

Defining Variables

Step 1 Create variables.
  1. From the Application node's properties dialog box, click the
  2. Newbutton.
  3. Type a name for each variable as it is added.
Step 2 Select the variable type.
  1. Click on the Type column box.
  2. Scroll through the list and select a type.
  3. Click OK.

Defining User Interaction

Step 1 Add a User Interface node.
  1. Go to the Node Palette.
  2. Add a User Interface node to the Application Diagram.
  3. Double-click on the User Interface node.
  4. Type a title and name for the new node.
  5. Click OK.
Step 2 Add a User Interface Block node.
  1. Go to the Node Palette.
  2. Add a User Interface Block node to the Application Diagram.
  3. Double-click on the User Interface Block node.
  4. Type a title and name for the new node.
  5. Click OK.
Step 3 Select a component.
  1. Double-click on the User Interface Block node.
  2. Double-click on a component type in the Available Component list.
Step 4 Define the component.
  1. Type a title and name for the component.
  2. Map a variable to the component.
  3. Define additional variables as needed.
    a. Click the New button on the General tab.
    b. Enter the variable Name.
  4. Select a User Interface type for the component.
    a. Click on the drop down list in the UI Type field.
    b. Type in property values.
  5. Define properties for the component.
    a. Click on the Properties tab.
    b. Type in property values.
Step 5 Add an Interaction node.
  1. Go to the Node Palette.
  2. Add an Interaction node to the Application Diagram.
  3. Double-click on the Interaction node.
  4. Type a title and name for the new node.
  5. Click OK.
Step 6 Map a User Interface node to the Interaction node.
  1. Double-click on the Interaction node.
  2. Select from the list of User Interface nodes.
  3. Click Add.
Step 7 Define the Interaction node's properties.
  1. Click on the Properties tab.
  2. Type in property values.
  3. Click OK.

Step 8 Verify the component display on the website.
 1. Save the application.
    a. Right-click on the Application node.
    b. Select Save.
 2. Find the Application node's ID.
 3. Open a web browser.
 4. Determine the Intranet path to the Application URL.
 5. Specify the application ID found in SubStep 2b as the last six digits of the URL.
 6. After review, return to the Application Builder.

Defining the Database Information Used to Verify a Login

Step 1 Add a Task node.
 1. Go to the Node Palette.
 2. Add a Task node to the Application Diagram.
 3. Double-click on the Task node.
 4. Type a title and name for the new node.
 5. Click OK.
Step 2 Add a Step to the Task node.
 1. Display the Task node's properties dialog box.
 2. Add a step.
Step 3 Define the Step function of the step.
 1. Specify a name for the step. 1
 2. Select a function for the step.
 3. Select an interface.
Step 4 Create a DB List variable.
 1. In the Interface area, click the New button.
 2. Type a name for the DB List variable.
 3. Select a Return Value from the drop down list.
 4. Enter Input and Output parameters.
    a. Click on the Variable field for each Input and Output Column Name.
    b. Scroll through the list and select a variable.

Setting Up for a Message Response

Setting Up a Condition
Step 1 Add a Decision node.
 1. Go to the Node Palette.
 2. Add a Decision node to the Application Diagram.
 3. Double-click on the Decision node.
 4. Type a title and name for the new node.
 5. Click OK.
Step 2 Define the Decision node conditions.
 1. Open the Decision node's properties dialog box.
 2. Right-Click on the IF in the large text box.
 3. Select one of the listed options.
 4. Enter a Description.
 5. Select a DBList variable.
 6. Select an Operation.
 7. Click OK.

Setting Up Retry Attempts

Step 1 Add a Data node.
 1. Go to the Node Palette.
 2. Add a Data node to the Application Diagram.
 3. Double-click on the Data node.
 4. Type a title and name for the new node.
Step 2 Define the Data node.
 1. Open the Data node's properties dialog box.
 2. Create Rules for the Data Node.
    a. Click New in the Rules box.
    b. Select a Wizard.
    c. The Node Components Properties dialog box is displayed.
 3. Enter a description.

Step 3 Map the component to the Data node.
 1. Map the rule to the User Interface Block node
 2. Select a component.
 3. Define the properties of the component.
    a. Enter text for the Caption property.
    b. Select a value for the Visible property.
    c. Click Apply.
    d. Click OK.
 4. Check the new rule.

Defining a Loop

Step 1 Add a Loop node.
 1. Select a type of Loop node.
 2. Go to the Node Palette.
 3. Add a Do While Loop node to the Application Diagram.
    a. Drag the Do While Loop node over the intended parent node.
    b. Move the branch that will make up the loop application into the position of the Do While Loop node's children.
       (1) Copy the branch.
       (2) Paste the branch.
       (3) Remove the old branch.
       (4) Reactivate the User Interface node in the Interaction node.
 4. Double-click the Do While Loop node.
 5. Type a title and name for the new node.
 6. Click OK.
Step 2 Define the Do While Loop node's conditions.
 1. Open the Do While Loop node's properties dialog box
 2. Right-click on the DO WHILE in the large text box.
 3. Select one of the listed options.
 4. Enter a description.
 5. Select a DBList variable.
 6. Select an Operation.
 7. Click OK.

Saving the Application

Step 1 Save the application.
 1. Complete the application.
    a. Find the Application node's ID.
    b. Select Save.
 2. Right-click on the Application node Testing the Application Step 1 Verify the application display on the website.
 1. Open a web browser.
 2. Determine the Intranet path to the Smart eBusiness URL.
 Specify the application ID number found in SubStep 2b as the last six digits of the URL.
 For purposes of this specification, a application is a sequence of events, organized in a collection of nodes and variables, that define how to conduct business. A application can he an internal procedure or a customer interaction. Prior to building a application a software developer determines:
 The objectives of the application.
 User levels, input, and response.
 Data requirements.
 Applicationing steps.
 Constraints.
 The order of application events.

Building a application is a collective activity that includes:
 Defining the needs of the application.
 Storyboarding or outlining the planned flow of the application.
 Using Application Builder, proceeding by:
 Selecting an existing application or creating a new application from the Application directory.
 Checking out the application from the Application Diagram.
 Adding nodes to the application by clicking and dragging the node type from the Node Palette onto the Application Diagram.
 Defining the properties for each node as needed by right-clicking on the node and entering information into the properties dialog boxes.
 Saving the application.
 Testing the application.
  Executing the application by specifying the unique application identification in the URL of a web browser.
When a application is built using Application Builder, the activities include:
 Checking out a application for editing.
 Defining variables for the login application.
 Defining the interaction between the user and the application—how the user will supply the login information.
 Defining what database information will be compared to the user login information.
 Defining steps for an incorrect login:
  Setting up an error message response.
  Setting up a condition.
  Setting up retry attempts.
  Defining a loop to cycle through login and verification.
  Defining action to be taken through a login retry loop.
 Saving the login application.
 Testing the login application.
 Executing the login application.

Opening a Application

Figure 15:
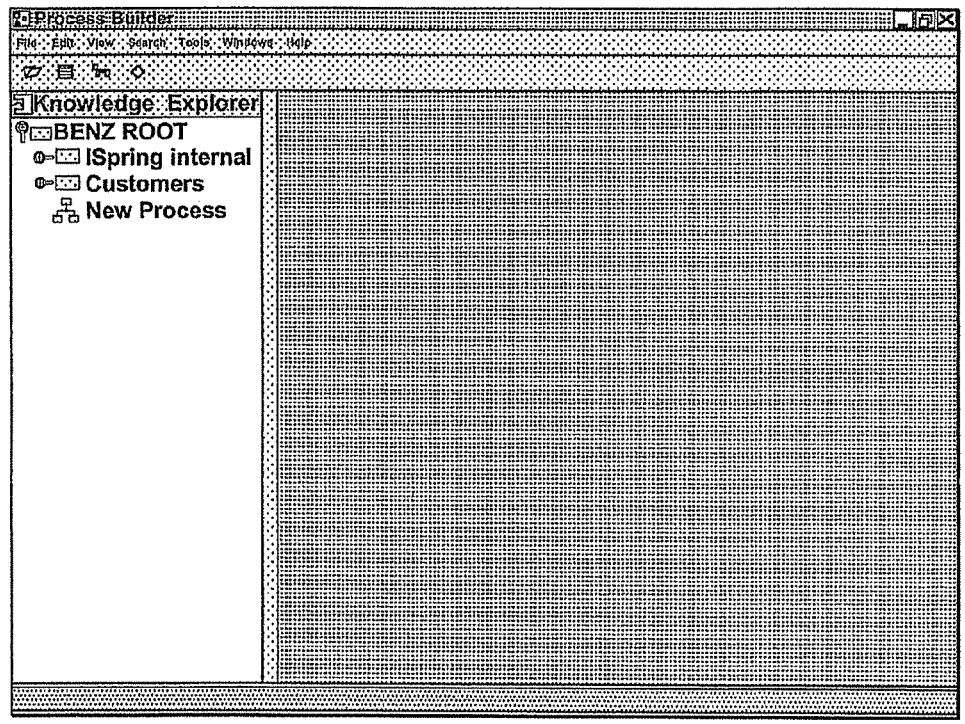
FIG. 15 is a screen shot of an application builder screen.
Figure 16:
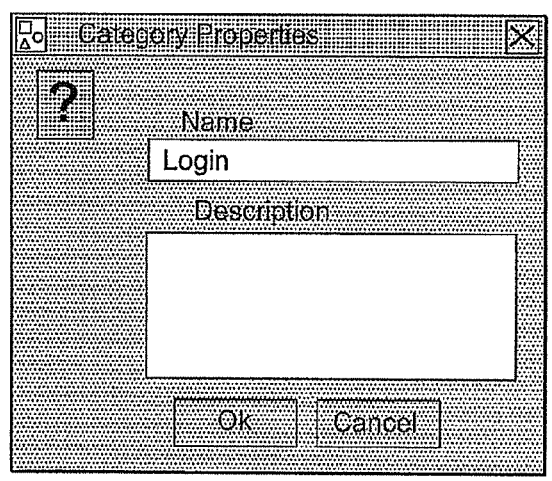
FIG. 16 is a screen shot of a log-in into the application builder.

A application can be opened by either double-click an existing application or opening a new application from the Application directory. All applications must be checked out from the application diagram area to enable editing.
Step 1 Start Application Builder.
The Application directory is displayed with the root Application node and any other applications that are defined. See FIG. 15.
Step 2 Add a new category.
The Category folders are for organizational purposes only and are not required for building a application.
 1. Right-click on the root Category. A menu is displayed.
 2. Select New Category.
  A new Category folder is added to the Application directory.
 3. Right-click the new Category folder.

Select Properties.

The new Category's properties dialog box is displayed.
 4. Specify a name for the category and a description, if needed.
 The sample is named Login. See FIG. 12-2.
 5. Click OK.
 The category folder is now labeled with the new name.

Figure 17:
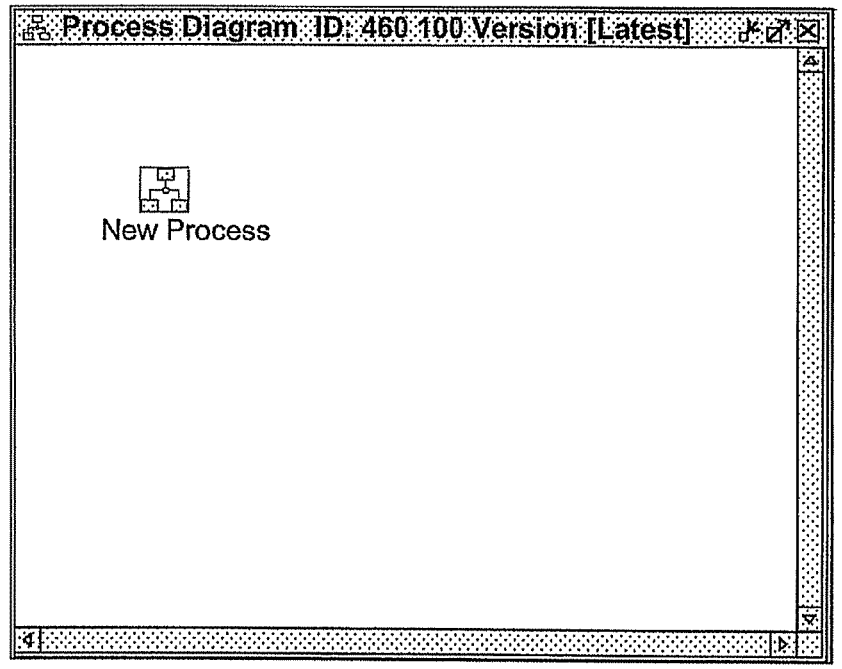
FIG. 17 is a screen shot of a new application node.
Figure 18:
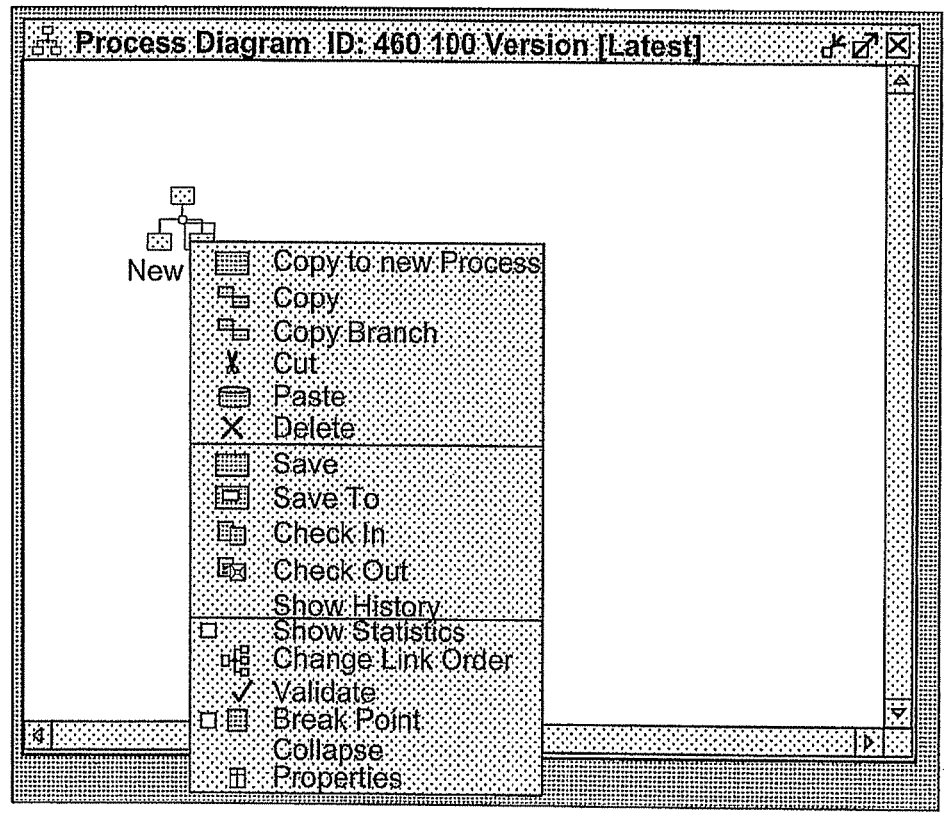
FIG. 18 is a screen shot of a menu display of the command options applicable to a selected node.
Figure 19:
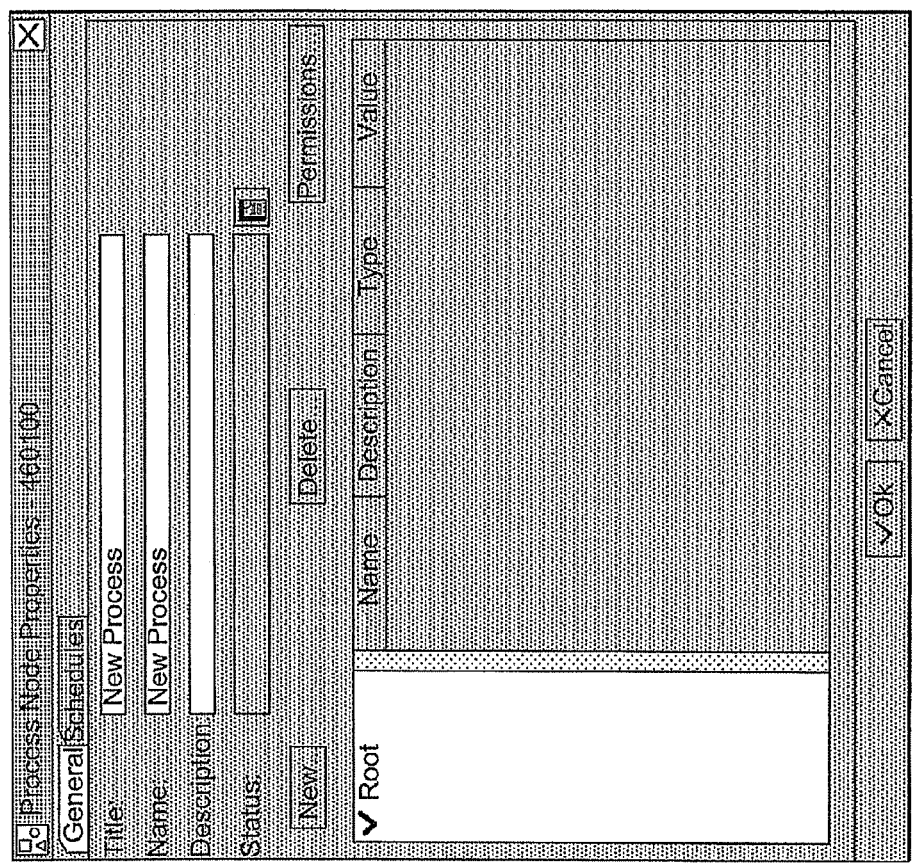
FIG. 19 is a screen shot of variables applicable to the selected node.

Step 3 Select a new application to build.
 1. Right-click on the category folder that was just created.
 A menu is displayed.
 2. Select New Application.
 A New Application node is displayed in the Application directory and in the Application Diagram. See FIG. 17.
Step 4 Check out the application for editing, if a previously created application is opened.
 1. Right-click on the Application node.
 A menu is displayed. See FIG. 18.
 2. Select Check Out.
 The application is now available for editing.
 Note: If the application will be unavailable for editing if another user has checked it out.
Step 5 Name the Application,
 1. Double-click on the Application node.
 The Application node's properties dialog box is displayed. See FIG. 19.
 2. Type a title and name for the new application.
 The title will label the icons in the Application directory and Application Diagram. The name is used for internal purposes and will not be displayed. The name must be entered alphanumerically and without any spaces.
 The sample title is Login Application, and the sample name is LoginApplication.
 3. Click OK.
 The properties dialog box is removed and the New Application title is updated in both the Application directory and Application Diagram areas.

Defining Variables

Figure 20:
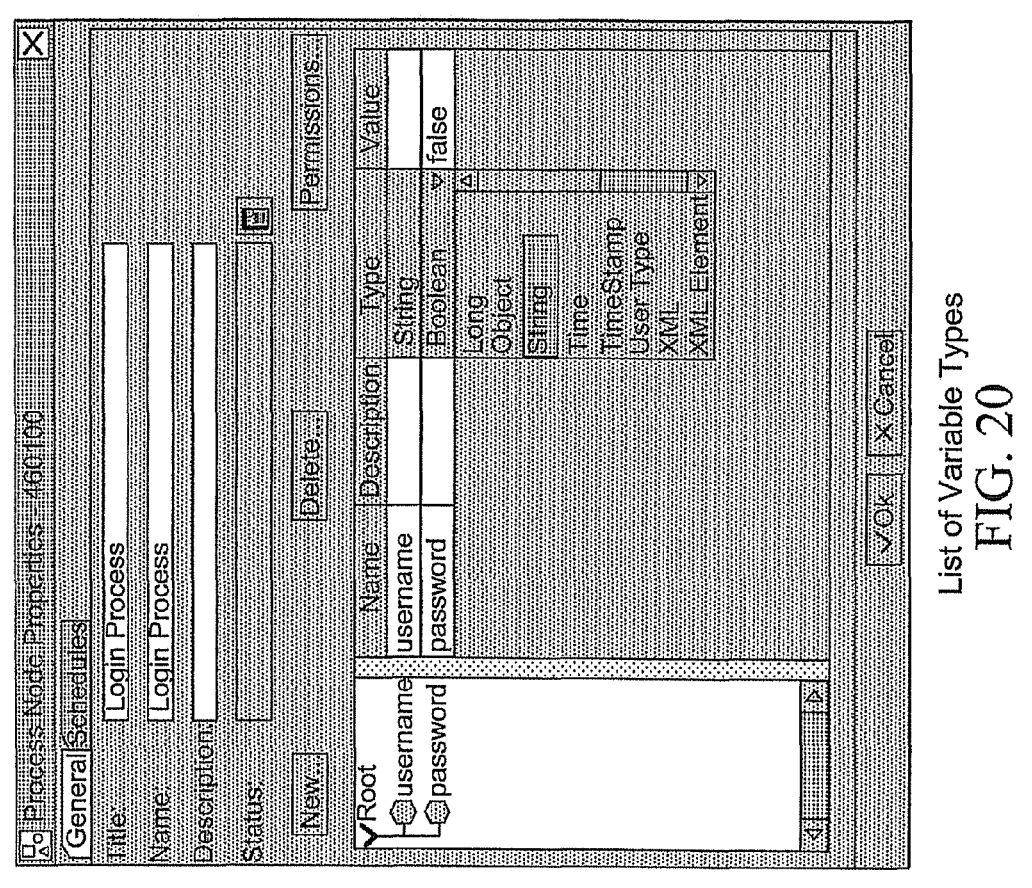
Figure 21:
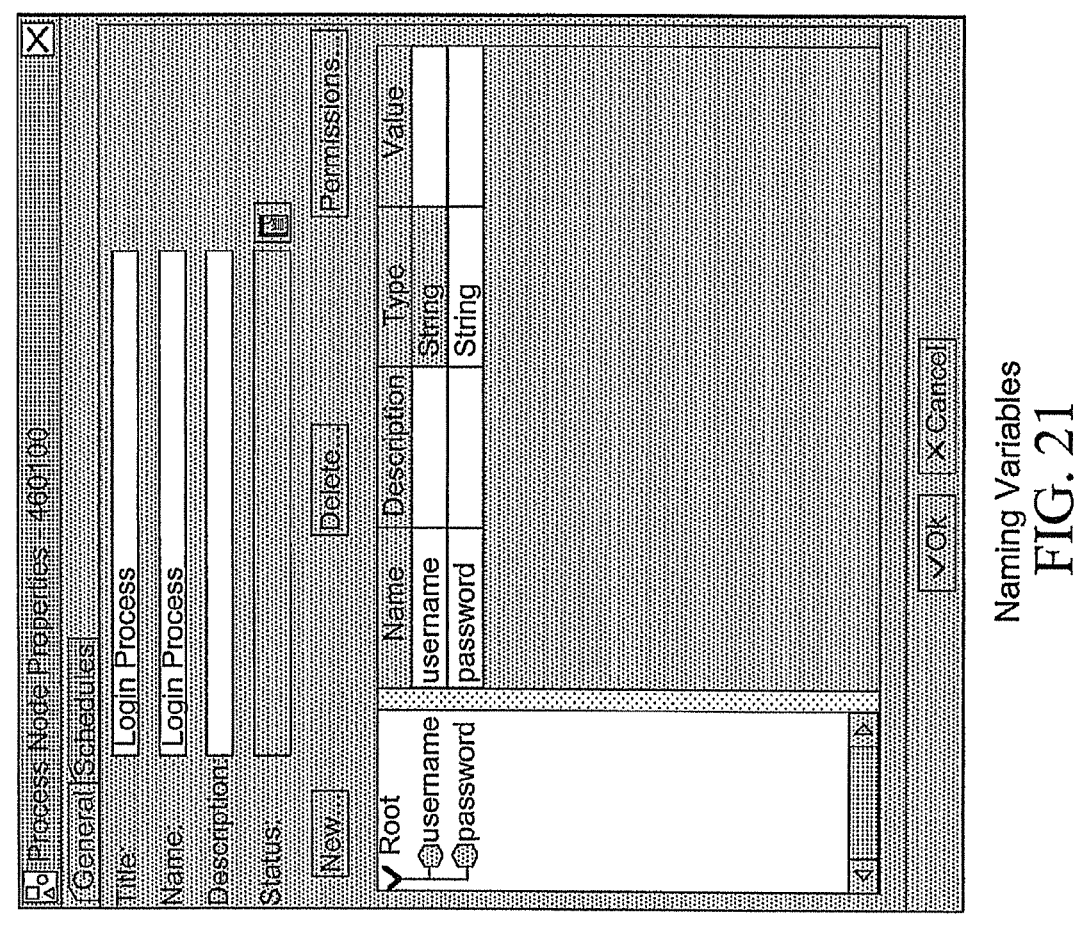

Variables are the base data handling mechanisms in a application. This section describes how to create variables through the Application node.
Step 1 Create variables.
 1. From the Application node's properties dialog box, click the New button.
 A variable row is added to the variable list box.
 2. Type a name for each variable.
 In the sample, two variables are created username and password.
Step 2 Select the variable type.
 1. Click on the Type column box.
 A list of variable types is displayed. See FIG. 20.
 2. Scroll through the list and select a type.
 Default values for the Variable type appear in the Value field. In the sample, username and password are String type variables, and the default value is an empty field. See FIG. 21.
 3. Click OK.

Defining User Interaction

Figure 22:
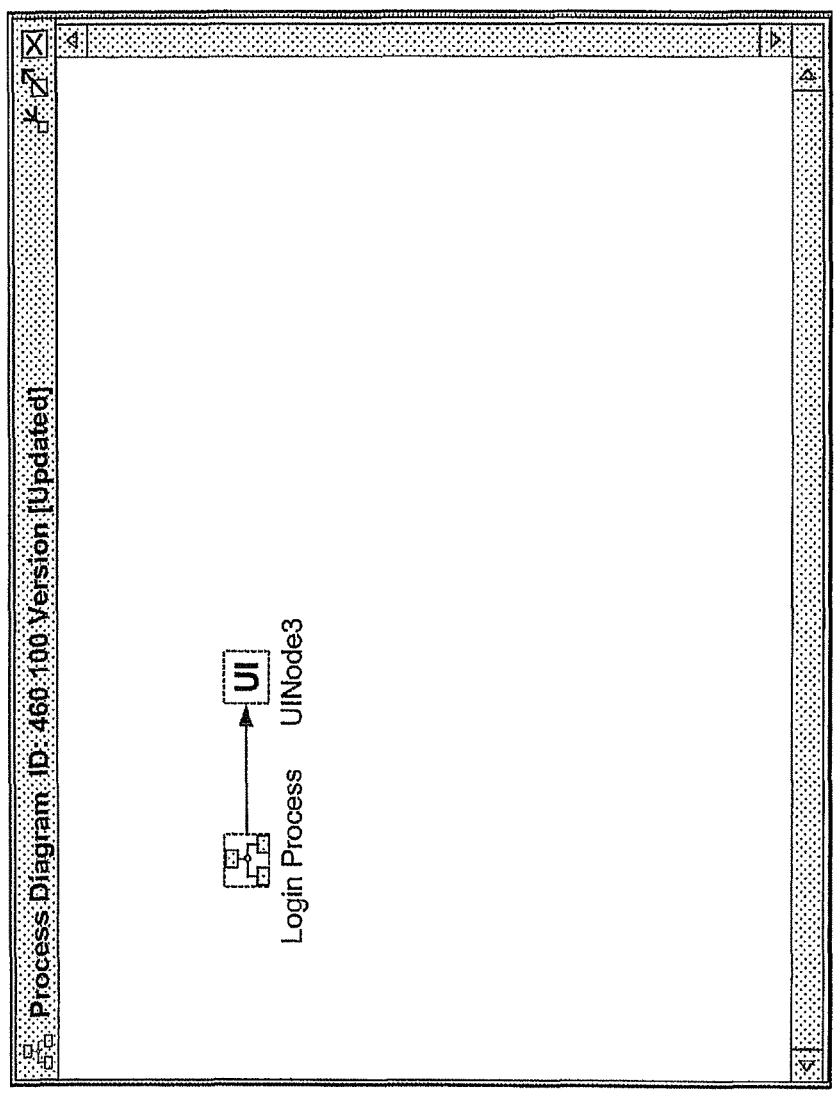
FIG. 22 is a screen shot of a user interface node.

Step 1 Add a User Interface node.
 1. Go to the Node Palette, if visible, or the selection of nodes displayed on the tool bar.
 When the Node Palette is closed, the nodes are automatically displayed on the tool bar.
 2. Add a User Interface Node to the Application Diagram.
 Click on the User Interface node and drag it over the intended parent node. In the sample, the Application node, labeled Login Application, is the parent node. See FIG. 22. 25

3. Double-click on the User Interface node.
The User Interface node's properties dialog box is displayed.
4. Type a title and name for the new node.
The sample title is Login Screen, and the sample name is Loginscreen.
5. Click OK.

Figure 23:
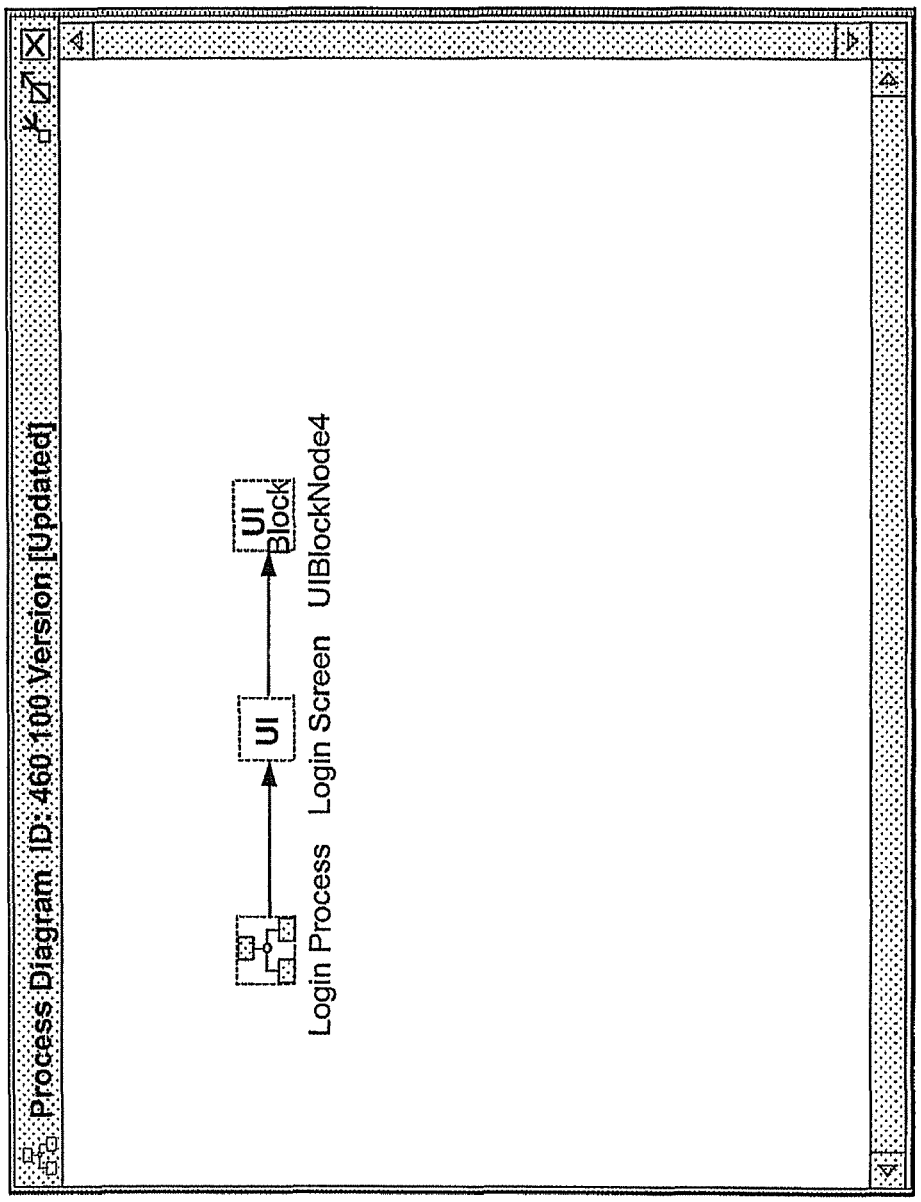
FIG. 23 is a screen shot of a user interface block node.

Step 2 Add a User Interface Block node.
1. Go to the Node Palette, if visible, or the selection of nodes displayed on the tool bar.
2. Add a User Interface Block node to the Application Diagram.
Click on the User Interface Block node and drag it over the intended parent node. In the sample, the User Interface node, labeled Login Screen, is the parent node. See FIG. 23.
3. Double-click on the User Interface Block node.
The User Interface Block node's properties dialog box is displayed.
4. Type a title and name for the new node.
The sample title is Login Controls, and the sample name is LoginControls.
5. Click OK.

Figure 24:
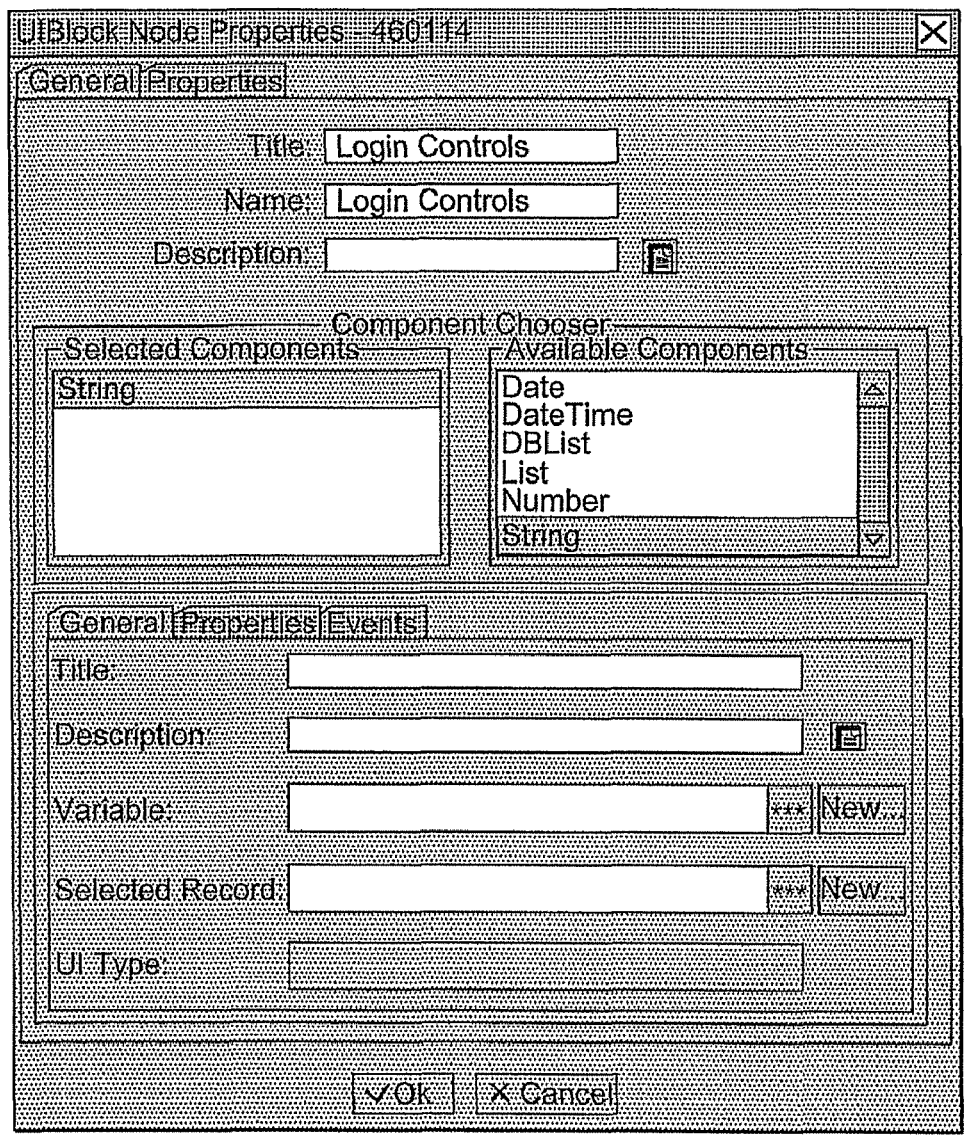
FIG. 24 is a screen shot that illustrates user interface block node properties.

Step 3 Select a component.
1. Double-click on the User Interface Block node.
The User Interface Block node's properties dialog box is displayed.
2. Double-click on a component type in the Available Components list.
The Component definition box is displayed with tabs labeled General, Properties, and Events.
For the sample case, a String type component is selected. See FIG. 24.

Figure 25:
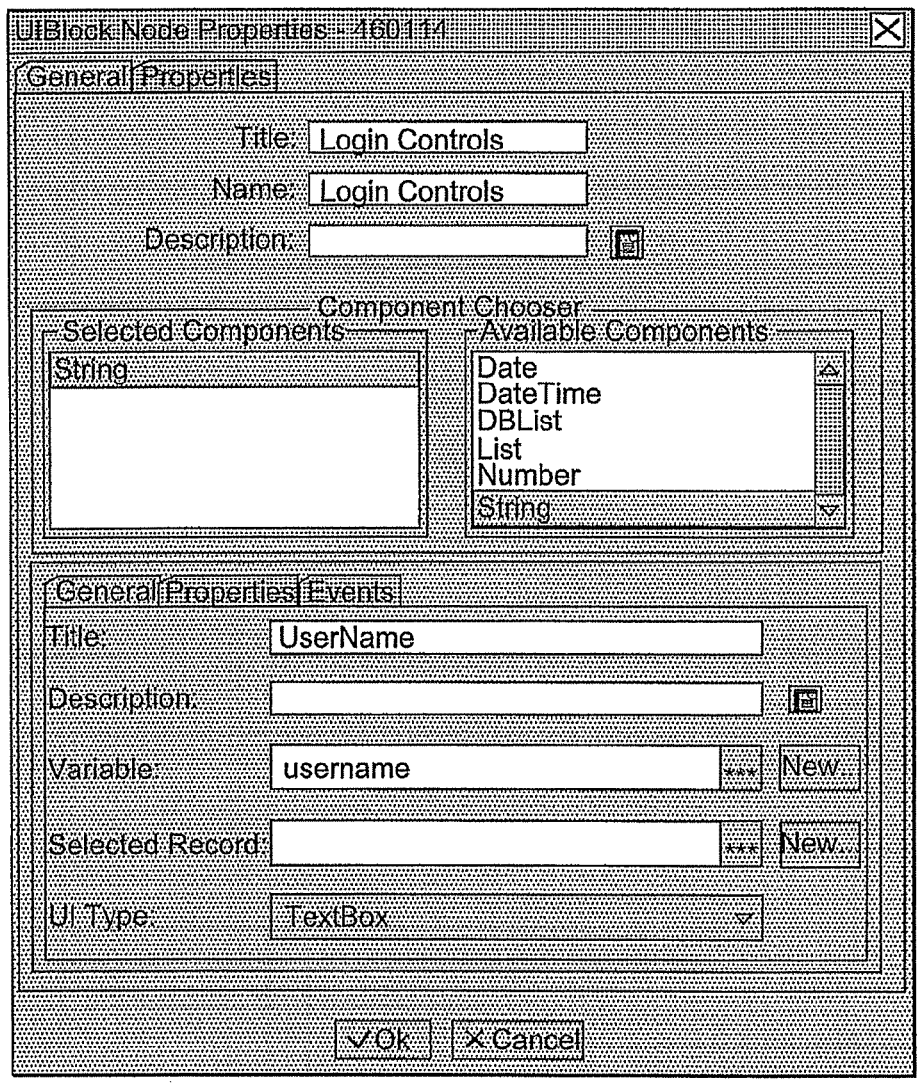
FIG. 25 is a screen shot of a component definition box.
Figure 26:
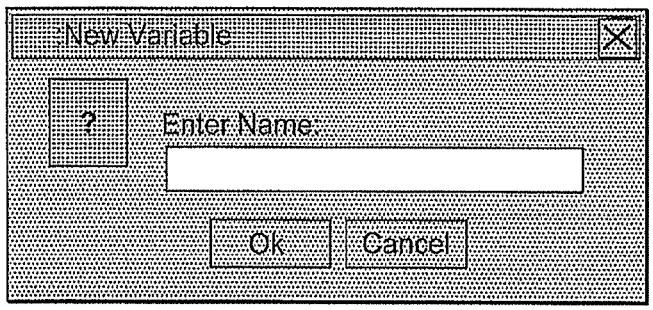
FIG. 26 is a screen shot of a variable definition box for a user interface block node.
Figure 27:
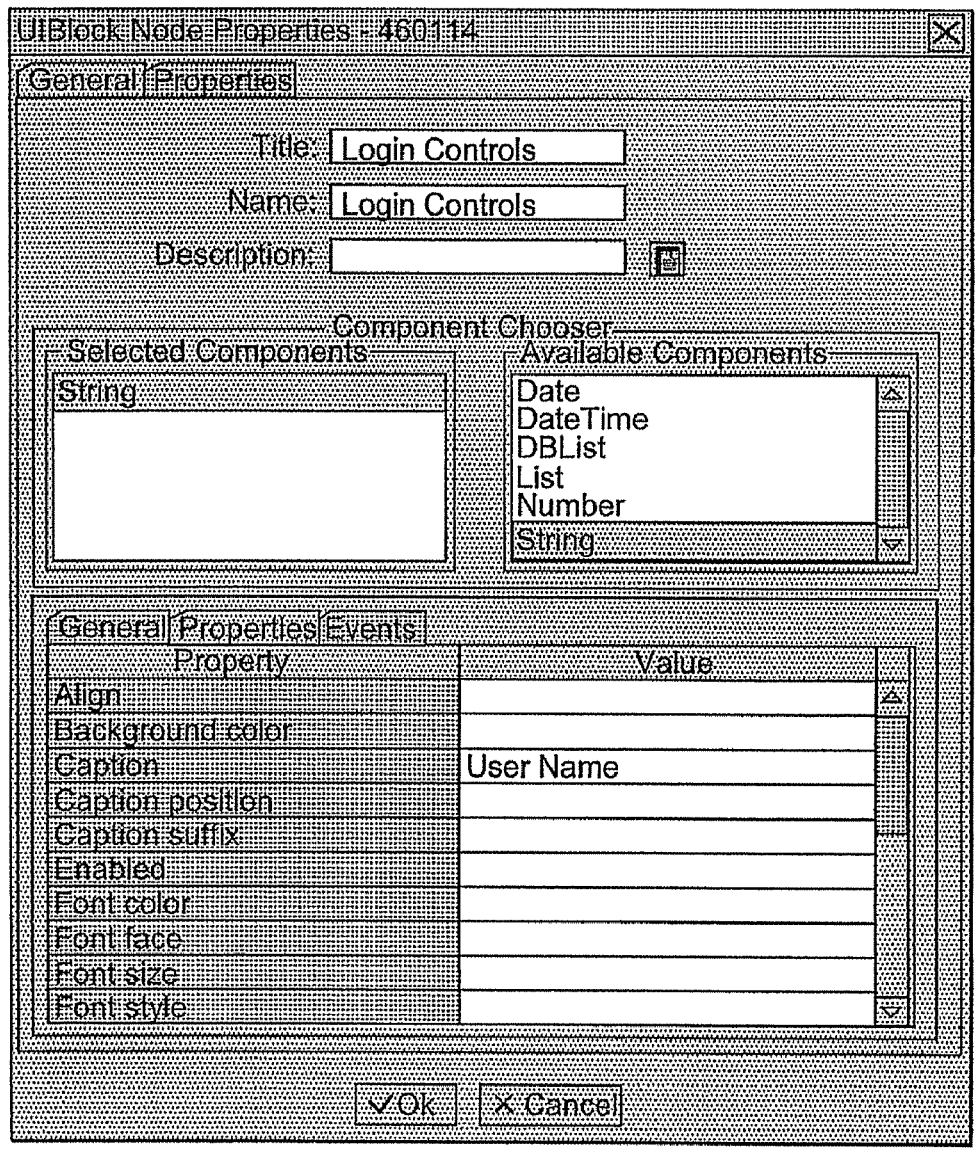
FIG. 27 is a screen shot of a component definition box with a properties tab.

Step 4 Define the component.
1. Type a title for the component.
The Title field is in the General tab of the Component definition box.
For the sample case the component label, UserName, is used.
2. Map a variable to the component.
Click on the drop down list in the Variable field.
This displays a list of defined variables that match the component type.
For the sample case, the usermame variable is selected. See FIG. 25.
3. Define additional variables as needed.
   a. Click the New button on the General tab.
   The Variable definition box is displayed. See FIG. 26.
   b. Enter the variable Name.
   The variable's type will be the same as the component's type.
   For the example, the type is String.
4. Select a User Interface type for the component.
   a. Click on the drop down list in the UI Type field.
   A list of options is displayed.
   b. Choose one of the UI Type options.
   In the sample case, TextBox is chosen. See FIG. 25 above.
5. Define properties for the component.
   a. Click on the Properties tab.
   A list of properties is displayed in the left column, and a blank list of values appears in the right column.
   b. Type in property values, or click on a drop down list and choose a property value.
   When typing property values, make sure to press enter or the value will not be displayed.
   For the sample case, (see FIG. 27), the following values are set:
      caption—User Name. This is the caption for the text box created by the username variable.
      help text—Please enter a user id and password. This message will be displayed when the cursor is positioned over the User Name text box.
      Note: For the sample case, a second component is created.
   Follow Steps 4 and 5 above to create another string component named Password. Map the component to the password variable. Select the TextBox UI type. Finally, set the properties: Password is entered as the caption property, and 30 True is chosen for the password property.

Figure 28:
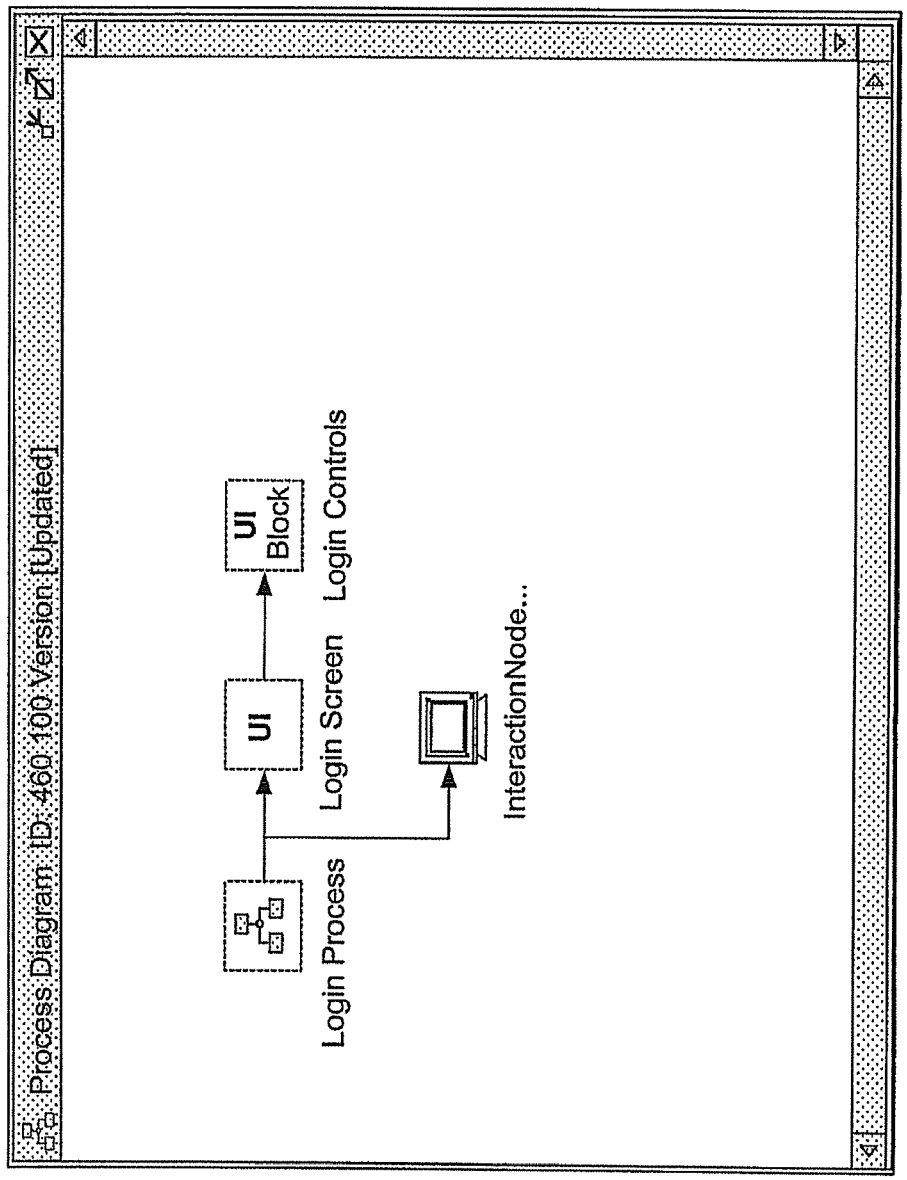
FIG. 28 is a screen shot of an interaction node.

Step 5 Add an Interaction node.
1. Go to the Node Palette, if visible, or the selection of nodes displayed on the tool bar.
2. Add an Interaction node to the Application Diagram.
Click on the Interaction node and drag it over the intended parent node. In the sample, the Application node, labeled Login Application, is the parent node. See FIG. 28.
3. Double-click on the Interaction node.
The Interaction node's properties dialog box is displayed.
4. Type a title and name for the new node.
The sample title is Login Interaction, and the sample name is Login/interaction.
5. Click OK.

Figure 29:
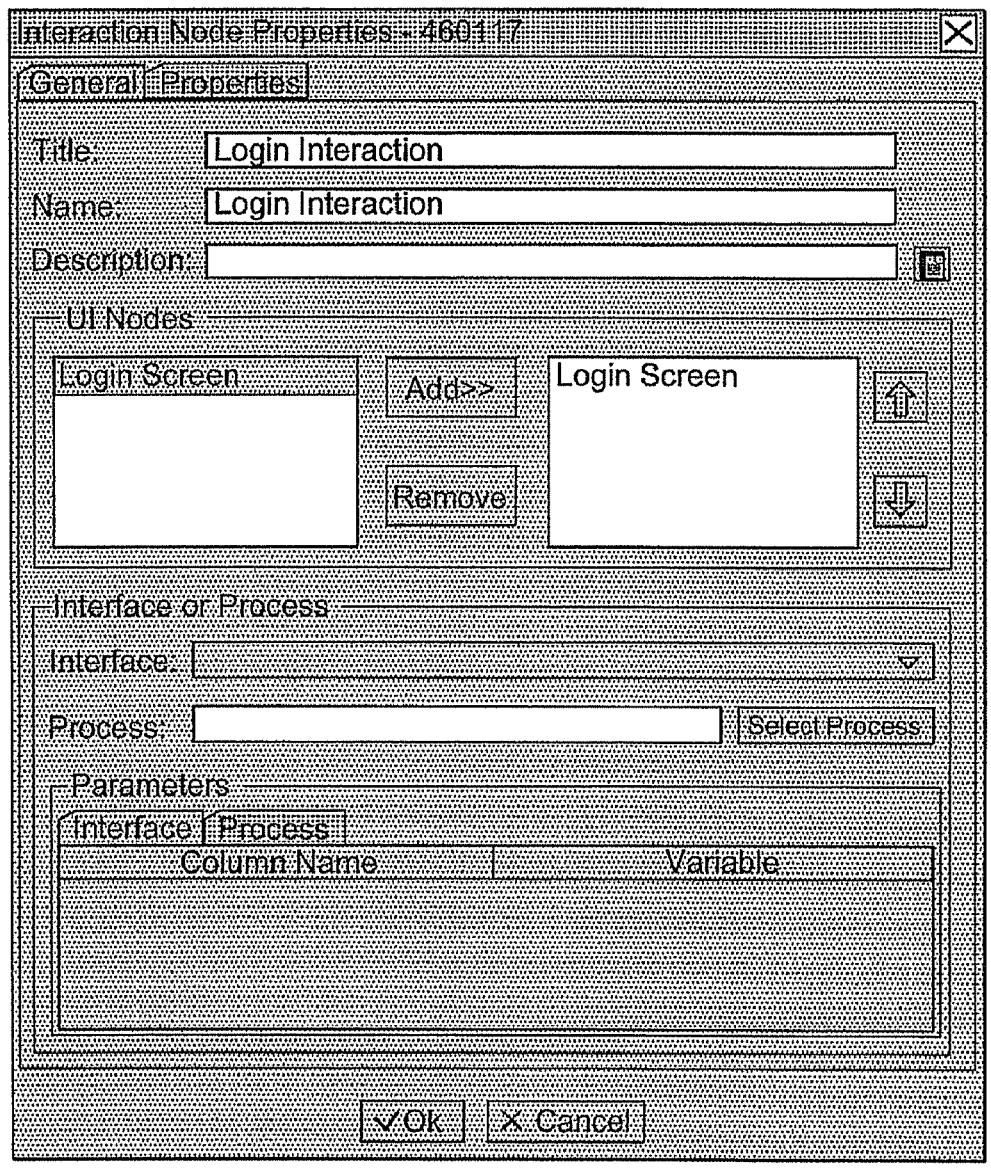
FIG. 29 is a screen shot of the properties of an interaction node.

Step 6 Map a User Interface node to the Interaction node.
1. Double-click on the Interaction node.
The Interaction node's properties dialog box is displayed.
2. Select from the list of User Interface nodes.
In the sample, the User Interface node titled Login Screen is selected. See FIG. 29.
3. Click Add.
The selected User Interface node will appear in the right column.

Step 7 Define the Interaction node's properties.
1. Click on the Properties tab.
A list of properties will be displayed in the left column, while a blank list of values will appear in the right column.
2. Type in property values, or click on a drop down list and choose a property value.
When typing property values, make sure to press enter or the value will not be displayed.
For the sample case, (see FIG. 30), the following values are set:
   backbuttonvisible—false. This will prevent the back button from being displayed.
   template—MSTemplate. This will display the MS Template.
3. Click OK
The Interaction node's properties are now set.

Figure 31:
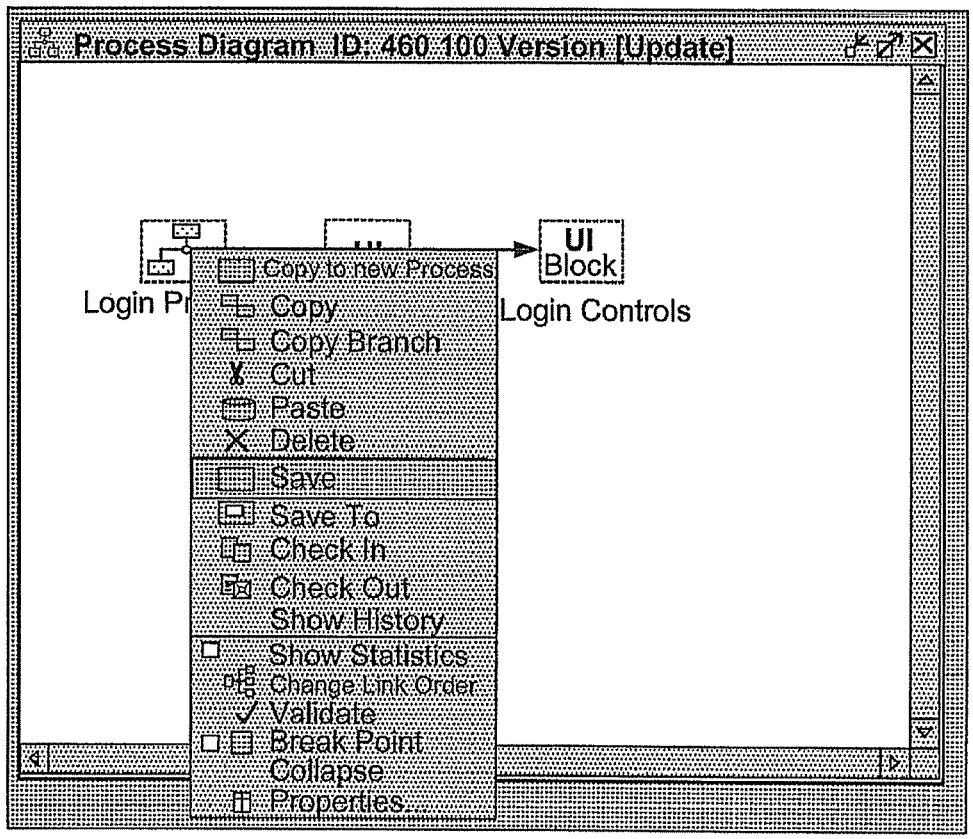
FIG. 31 is a screen shot of an application node menu to save a process.

Step 8 Verify the component display on the website.
1. Save the application.
   a. Right-click on the Application node.
   For the sample case, the Application node is labeled Login application. The Application node menu is displayed. See FIG. 31.
   b. Select Save.
2. Find the Application node's ID. 2.
Write down the ID that is displayed in the title of the Application Diagram.

3. Open a web browser.
4. Determine the Intranet path to the Application URL. A URL example is:
http://192.168.1.9/ispring/Default!handler = Start&applicationID=460100
5. Specify the application ID number found in SubStep 2b as the last six digits of the URL.

The application created thus far is displayed.

Figure 32:
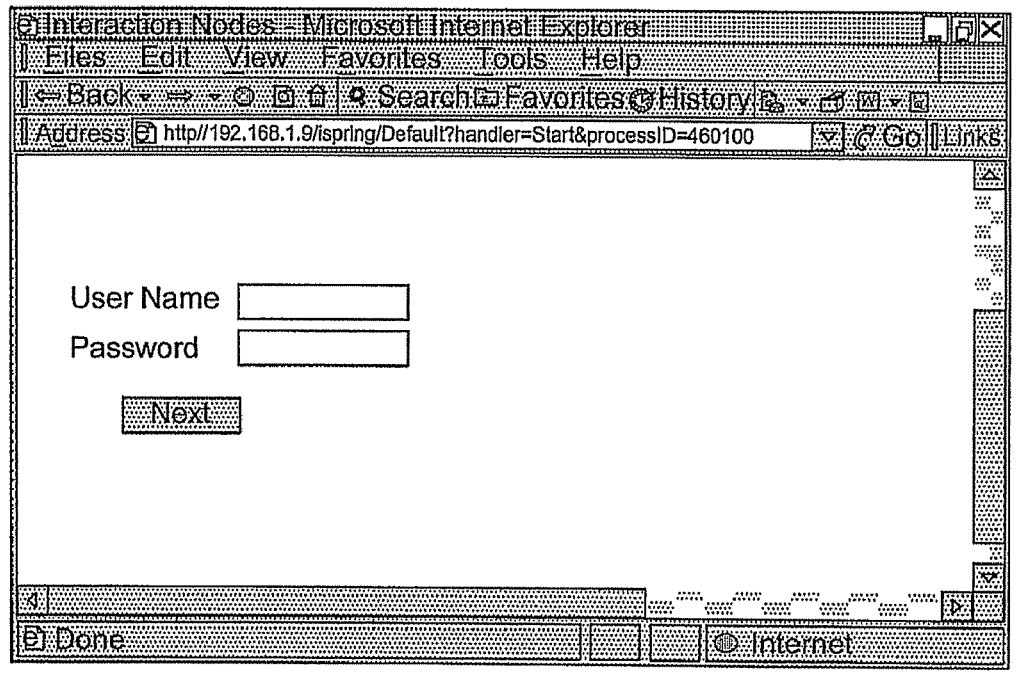
FIG. 32 is a screen shot of a log-in function URL with basic fields.

For the sample case, the two fields, User ID and Password, are displayed. See FIG. 32.

6. Once application the application, return to the Application Builder.

Defining the Database Information Used to Verify a Login

All records related to the login application are stored in a database. To access the information in the database, a selection is made from pre-defined database interfaces created for a login in the Interface Manager. The following steps describe how to define what database information will be compared to the user login information.

Figure 33:
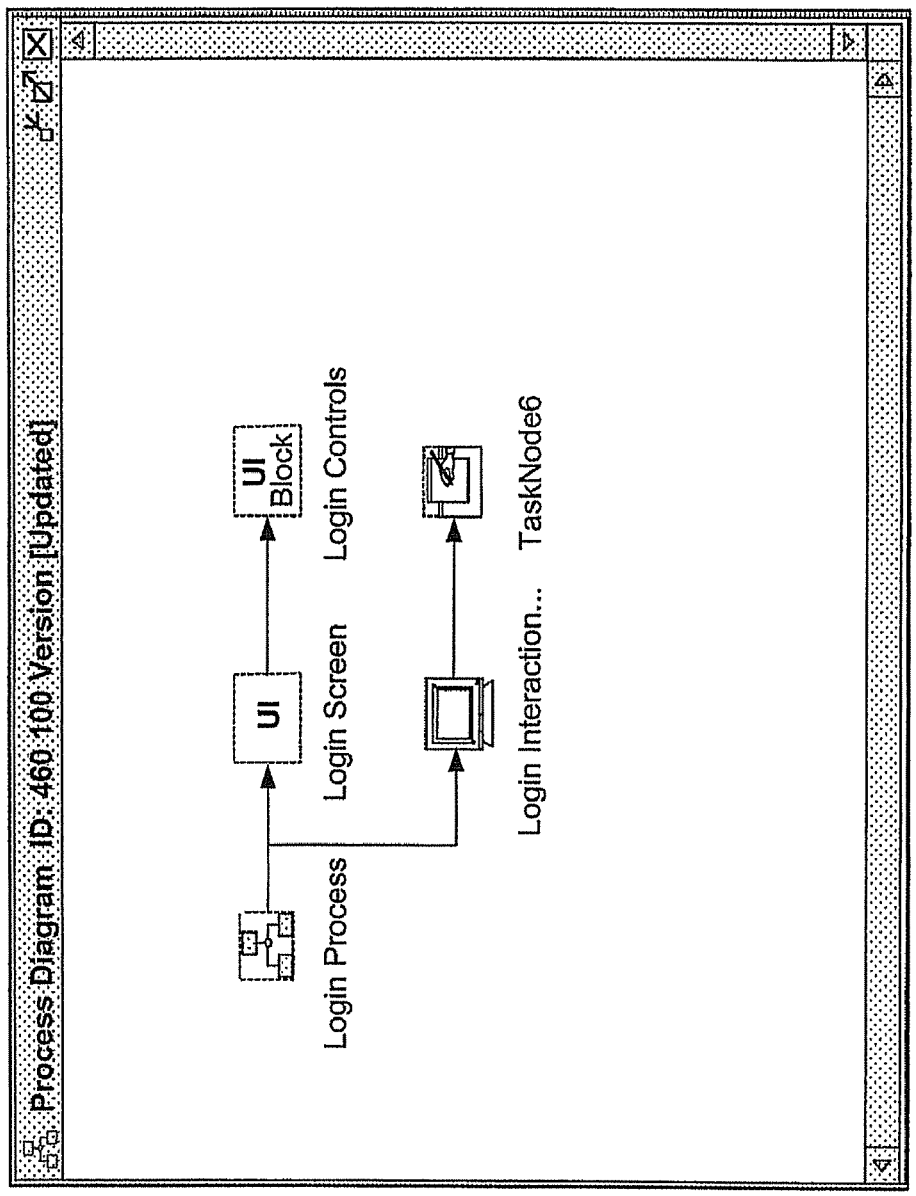
FIG. 33 is a screen shot of an example of a task node.

Step 1 Add a Task node.
1. Go to the Node Palette, if visible, or the selection of nodes displayed on the tool bar.
2. Add a Task Node to the Application Diagram.
Click on the Task node and drag it over the intended parent node. In the sample, the Interaction node, labeled Login Interaction, is the parent node. See FIG. 33.
3. Double-click on the Task node.
The Task node's properties dialog box is displayed.
4. Type a title and name for the new node.
The sample title is Verify Login, and the sample name is VerifyLogin
5. Click OK.

Figure 34:
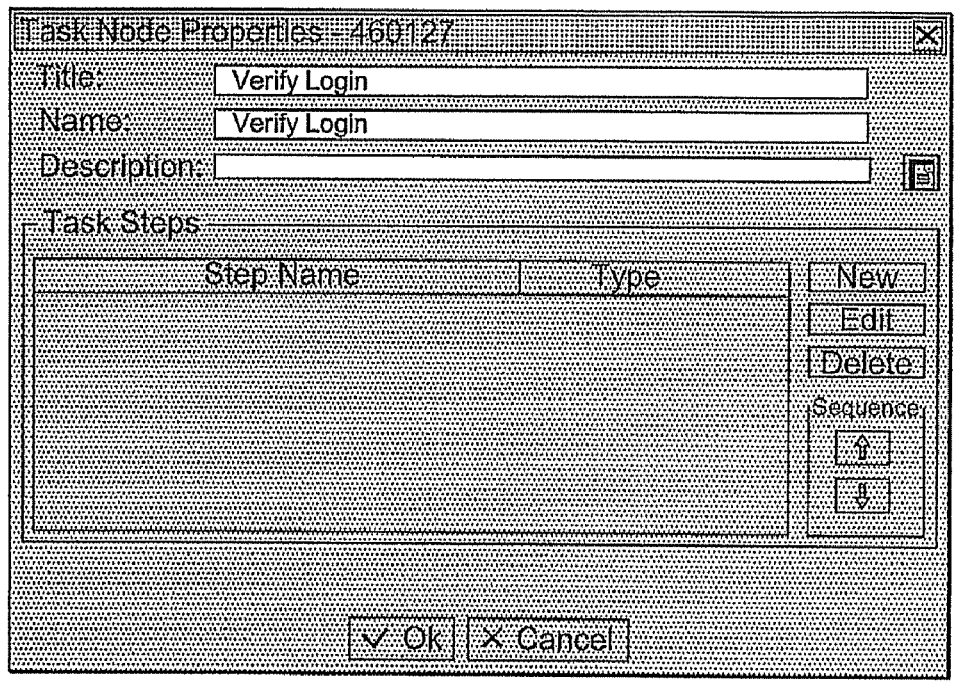
FIG. 34 is a screen shot of a task node properties.
Figure 35:
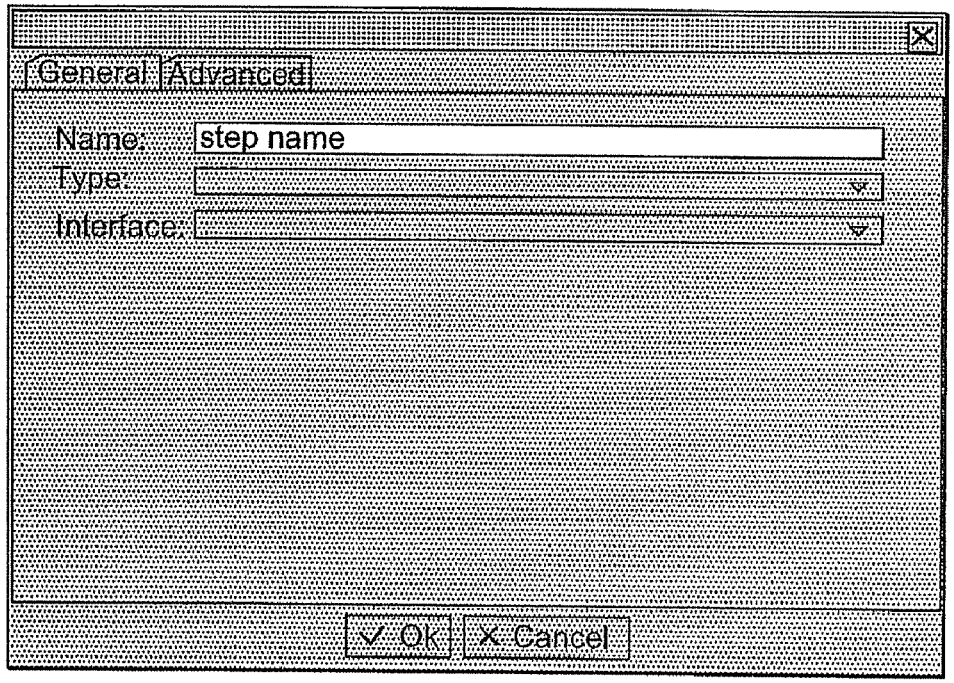
FIG. 35 is a screen shot of a step definition box.

Step 2 Add a Step to the Task node.
1. Display the Task node's properties dialog box.
Double-click on the Task node.
The Task node's properties dialog box is displayed. See FIG. 34.
2. Add a step.
A Task node can have as many steps as needed. The steps are applicationed in top down order.
Click New button.
The new step's definition box is displayed. See FIG. 35.

Figure 36:
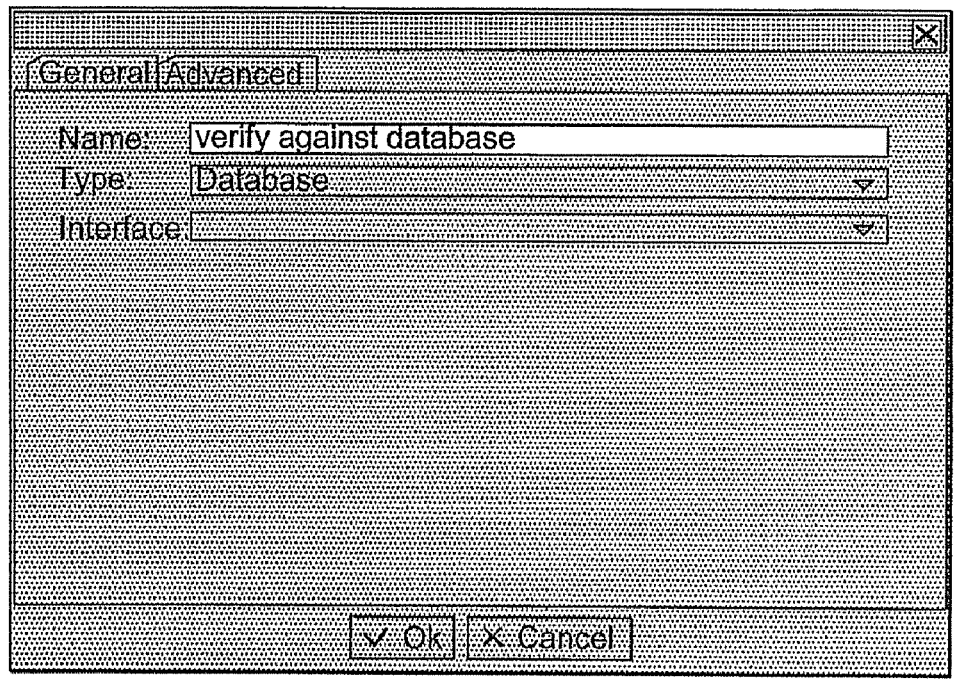
FIG. 36 is a screen shot for selecting a step function.

Step 3 Define the function of the step.
1. Type a name in the Name field.
For the sample case, Verify against database is used.
2. Select a function for the step.
Click on the Type drop down list and select from one of the choices.
For the sample case, Database is selected. See FIG. 36.
3. Select an interface.
Click on the Interface drop down list and select from one of the
For the sample case, MS Verify Login is selected.
Once an interface is selected, the Interface area will appear.

Figure 37:
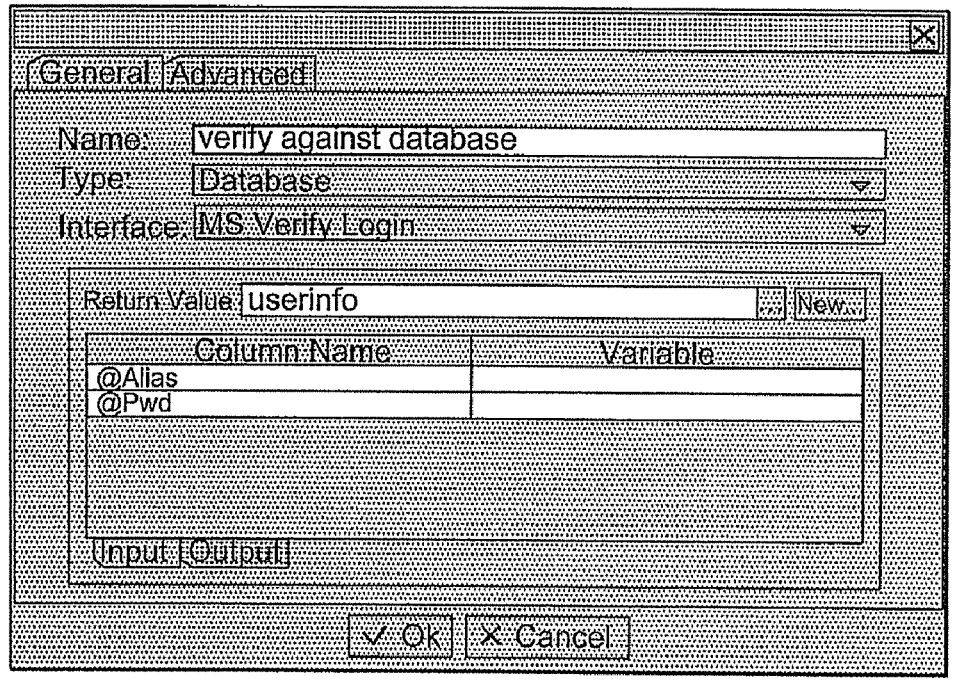
FIG. 37 is a screen shot illustrating database variable interface options.

Step 4 Create a DB List variable.
1. In the Interface area, click the New button.
A New Variable box is displayed.
2. Type a name for the new DB List variable.
For the sample case, the variable name is userinfo.
This name is displayed in the Return Value field. See FIG. 37.

Figure 38:
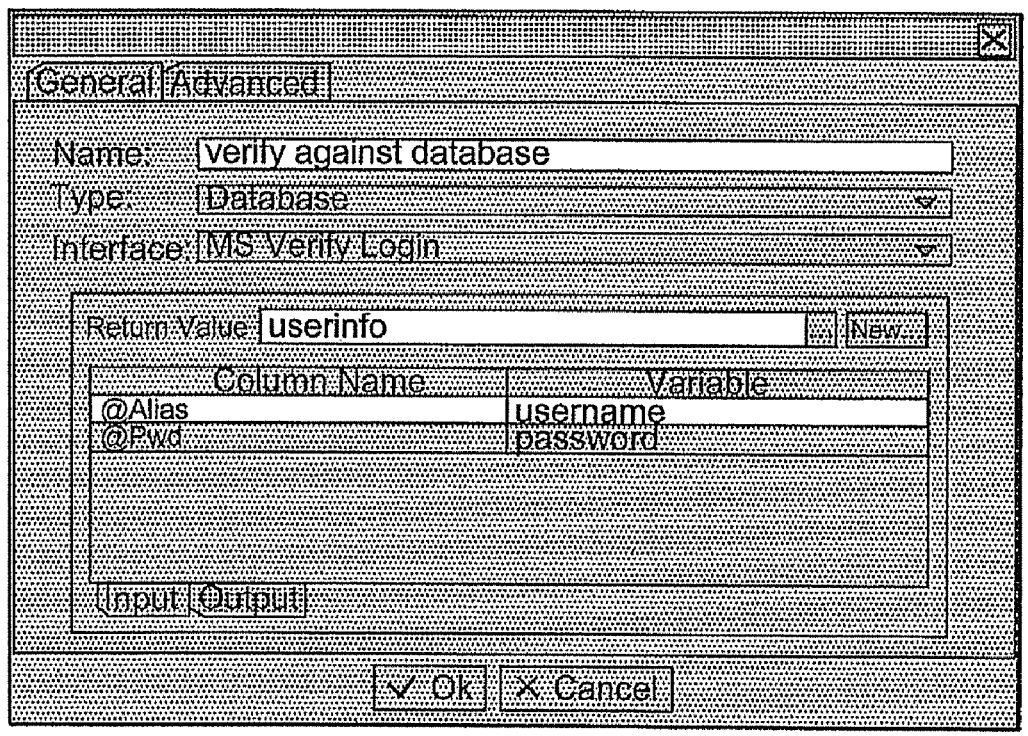
FIG. 38 is a screen shot illustrating mapping of database parameters.

3. Select a Return Value from the drop down list.
The Return Value is the predefined information that is returned from the database.
4. Enter Input and Output parameters, as needed.
The database interface set in the Interface field has it's own set of Input and Output requirements. These map to specific columns in the database records.
 a. Click on the Variable field for each Input and Output Column Name.
 A list of variables of matching type is displayed.
 b. Scroll through the list and select a variable.
 For the sample, the @Alias column name is mapped to the username variable, and @Pwd is mapped to the password variable. See FIG. 38.

Setting Up for a Message Response

For an iterative response with the user it is necessary to define additional variables and components that can be used as temporary containers for the iterative actions.

For the sample case, the following items must be created:
Variable—blank, String type.
Component—UserNotFound, String type.

To create the component, follow steps 4, 5, and 6 in the Defining Variables section above.

To create the variable, follow steps 1 and 2 under the Defining User Interaction section above. When defining fields in the Component box, General tab, select blank as the variable, and Label as the UI Type. Do not set property values for the component yet. Those will be set later in the Data node.

Setting Up a Condition

A decision node is used if it is desired for the application to proceed along a certain path only if selected conditions are met. Decision nodes are used to test for specific if/then conditions.

Figure 39:
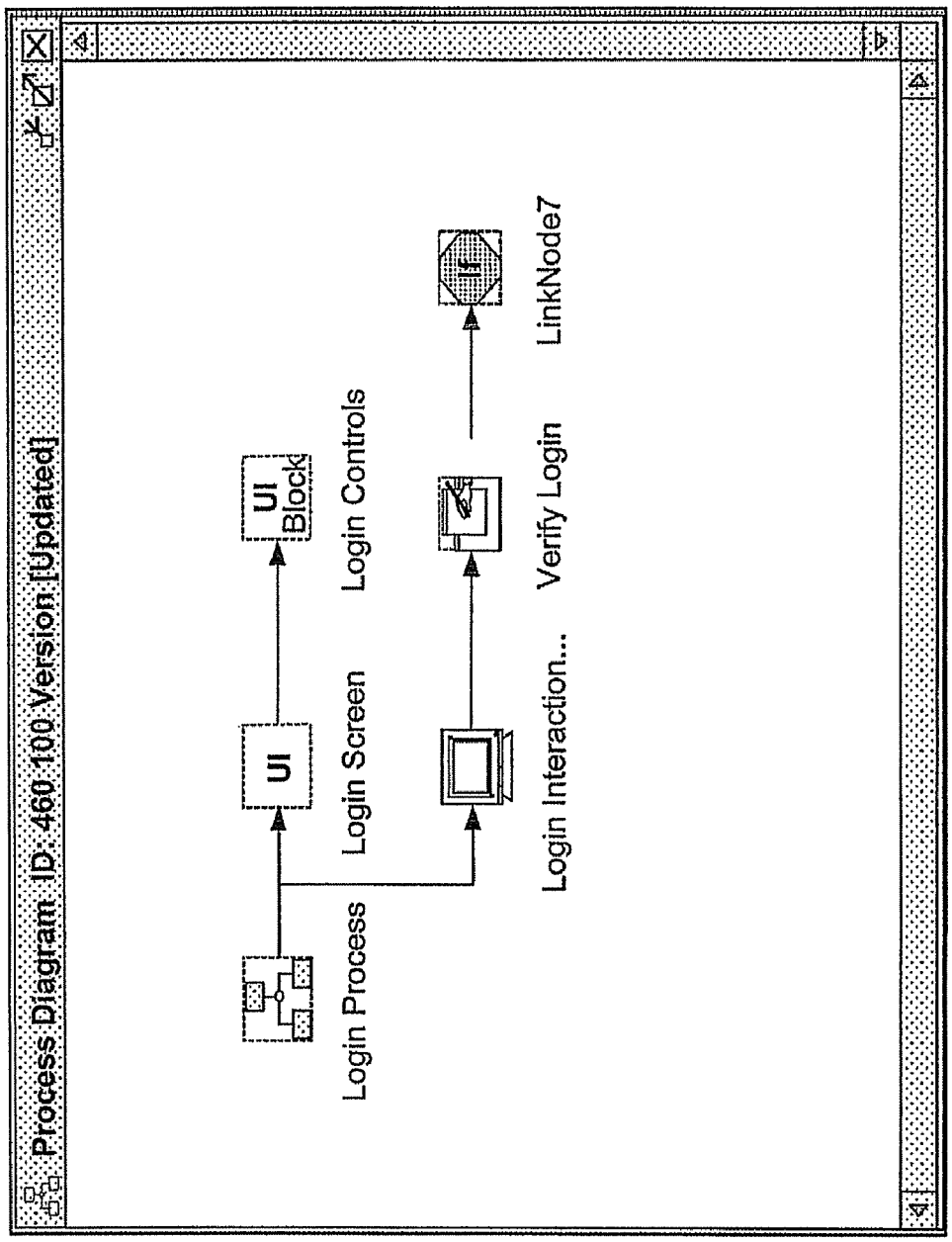
FIG. 39 is a screen shot of a decision node.

Step 1 Add a Decision node.
1. Go to the Node Palette, if visible, or the selection of nodes displayed on the tool bar.
2. Add a Decision node to the Application Diagram.
Click on the Decision node and drag it over the intended parent node. In the sample, the Task node, labeled Verify Login, is the parent node. See FIG. 39.
3. Double-click on the Decision node.
The Decision node's properties dialog box is displayed.
4. Type a title and name for the new node.
The sample title is Invalid User, and the sample name is Invaliduser.
5. Click OK.

Figure 40:
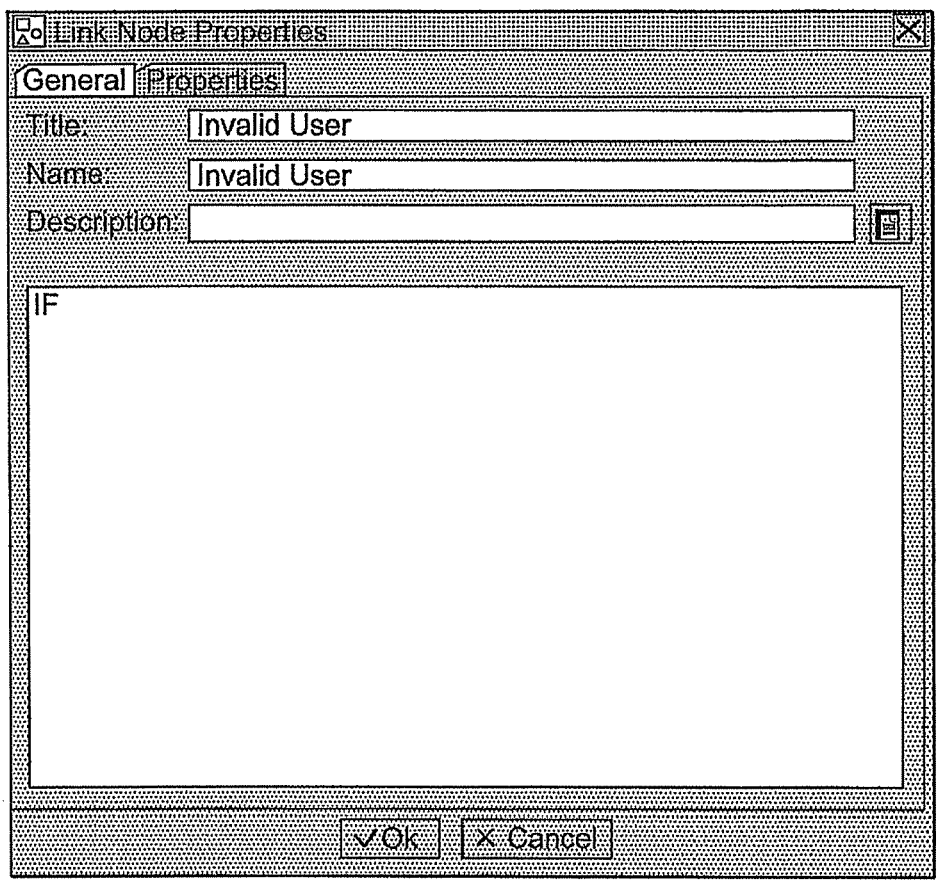
FIG. 40 is a screen shot of a dialog box for a decision node properties.
Figure 41:
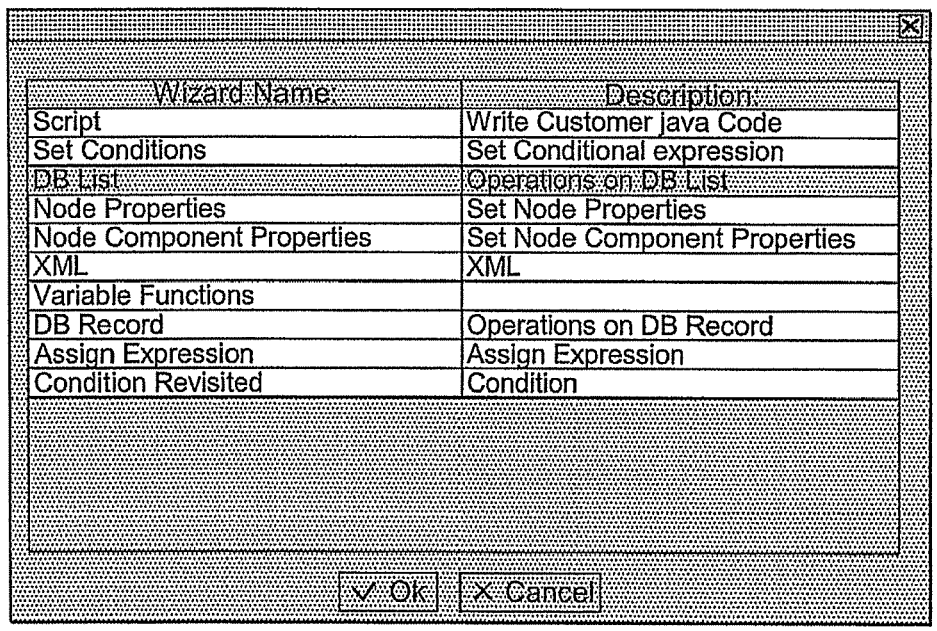
FIG. 41 is a screen shot of a list of functions available at a decision node.
Figure 42:
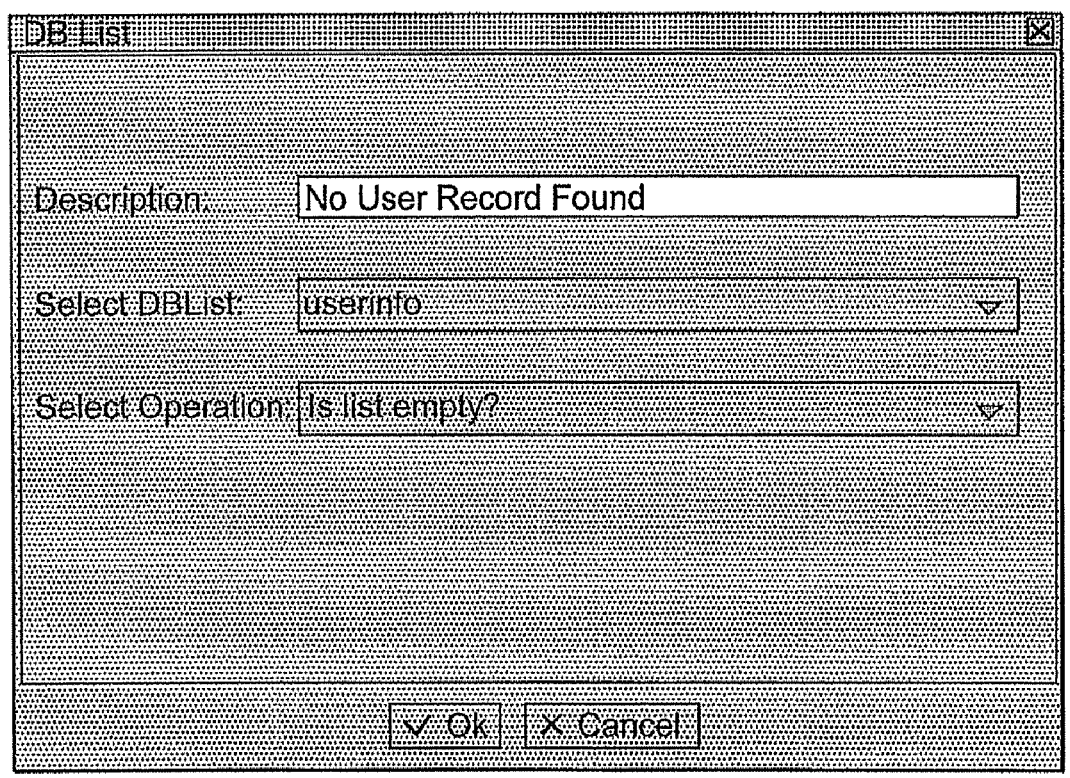
FIG. 42 is a screen shot of one of the functions of a DB list function.

Step 2 Define the Decision node conditions.
1. Open the Decision node's properties dialog box.
Double-click on the Decision node in the Application Diagram.
The Decision node's properties dialog box is displayed. See FIG. 40.
2. Right-click on the IF in the large text box.
A menu will appear with the options New and Expand Tree.
Select New.
Wizard box with a list of options is displayed. See FIG. 41. 10
3. Select one of the listed options.
For the sample case, DBList is selected.
The DBList's properties dialog box will appear. See FIG. 42.

Figures 43, 44:
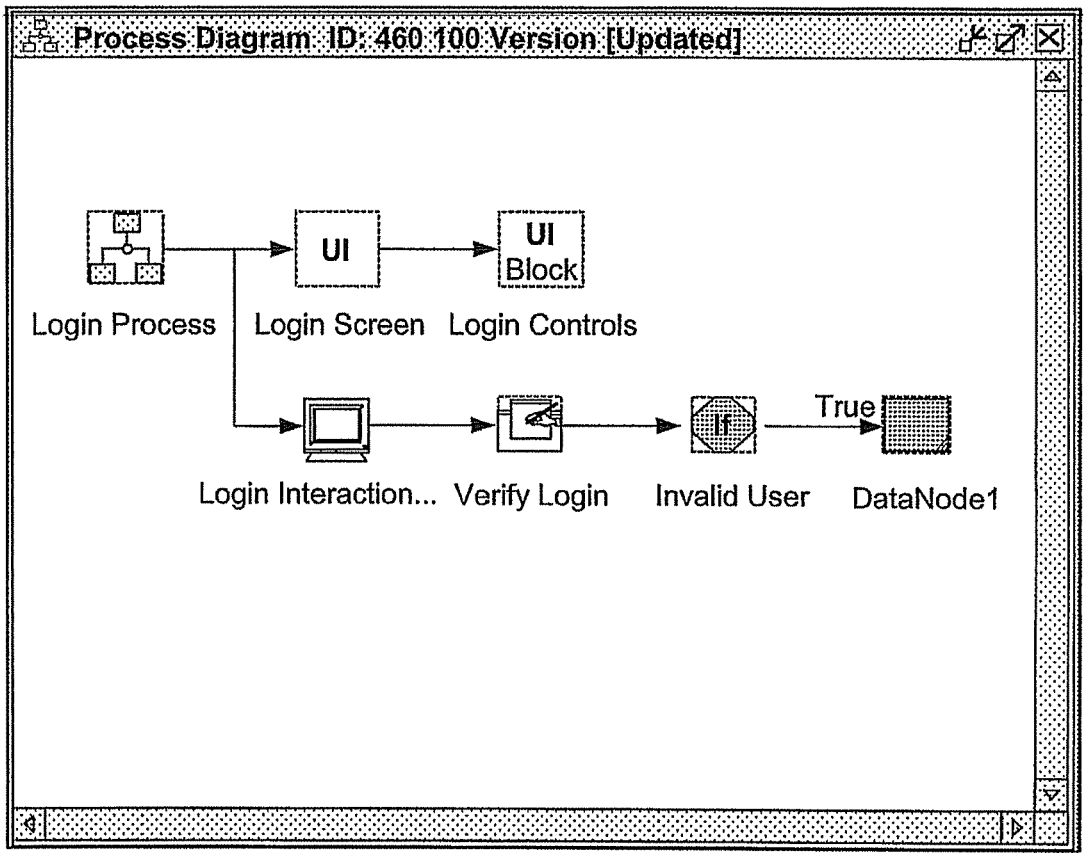
FIG. 43 is a screen shot of a data node.
FIG. 44 is a screen shot of a list of functions available at a data node.
Figure 45:
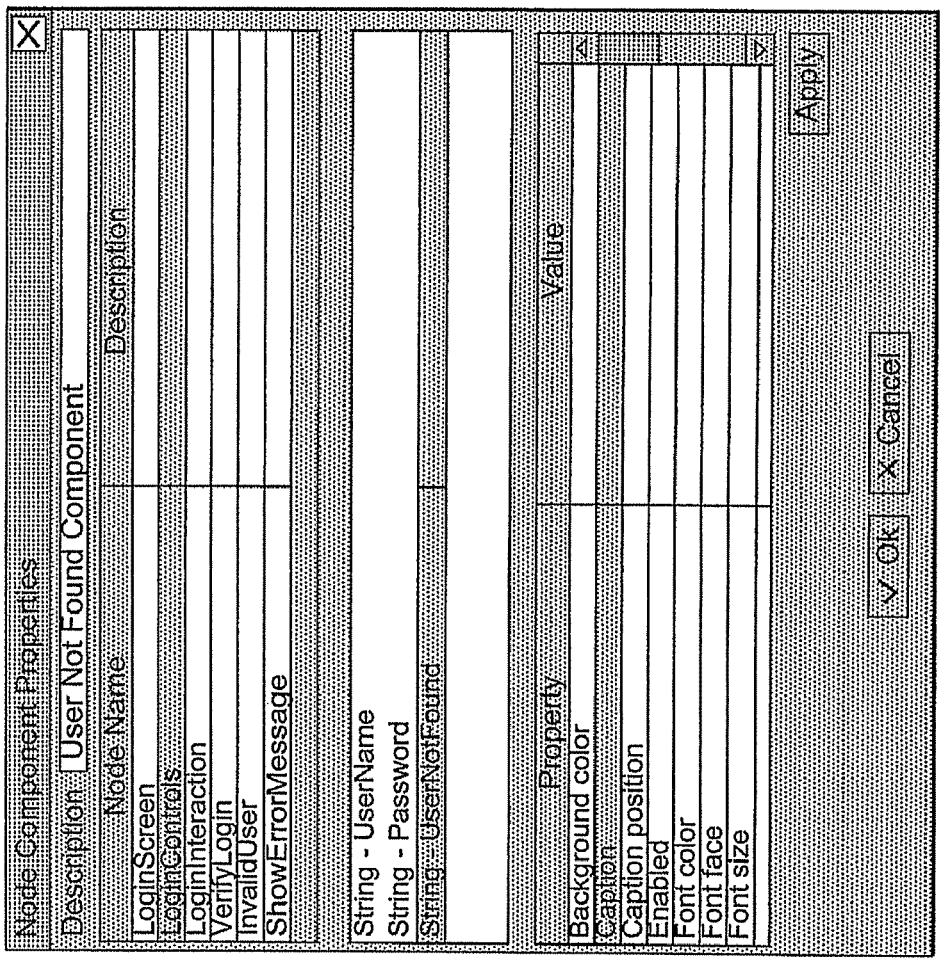
FIG. 45 is a screen shot illustrating node component function.

4. Enter a Description.
In the Description field. type a description of the condition.
For the sample case, No User Record Found is entered.
5. Select a DBList variable.
Under the click arrow in the Select DBList field is a list of variables that were created through the Task node.
Select one of the variables.
For the sample case, userinfo is selected.
6. Select an Operation.
Under the drop down list in the Select Operation field is a list of possible operations.
Select one of the Operations.
For the sample case, Is list empty? is selected.
7. Click OK
The conditions will appear in the Decision node's properties dialog box.
Once the condition is defined, the Data node is used to build expressions.
Step 1 Add a Data node.
1. Go to the Node Palette, if visible, or the selection of nodes displayed on the tool bar.
2. Add a Data node to the Application Diagram.
Click on the Data node and drag it over the intended parent node. In the sample, the Decision node, labeled Invalid User, is the parent node. See FIG. 43.
3. Double-click on the Data node.
The Data node's properties dialog box is displayed.
4. Type a title and name for the new node.
The sample title is Show Error Message, and the sample name is ShowErrorMessage.
5. Click OK.
Step 2 Define the Data node.
1. Open the Data node's properties dialog box.
Double-click on the Data node in the Application Diagram.
The Data node's properties dialog box is displayed.
2. Create Rules for the Data node.
  a. Click New in the Rules Definition box.
  The Wizard box is displayed. See FIG. 44.
  b. Select a Wizard.
  Click on the appropriate Wizard and click OK.
  For the Sample case, Node Components Properties is selected.
  c. The Node Components Properties dialog box is displayed. See FIG. 45.
3. Enter a description.
In the Description field, type an appropriate description for the rule.
For the sample case, User Not Found Component is entered as the description.
Step 3 Map the component to the Data node.
1. Map the rule to the User Interface Block node
Click on a User Interface Block node in the Node Name field.
2. Select a component.
Click on a component name.
For the sample case, String-UserNotFound is selected.
3. Define the properties of the component.
  a. Enter text for the Caption property.
For the sample case, Incorrect User Name or Password is entered.
  b. Select a value for the Visible property.
For the sample case, true is selected from the drop down list.
  c. Click Apply.
The component property values are set.
  d. Click OK.
returned to the Data node's properties dialog box.

4. Check the new rule.
In the Data node's properties dialog box, click Check.
This verifies that the rule has been defined correctly.

Defining a Loop

Figure 46:
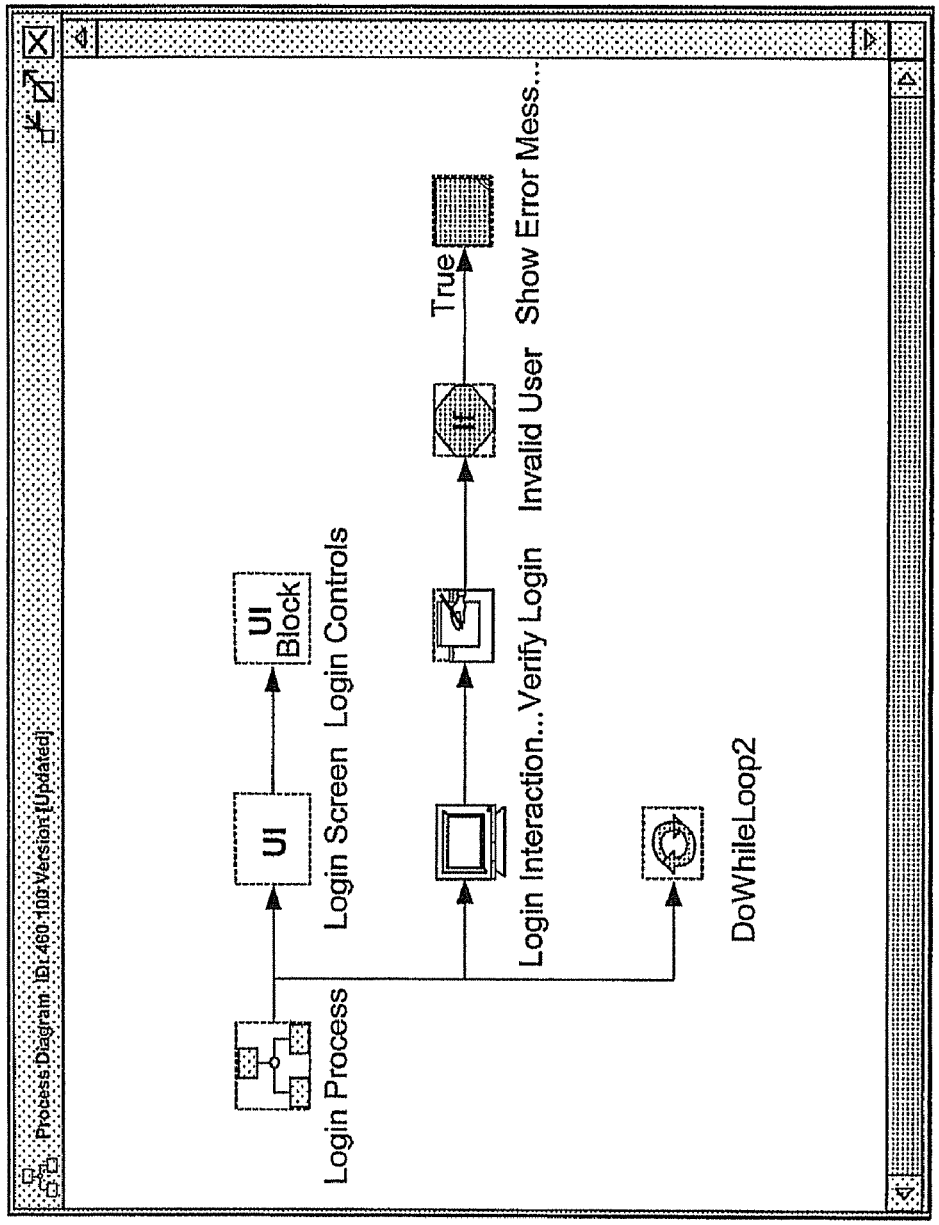
FIG. 46 is a screen shot of a do while loop node.
Figure 47:
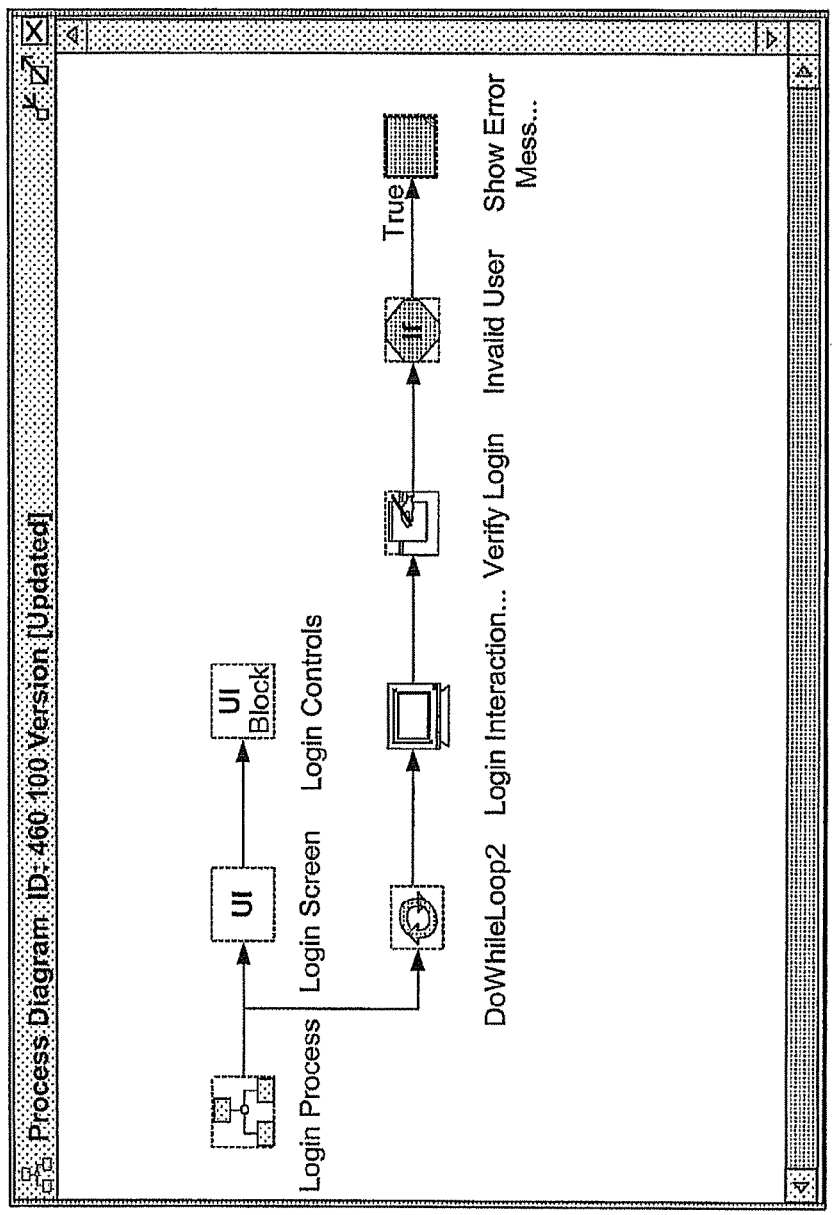
FIG. 47 is a screen shot of a loop application process.
Figure 48:
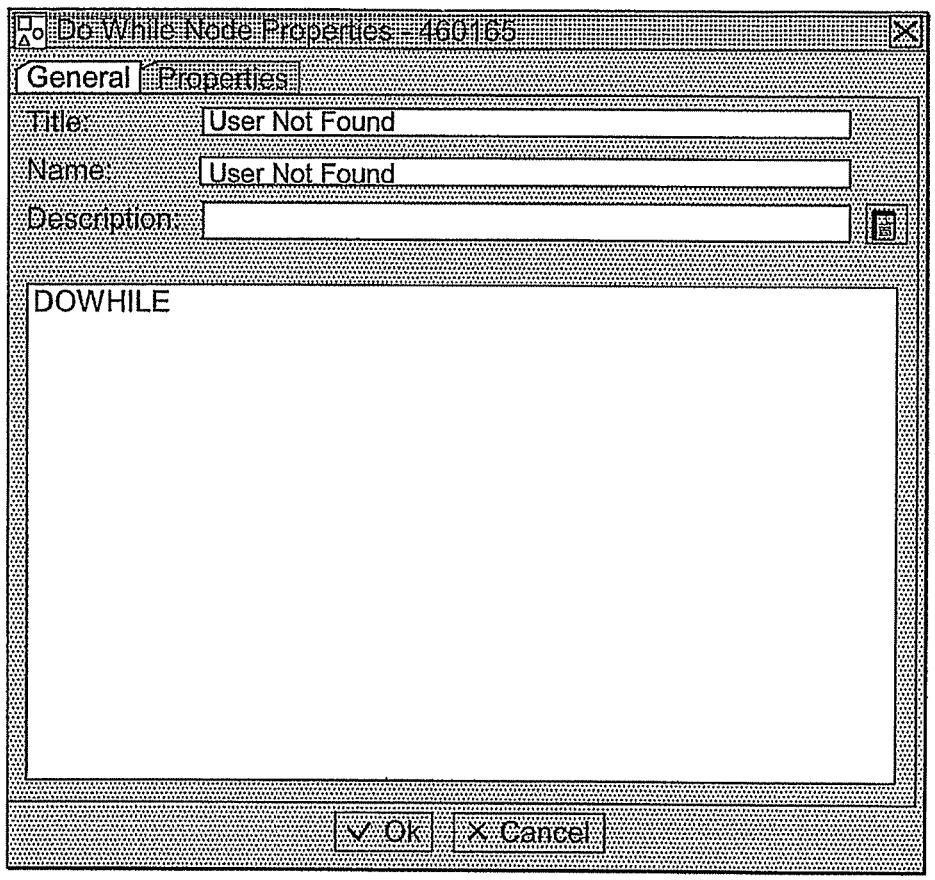
FIG. 48 is a screen shot of a do while loop node's properties.

Loops are a series of repeated steps. The beginning of a loop is specified as the last node a application runs before returning to an earlier part of the application. The point where it is desired for the application to return is the node that will have the loop node as its parent node.
Step 1 Add a Loop node.
1. Select a type of Loop node.
There are two types of loop nodes: While and Do While. For applications that require that the condition be checked before the loop begins, choose the While Loop. If it is desired that the condition is not 30 checked until after the first loop, choose the Do While Loop.
For the sample case, the Do While Loop is selected.
2. Go to the Node Palette, if visible, or the selection of nodes displayed on the tool bar.
3. Add a Do While Loop node to the Application Diagram.
  a. Drag the Do While Loop node over the intended parent node. In the sample, the Application node, labeled Login Application, is the parent node.
The Do While Loop node will appear on a lower branch. See FIG. 46.
  b. Move the branch that will place the nodes in the loop application into the position of the Do While Loop node's children.
    i. Copy the branch.
    Right-click on the node to be placed immediately after the Do While Loop node and select Copy Branch.
    For the sample case, the branch is copied from the Interaction node.
    ii. Paste the branch.
    Right-click on the Do While Loop node and select Paste.
    The copied branch will appear.
    iii. Remove the old branch.
    Right-click on the node copied the branch from and select Delete. When the query is posed to delete the node and all of its children. Select OK.
    For the sample case, delete from the old Interaction node.
    The application now contains a loop application. See FIG. 47.
    iv. Reactivate the User Interface node in the Interaction node.
    In the Interaction node's properties dialog box, select the User Interface node and click Add.
    The user interface properties have been reactivated.
4. Double-click on the Do While Loop node.
The Do While loop's properties dialog box is displayed.
5. Type a title and name for the new node.
The sample title is User Not Found, and the sample name is UserNotFound.
6. Click OK.
Step 2 Define the Do While Loop node's conditions.
1. Open the Do While Loop node's properties dialog\ box.
Double-click on the Do While Loop node in the Application Diagram.
The Do While Loop node's properties dialog box is displayed. See FIG. 48.

Figure 49:
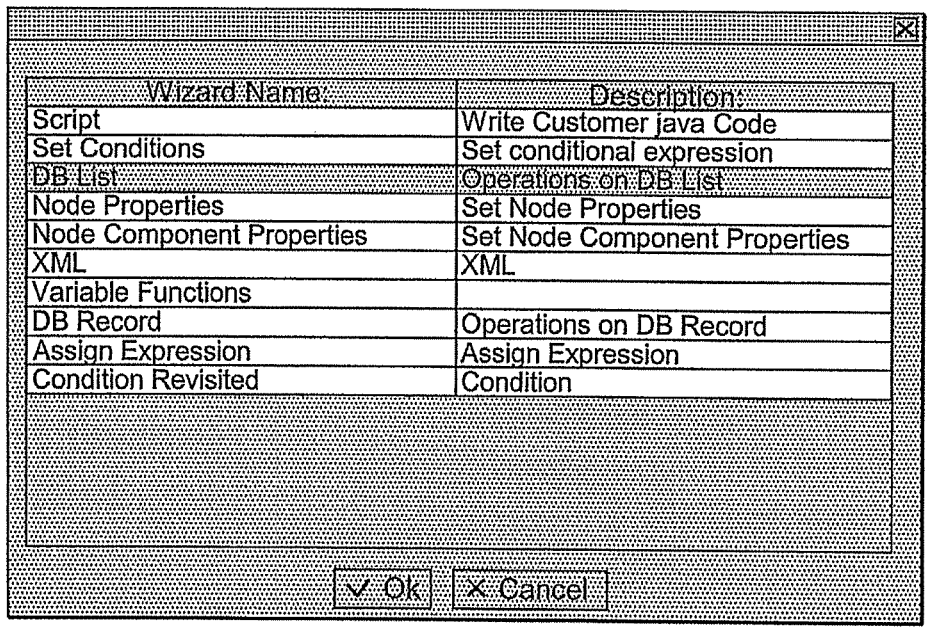
FIG. 49 is a list of the do while loop node's functions available.
Figure 50:
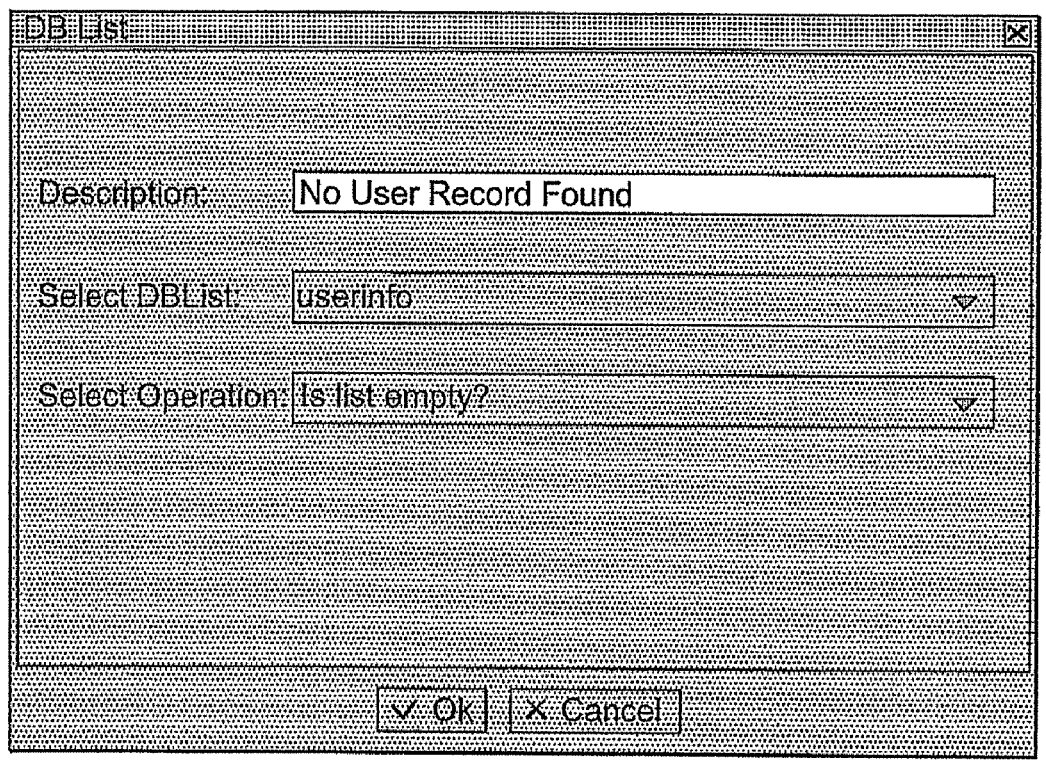
FIG. 50 is a screen shot of a DB list functions available at the do while loop node.

2. Right-click on the DO WHILE in the large text box.
A menu will be displayed with the options New and Expand Tree.
Select New.
A Wizard box with a list of options is displayed. See FIG. 49.
3. Select one of the listed options.
For the sample case, DBList is selected.
The DBList's properties dialog box will appear. See FIG. 50.
4. Enter a description.
In the Description field, type a description of the condition.
For the sample case, No Record Found is entered.
5. Select a DBList variable.
Under the drop down list in the Select DBList field is a list of variables that were created through the Task Node.
Select one of the variables.
For the sample case, userinfo is selected.
6. Select an Operation.
Under the click arrow in the Select Operation field is a list of possible operations.
Select one of the Operations.
For the sample case, Is list empty? is selected.
7. Click OK.
The conditions will appear in the Do While Loop node's properties dialog box.

Saving the Application

Figure 51:
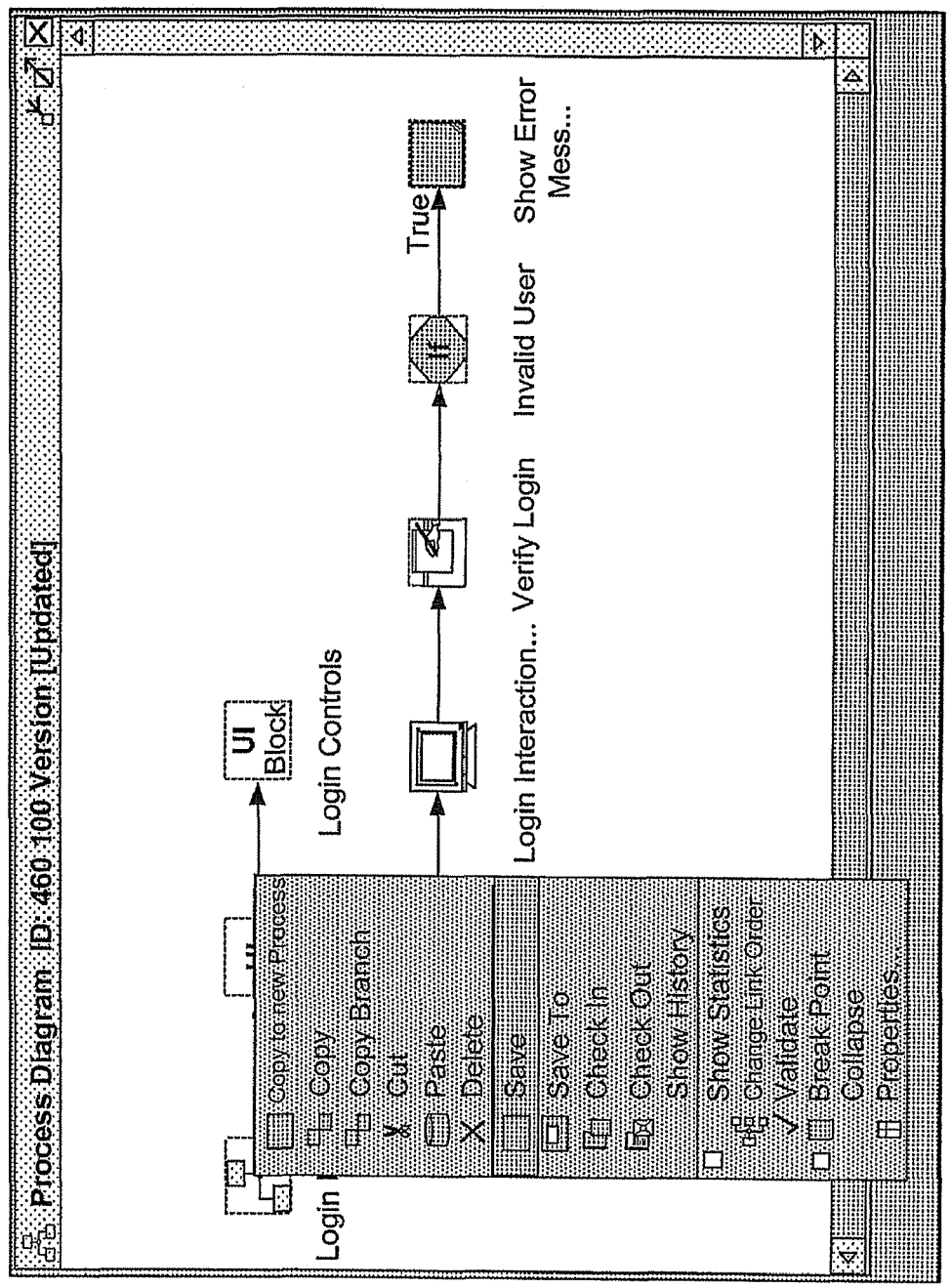
FIG. 51 is a screen shot of an application node menu.

At a few points while building the application, the application was saved. Once the application is completed, save it again.
Step 1 Save the application.
  1. Complete the application.
    a. Right-click on the Application node.
    For the sample case, the Application node is labeled Login application.
    The Application node menu is displayed. See FIG. 51.
    b. Select Save.
  2. Find the Application node's ID.
Write down the ID that is displayed in the title of the Application Diagram.

Testing the Application

Figure 52:
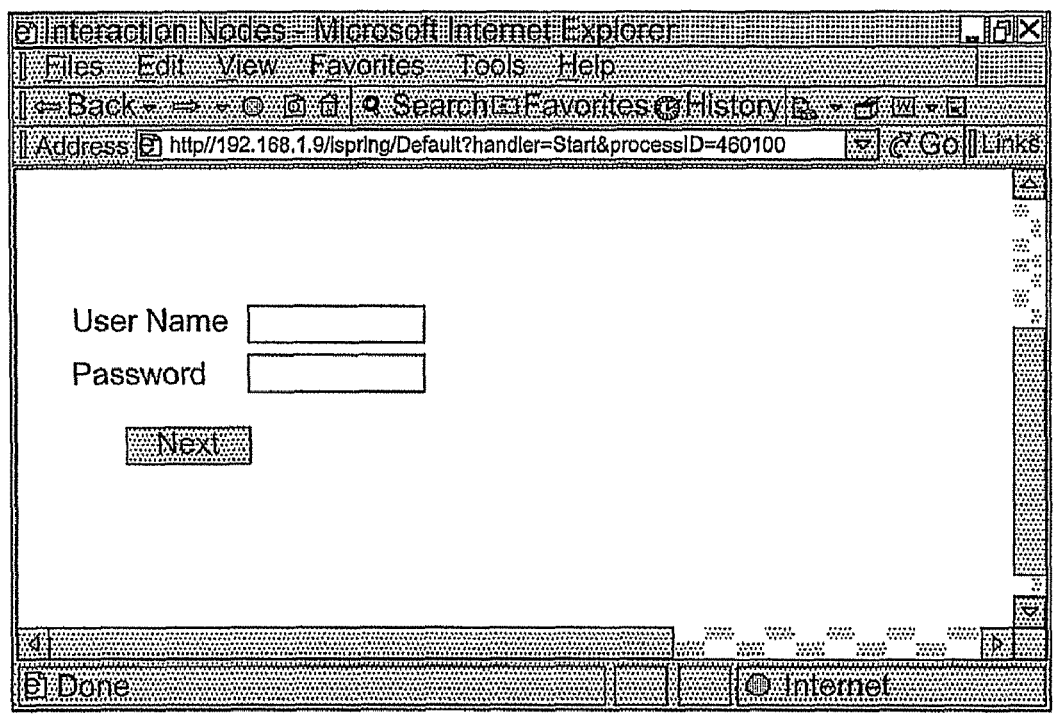
FIG. 52 is a screen shot of basic fields in the login process.

Once the application is completed and saved, test it to be sure it is functioning correctly.
Step 1 Verify the application display on the website.
  1. Open a web browser.
  2. Determine the Intranet path to the Smart eBusiness URL.
  A URL example is:
  http://192.168.1.9/ispring/
    Default?handler=Start&applicationID=460100
  3. Specify the application ID number found in SubStep 2b as the last six digits of the URL.
  The web page for the application created is displayed.
  For the sample case, the two fields User ID and Password are. displayed. See FIG. 52.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "architecture," "engine," "structure," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 53:
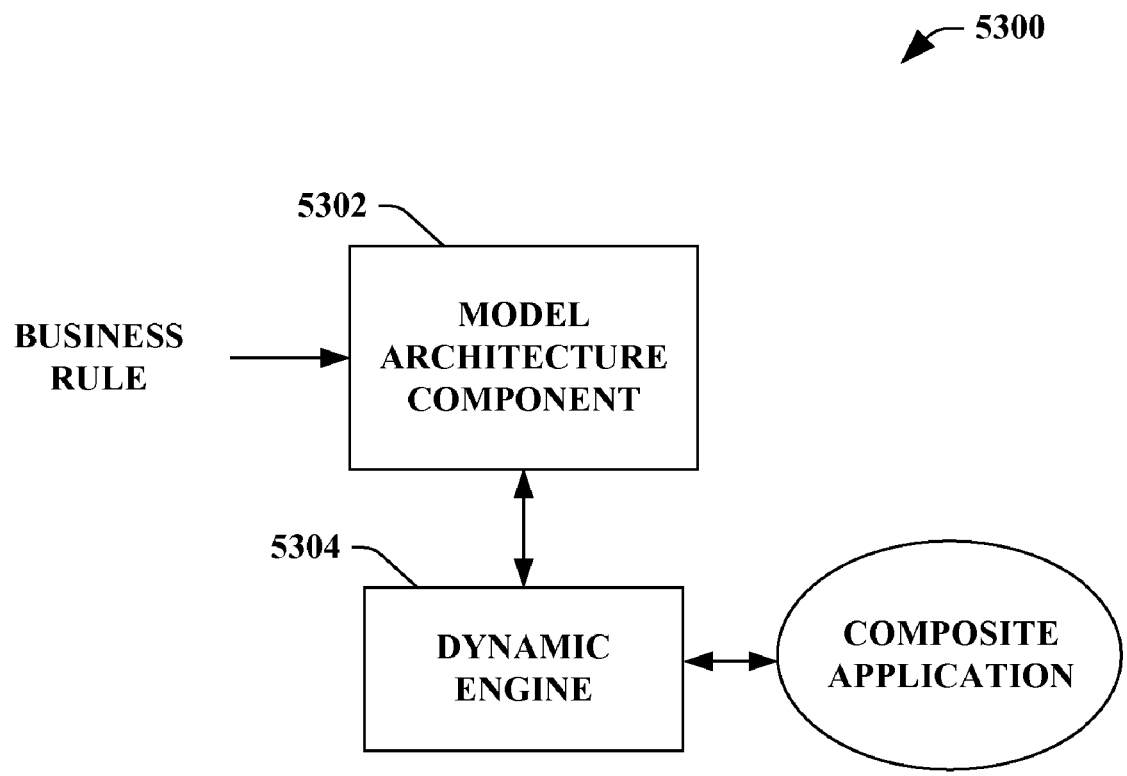
FIG. 53 illustrates a block diagram of an exemplary system that facilitates automatically generating a composite application based on a business rule utilizing a hierarchically structured architecture to optimize process flow.

Now turning to the figures, FIG. 53 illustrates a system 5300 that facilitates automatically generating a composite application based on a business rule utilizing a hierarchically structured architecture to optimize process flow. The system 5300 can include a model architecture component 5302 that can represent a business rule with at least one node structure, wherein the node structure can formulate the business rule and ensure a separation of aesthetics and functionalities associated with a composite application. Based on the node structure that corresponds to the business rule, a dynamic engine 5304 can process such structure in order to automatically create the composite application such that a process workflow of the composite application can be extended by the business rule node representation. Thus, by utilizing at least one node, a business rule can be implemented to automatically create the composite application without any particular custom programming and/or manipulation other than utilizing a node configuration and/or structure.

It is to be appreciated that the model architecture component 5302 can provide the clustering of nodes to formulate the business rule while providing a visual layout of the workflow and/or composite application. In addition, the dynamic engine 5304 can process such created clustering of nodes to perform a process, wherein a plurality of processes can be strung together in order to automatically compose a complex and/or composite application (e.g., business applications, a web page, a document, an electronic mail message, an electronic document, a hypertext markup language (HTML) document, a complex interactive web site, etc.). Additionally, it is to be appreciated that the business rule can be represented with at least one node by a user, automatically based on machine analysis, and/or any combination thereof.

In particular, the model architecture component 5302 can utilize a depth-first execution (DFE) approach that allows complex processes and user interfaces to be created without any specific and/or custom programming Moreover, the dynamic engine 5304 can utilize proprietary algorithms for code generation, user interface creation, and process execution to further facilitate eliminating the need for custom programming in creating composite applications. Thus, the system 5300 can provide flexibility of function and orchestration of processes utilizing a pre-defined business rule that can be represented by at least one node.

The DFE approach can provide complex business processes to be implemented in a manner that is optimized by eliminating a majority of edges related to the McCabe cyclomatic complexity. In particular, a supplier selection process can include 34 nodes and 5 loops. Utilizing the McCabe cyclomatic complexity formula, complexity can be ascertained by the following: Edges−Nodes+2p. Utilizing conventional techniques (e.g., sequential flowchart process), there are 53 Edges−34 Nodes+2=21, which is a complex and high risk process. Yet, utilizing a DFE approach, there are 38 Edges−34 Nodes+2=6, which is a simple, no risk process. Furthermore, the dynamic engine 5304 can provide an optimized rule execution based on the hierarchically structured nodes that mimic the business rule. For example, a sample rule can be "If no response from supplier, Then analyze previous response and If response rate>95%, Then allow 8 more hours." Utilizing conventional rules execution, there is no possible manner to define such a rule as illustrated by the following:

| If no response Then analyze previous |
| Else If . . . Then |
| Else . . . |

However, utilizing the DFE approach with the model architecture component 5302 and the dynamic engine 5304, definition is simple, optimized, and extremely efficient as illustrated by the following:

| If no response Then |
| Analyze previous |
| If>95% Then more hours |

Moreover, the system 5300 can include any suitable and/or necessary interface component (not shown and discussed infra), which provides various adapters, connectors, channels, communication paths, etc. to integrate the model architecture component 5302 and/or the dynamic engine 5304 into virtually any operating and/or database system(s). In addition, the interface component can provide various adapters, connectors, channels, communication paths, etc., that provide for interaction with the model architecture component 5302, the dynamic engine 5304, the composite application, and any other device, user, and/or component associated with the system 5300.

It is to be appreciated that implementing the above system 5300 can provide numerous benefits and/or advantages over conventional techniques, systems, and/or methods. The model architecture component 5302 can provide a unique combination of at least one of the following: zero compilation of software; a visual layout of logic and presentation in lieu of programming; isolation of rules from logic or processes; DFE for rules and processes (discussed infra); versatility and power of the family of nodes utilized to build a process; DFE ensures feasible depiction of complex rules and processes; complex long running processes; and orchestration of complex, long-running processes.

Moreover, the system 5300 allows rules that can be extended as events and events that can be employed as processes, wherein a plurality of processes can be combined to create an orchestration of complex, long running processes. For instance, the following can be implemented by the system 5300 (and is discussed in more detail in FIG. 63):

| Process | Event | Rule |
| Process | Event | Rule |
| Process | Event | Rule |
| Process | Event | Rule |
| Process | Event | Rule |
| Process | Event | Rule |
| . . . | . . . | . . . → Orchestration. |

Figure 54:
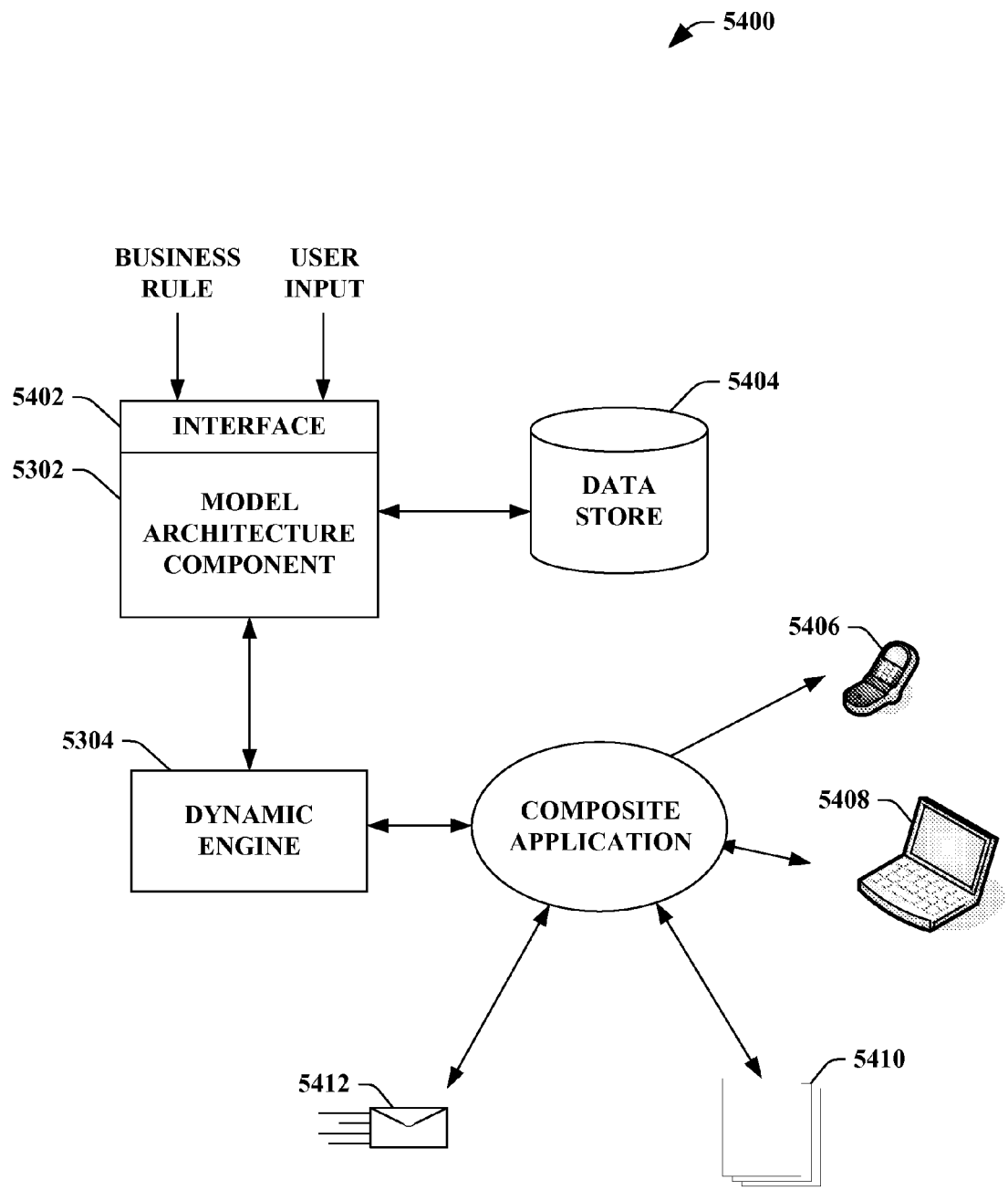
FIG. 54 illustrates a block diagram of an exemplary system that facilitates employing a dynamic complex application accessible via a plurality of devices based on a business rule represented by a collection of node structures.

FIG. 54 illustrates a system 5400 that facilitates employing a dynamic complex application accessible via a plurality of devices based on a business rule represented by a collection of node structures. The system 5400 can include an interface (discussed supra) that can receive at least one of a user input and/or a business rule. For example, a user can utilize the model architecture component 5302 to select particular nodes to correlate and represent a business rule and/or create a business rule. In particular, the model architecture component 5302 can provide a plurality of nodes that can be clustered in order to initiate a particular process, wherein a plurality of processes can be stringed together to implement a composite application. In another example, the interface can receive a business rule, wherein the model architecture component 5302 can automatically represent such business rule with at least one node. It is to be appreciated and understood that the model architecture component 5302 and/or the dynamic engine 5304 can employ specific restraints in order to create and/or process the hierarchical node structure that represents a business rule. Thus, the dynamic engine 5304 can process the node structure in accordance with the hierarchically structured nodes that relate to the business rule.

The system 5400 can further include a data store 5404 that can include any suitable data related to the system 5400. For example, the data store 5404 can include any suitable node related data such as, but not limited to, a collection of template node(s), a node, a node property, a template representing a particular process comprising of at least one node, a business rule, a node structure that correlates to a business rule, a pallet of nodes that can be strung together to create a process, a pre-defined node, a particular functionality employed by at least one node, a user-defined node, a model architecture, a depth-first execution (DFE) approach, a execution flow of a hierarchical node structure, a user interface, a visual layout of a node pallet, a user interface to employ creation of a composite application utilizing a node pallet, a node execution sequence and/or rule, and/or any other suitable data that can be associated with the system 5400.

It is to be appreciated that the data store 5404 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 5404 of the subject systems and methods is intended to comprise, without being limited to, these and any other suitable types of memory. In addition, it is to be appreciated that the data store 5404 can be a server, a database, a hard drive, and the like.

The composite application can be distributed to any entity, target, user, system, data store, database, component, machine, etc. For instance, the composite application can be distributed and/or utilized as a report, wherein the report can be documents (e.g. HTML, word processing documents, print outs, hard-copies, soft-copies, etc.). In another example, the composite application can be utilized and/or distributed to a portable device 5406. It is to be appreciated that the portable device 5406 can be a mobile communication device, a cellular phone, a portable digital assistant (PDA), a messenger device, a smartphone, etc. In another example, the composite application can be distributed and/or utilized by a computer 5408, wherein the computer 5408 can be a laptop, a desktop, a portable computer, a tablet pc, a pocket pc, a portable digital assistant (PDA), and the like. In addition, the composite application can be distributed and/or utilized as an electronic document 5410 (e.g., node structure, hierarchical structure, node definition, business rule details, etc.). In still another example, the composite application can be distributed via email 5412 to various recipients and/or users.

Figure 55:
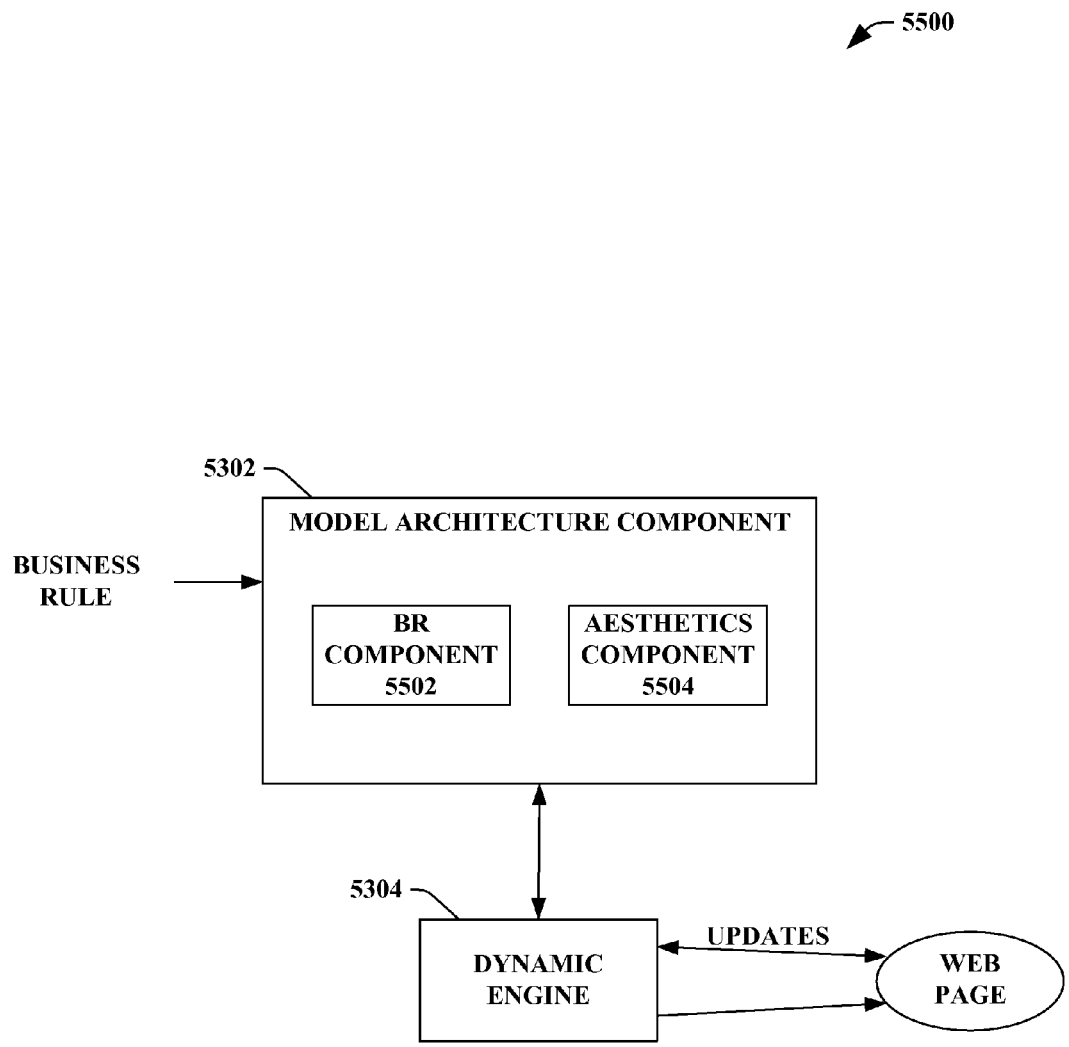
FIG. 55 illustrates a block diagram of an exemplary system that facilitates creating a dynamic and composite application based on a node representation of a business rule that separates aesthetics of the composite application and business logic associated therewith.

FIG. 55 illustrates a system 5500 that facilitates creating a dynamic and composite application based on a node representation of a business rule that separates aesthetics of the composite application and business logic associated therewith. The model architecture component 5302 can automatically generate a composite application (e.g. a web page, a web site, an HTML document, etc.) that can be dynamically updated, wherein such composite application can be created based on a business rule without any customized programming. In one example, a user can selectively compile at least one node to perform a process based on a business rule such that the compilation of nodes can be in compliance with the DFE approach (e.g. separation of aesthetics and functionality, implementing a particular execution process for a particular node structure, utilizing a node structure to represent a business rule, etc.). It is to be appreciated that the composite application can be dynamically updated in real-time based at least in part upon a manipulation and/or change to a portion of a node within a node cluster that represents a portion of a business rule (e.g. including dynamic and/or loose coupling). Thus, updates can be provided to a web page while such web page is online when a portion of a node is changed and/or enhanced. In other words, down-time is significantly reduced and essentially eliminated when updated a composite application such as a web site during events such as, but not limited to, adding functionality, changing aesthetics, updating inventory, adding data, etc.

The model architecture component 5302 can include a business rules (BR) component 5502 that facilitates representation of a business rule with at least a portion of a node. The BR component 5502 can analyze any received data (e.g. a user input, a business rule, a proposed functionality, etc.) to provide a node structure that correlates to such data. For instance, a user can desire checkout functionality for a web page. The BR component 5502 can analyze such data and respectively provide a collection of nodes that can initiate such functionality (e.g., wherein the checkout functionality can be broken down into smaller processes with the smallest unit being a node). In another example, a user can select particular nodes (e.g., from a number of pre-defined nodes, each with specific characteristics and properties) to perform a process, wherein such process relates to a business rule and/or workflow.

The model architecture component 5302 can further include an aesthetics component 5504 that provides any aesthetic data associated with the composite application. In particular, the aesthetics component 5504 can receive any data associated with aesthetic needs (e.g., user defined, user inputs, user history, default settings, etc.) and employ such needs to the composite application via a user interface (UI). Specifically, a collection of UI nodes can be utilized wherein each node can include characteristics, situational state and business state settings that can be dynamically selected based upon a user preference, company preference, and the like. In other words, there are nodes associated with functionality and disparate nodes that relate to user interfaces and other aesthetics such that a composite application can distinctly separate functionality and aesthetics. However, it is to be appreciated that the functionality is at the core of automatically creating the composite application (e.g., web page), while the aesthetics can be various "skins" applied therewith.

For instance, a first company can utilize the system 5500 to create a web page based on a particular business rule and have a first set of aesthetic features associated therewith (e.g., user interface colors, graphics, pull-down menus, open-field text boxes, etc.). Yet, a second component can utilize the system 5500 to create a web page based on the same particular business rule and a have a second set of aesthetic features completely disparate in comparison to the first company. In other words, the functionality of the web page can be substantially similar based on the employment of a comparable business rule (represented by at least one node), yet the node structure and properties can be manipulated to provide a specific look and/or feel to the particular company, user, client, and the like.

Figure 56:
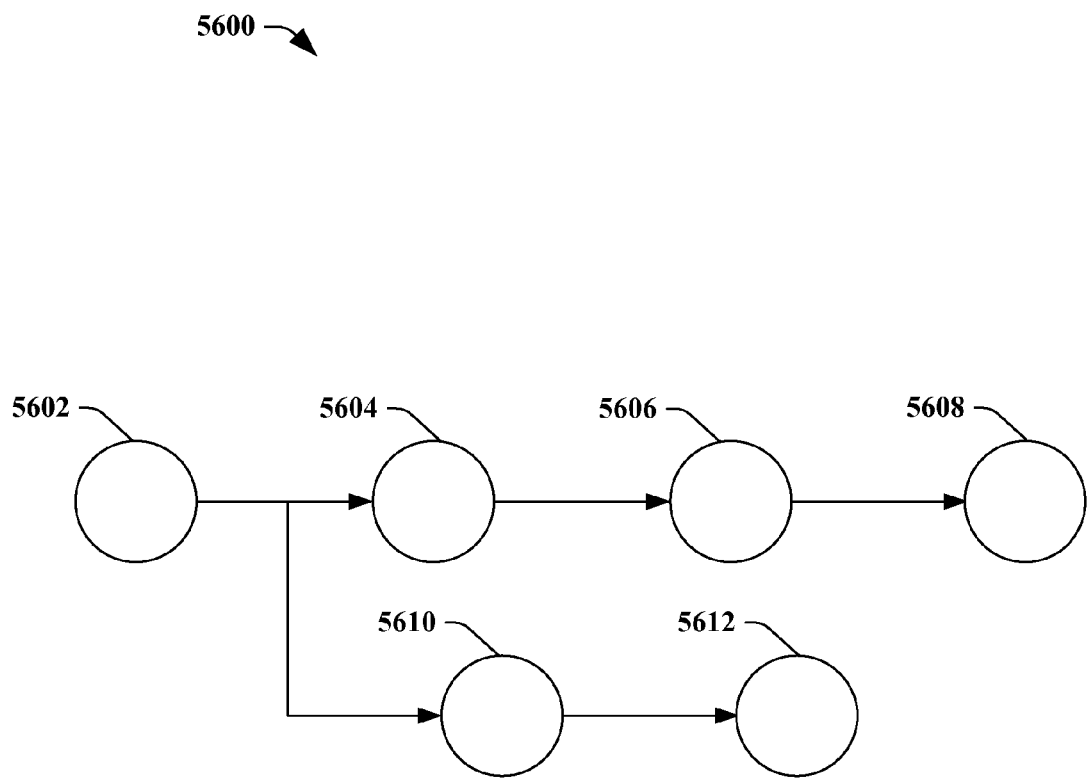
FIG. 56 illustrates a block diagram of an exemplary node structure that facilitates corresponding to a portion of a business rule.

FIG. 56 illustrates an exemplary node structure 5600 that facilitates corresponding to a portion of a business rule. The node structure 5600 can include a first node 5602, a second node 5604, a third node 5606, a fourth node 5608, a fifth node 5610, and a sixth node 5612. It is to be appreciated that the depiction of the node structure 5600 is solely for exemplary purposes and is not to be limiting on the subject innovation. Thus, it is to be understood that there can be any number of nodes, with any number of children and/or parents, and in any organized structure can be implemented. It is to be further understood and appreciated that any of the nodes within the structure 5600 can be a node as described in the figures above (e.g. FIG. 7, FIG. 8, FIG. 9, etc.) such as, but not limited to, a process node, a display node, a purchase node, an interface node, a computation node, a link node, etc. Moreover, the nodes can be user-defined, from a template (pre-defined), and/or any combination thereof. Thus, the combination and/or cluster of the nodes can perform a particular process within the confines of a business rule.

In accordance with the depth-first execution (DFE) approach, the following execution of nodes can be initiated. For the sake of brevity, the characteristics of the nodes will be ignored and the sequence of execution will be focused upon to emphasize the optimized performance of the DFE approach. First, the first node 5602 can be executed and upon completion, the second node 5604 can be executed. Once the node condition for the second node 5604 is complete, the execution continues to the third node 5606. Upon the completion of the third node 5606 condition, the execution continues to the fourth node 5608. Next, there are no other nodes after the fourth node 5608 (e.g., no more parent nodes), so the execution will ascertain any child nodes associated with the previously executed nodes. The node structure 5600 will be evaluated until a child node is determined such as by the following filtering sequence of nodes: first the fourth node 5608 (no child node), then the third node 5606 (no child node), then to the second node 5604 which does have a child. The child node of the second node 5604 is the fifth node 5610 which gets executed next. Lastly, the sixth node 5612 gets executed upon the completion of the fifth node 5610. Once the sixth node 5612 is executed, the node structure will filter back through (from the sixth node 5612 to the fifth node 5610 to the first node 5602) to signify the completion of execution for the node structure 5600.

Such sequence of execution for nodes greatly reduces complexity and makes the solution feasible in relation to the workflow and process based on the elimination of edges associated with a particular business rule and/or business process. Moreover, this sequence of node execution ensures feasibility of extremely complex processes by reducing the complexity of depicting these processes and then optimizing their layout. In general, a node structure will be executed with the following: a pass-through of all parent-nodes in a left-to-right manner. Upon completion to the right-most node, the structure will be passed-through from right-to-left until a child node is found. When the child node is found, the nodes on that particular level will be passed-through in a left-to-right manner and so on and so forth. This sequence can be followed until all nodes (parent and child nodes) are executed to perform the particular process the node structure represents.

Figure 57:
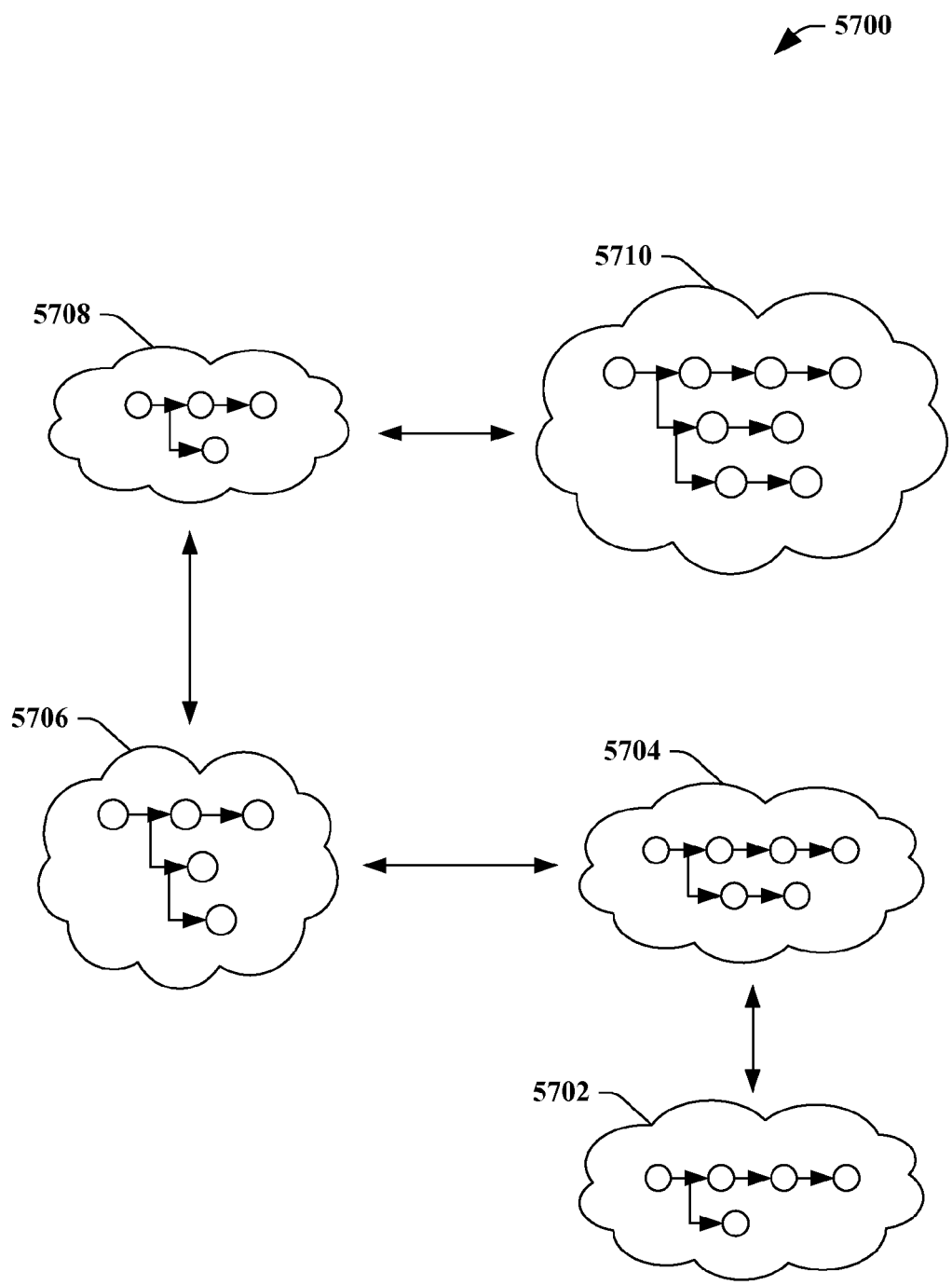
FIG. 57 illustrates a block diagram of an exemplary system that facilitates implementing a web page including various functionalities associated with business rules created utilizing a plurality of grouped node structures.

FIG. 57 illustrates a system 5700 that facilitates implementing a web page including various functionalities associated with business rules created utilizing a plurality of grouped node structures. The system 5700 can include a plurality of node clusters that can perform a specific process and/or functionality associated with a composite application (e.g. a web page, a web site, an HTML document, etc.). For instance, each node cluster can include a disparate node configuration (e.g., structure) and disparate properties (e.g., settings, characteristics), etc. In one example, the paths of the nodes can be modeled within one application, wherein each web page is a node cluster such that an assembly of the nodes can be employed as a web page. In particular this particular example, the node clusters can initiate processes associated with a web page to purchase an item/good.

A node cluster 5702 can relate to a user login process such that the nodes associated therewith provide user identification, a password, approval, denial, aesthetics for the page, etc. Once the login process is complete, a node cluster 5704 can provide an inventory browsing process. Another node cluster 5706 can provide a shopping cart process while another node cluster 5708 can provide a checkout process. Moreover, a node cluster 5710 can provide a confirmation and handling of an order process. It is to be appreciated that the node clusters can be strung together and/or overlay one another to provide interaction and seamless integration.

Figure 58:
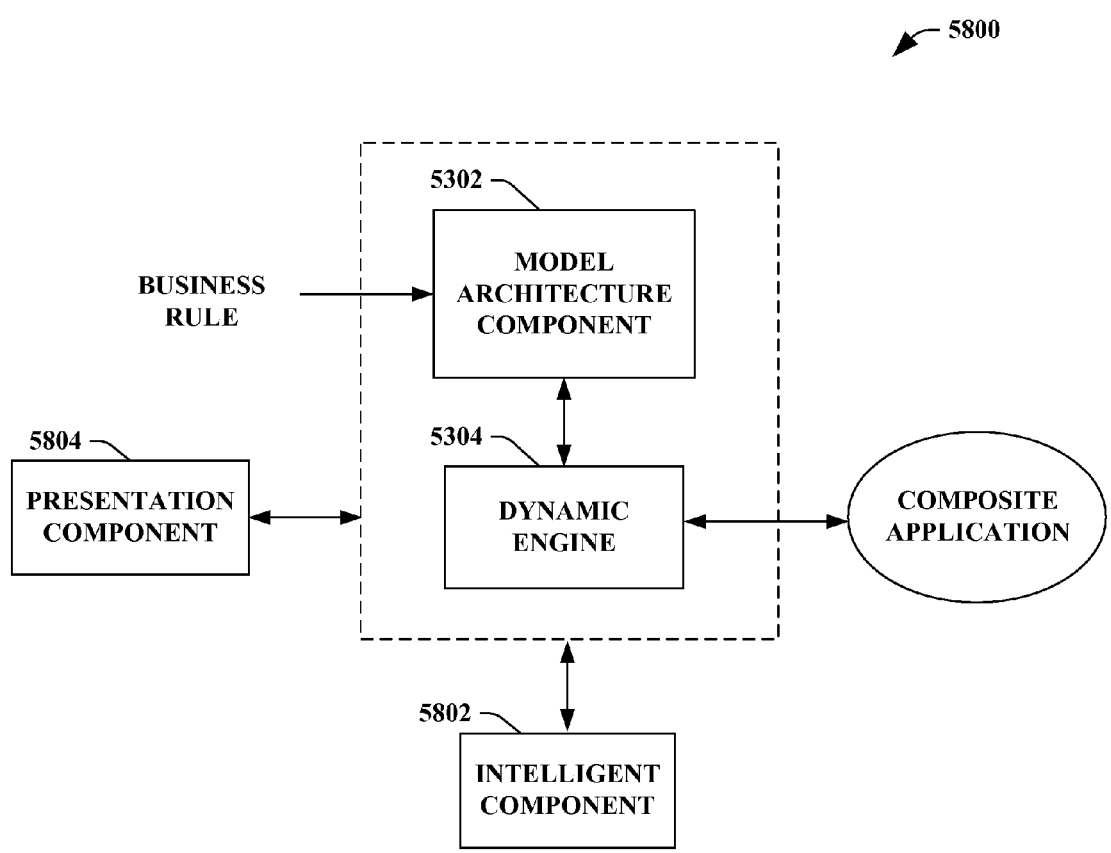
FIG. 58 illustrates a block diagram of an exemplary system that facilitates automatically generating a composite application based on a business rule utilizing a hierarchically structured architecture to optimize process flow.

FIG. 58 illustrates a system 5800 that employs intelligence to facilitate automatically generating a composite application based on a business rule utilizing a hierarchically structured architecture to optimize process flow. The system 5800 can include the model architecture component 5302, the dynamic engine 5304, and the composite application. It is to be appreciated that the model architecture component 5302, the dynamic engine 5304, and the composite application can be substantially similar to respective components, engines, and composite applications described in previous figures. The system 5800 further includes an intelligent component 5802. The intelligent component 5802 can be utilized by the model architecture component 5302 and/or the dynamic engine 5304 to facilitate representing a business rule with at least one node to automatically generate a dynamic composite application. For example, the intelligent component 5802 can infer a business rule, a business rule representation, a node structure, a node representation of a business rule, node clustering, composite application aesthetics, use preferences, settings, configurations, composite application workflow, dynamic updates, node settings, node configuration, pre-defined nodes, node functionality, templates, user-definition tendencies, etc.

It is to be understood that the intelligent component 5802 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g. naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The model architecture component 5302 and/or the dynamic engine 5304 can further utilize a presentation component 5804 that provides various types of user interfaces to facilitate interaction between a user and any component coupled to the model architecture component 5302 and/or the dynamic engine 5304. As depicted, the presentation component 5804 is a separate entity that can be utilized with the model architecture component 5302 and/or the dynamic engine 5304. However, it is to be appreciated that the presentation component 5804 and/or similar view components can be incorporated into the model architecture component 5302 and/or the dynamic engine 5304 and/or a stand-alone unit. The presentation component 5804 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the model architecture component 5302 and/or the dynamic engine 5304.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 59:
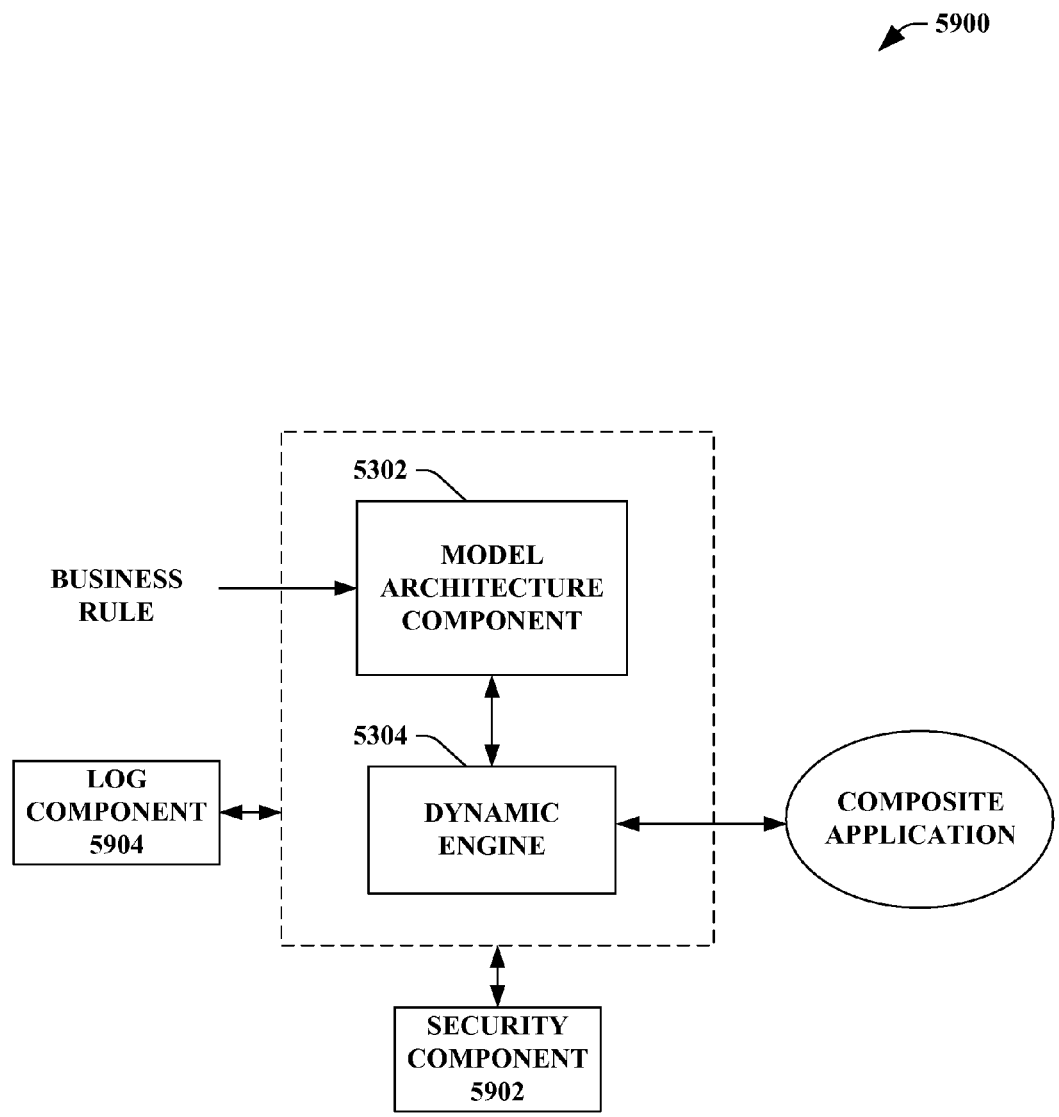
FIG. 59 illustrates a block diagram of an exemplary system that facilitates employing a dynamic complex application accessible via a plurality of devices based on a business rule represented by a collection of node structures.

FIG. 59 illustrates a system 5900 that facilitates employing a dynamic complex application accessible via a plurality of devices based on a business rule represented by a collection of node structures. The system 5900 can include a security component 5902 that can ascertain which operations related thereto a user is authorized to manipulate and/or execute. In accordance with one example, a user may only be authorized to perform a certain operation on the composite application, while not authorized to initiate a disparate operation on the composite application. In addition, the user may be able to manipulate a nodes associated with the composite application, while not authorized to manipulate a disparate node associated with the composite application. The security component 5902 can determine identity of a user by analyzing, for instance, usernames, passwords, personal identification numbers, personal status, management positions, occupation hierarchy, and the like. Furthermore, the security component 5902 can determine a user's identity by analyzing biometric indicia, such as voice recognition, fingerprint analysis, retina analysis, etc.

Still further, the security component 5902 can perform granular security with respect to a user, a node, a node characteristic, a node cluster, a process, a business rule, and/or a composite application. Pursuant to one example, a user's rights with respect to a particular composite application and/or node can change as time alters. For instance, certain operations associated with composite application performed by a user can be allowable by the user during a first shift but not allowable to the user during a second shift. Additionally, the security component 5902 can provide different measures of security given different states of an operation and/or composite application. Therefore, for example, a user may have rights with respect to performing an operation in a first state but may have different rights with respect to the same operation in a second state.

The system 5900 can further include a log component 5904 that can work in conjunction with the model architecture 5302, the dynamic engine 5304, the security component 5902, and/or any combination thereof in order to track any data related to the system 5900. For instance, the log component 5904 can track and/or record data related to the operations performed, updates to the composite application, node alterations, nodes created, node cluster alteration, composite application alterations, aesthetic changes, functionality changes, etc. Moreover, the log component 5904 can track various user data in connection with any security and/or authorization utilized with the system 5900. In such a case, the log component 5904 can track which particular user manipulated a composite application.

Figure 60:
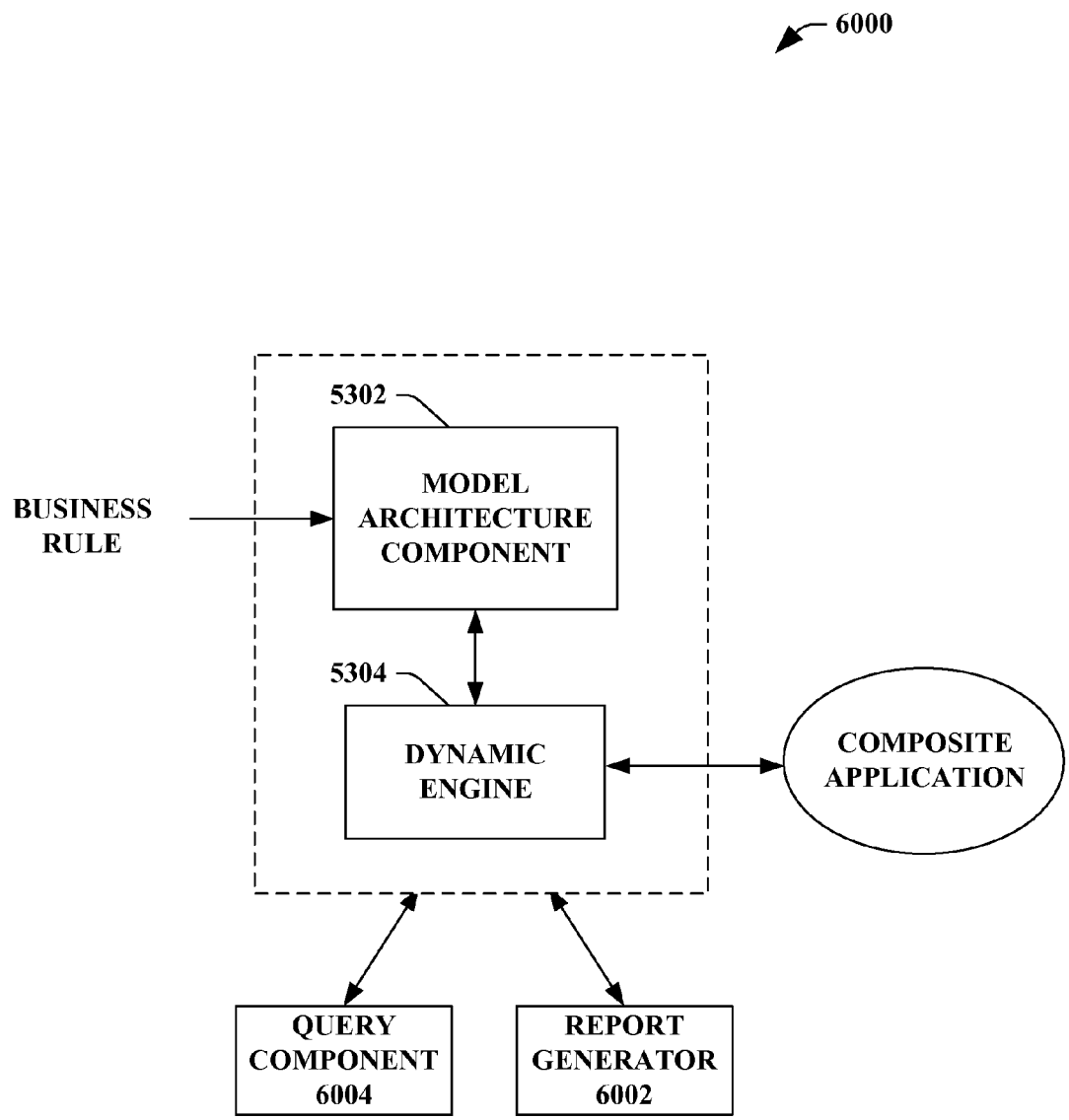
FIG. 60 illustrates a block diagram of an exemplary system that facilitates employing a dynamic complex application accessible via a plurality of devices based on a business rule represented by a collection of node structures.

FIG. 60 illustrates a system 6000 employing a dynamic complex application accessible via a plurality of devices based on a business rule represented by a collection of node structures. The system 6000 can include a report generator 6002 that can generate at least one report in accordance with the composite application. For instance, a report can be generated to include various data related to the composite application, nodes, node clusters, business rules, a log component (discussed supra), etc. In addition, the report can be generated and then distributed to various entities, targets, users, developers, testers, systems, components, databases, etc. (discussed supra).

Moreover, the system 6000 can include a query component 6004 that allows the querying of such data stored and/or logged, and data reported. In other words, the query component 410 can allow a user to search any data associated with the system 6000. In particular, a specific node can be found in order to utilize to represent a portion of a business rule to automatically create a composite application. Moreover, an entire composite application can be queried to examine and/or find various nodes and/or node clusters associated therewith. In still another example, the reports generated by the report generator 6002 can be queried to ascertain specific data related to the system 6000.

Figure 61:
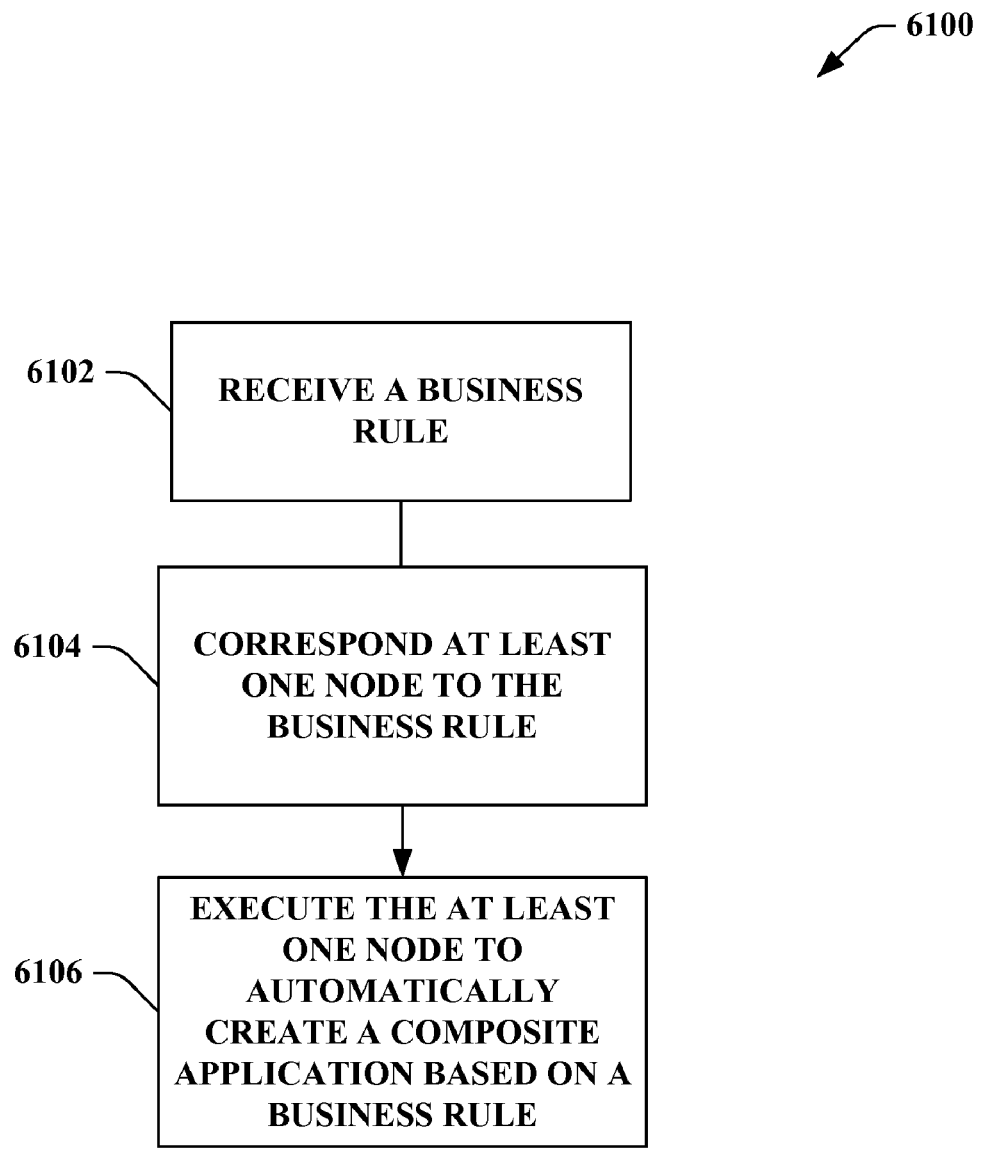
FIG. 61 illustrates a block diagram of an exemplary methodology that facilitates automatically generating a composite application based on a business rule utilizing a hierarchically structured architecture to optimize process flow.
Figure 62:
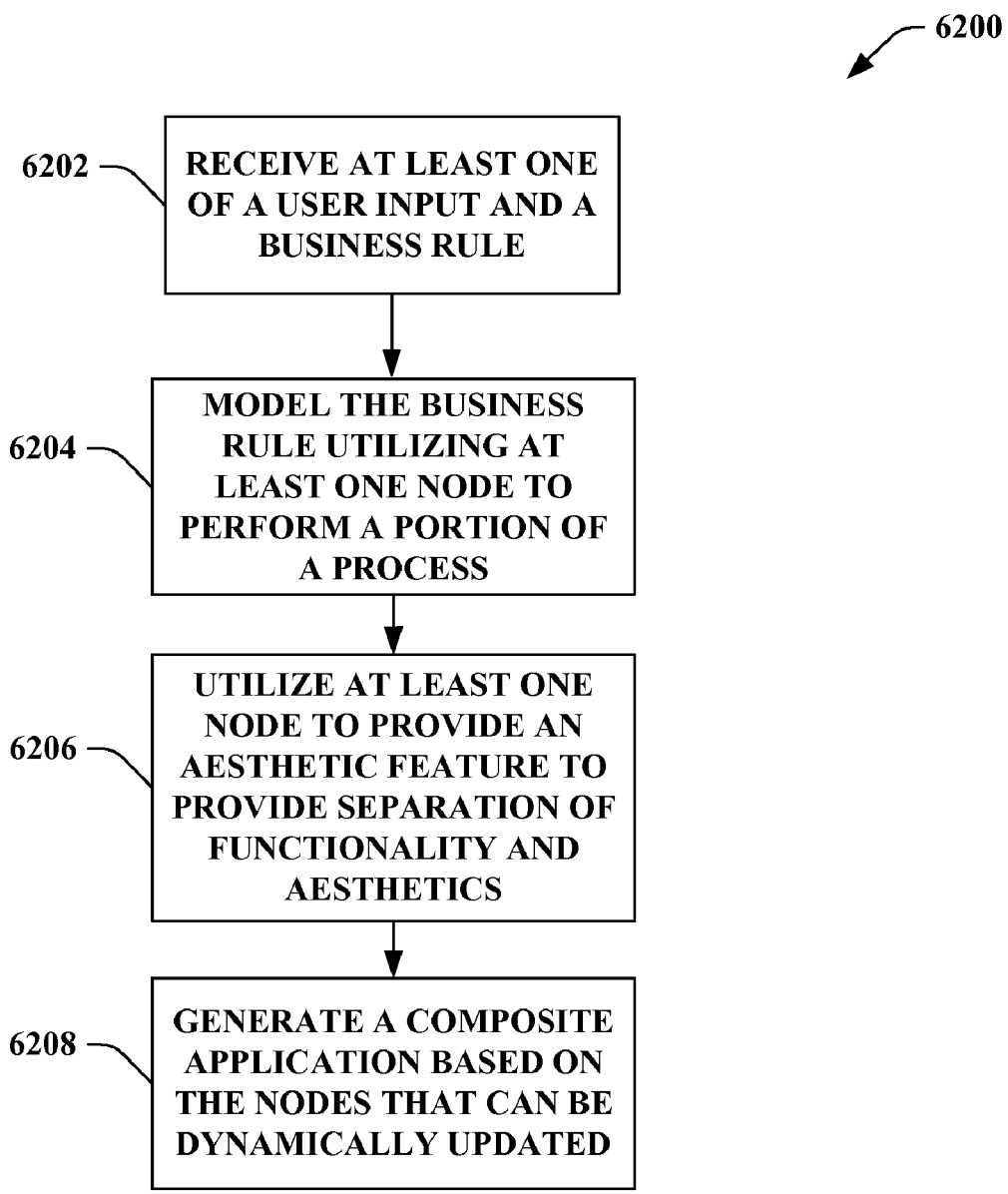
FIG. 62 illustrates a block diagram of an exemplary methodology for employing a dynamic complex application accessible via a plurality of devices based on a business rule represented by a collection of node structures.

FIGS. 61-62 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 61 illustrates a methodology 6100 that facilitates automatically generating a composite application based on a business rule utilizing a hierarchically structured architecture to optimize process flow. At reference numeral 6102, a business rule can be received. The business rule can be a user input, received via an electronic transmission (e.g., from a data base, from a computer, from a machine, and the like). Moreover, the business rule can dictate a business workflow and/or correlate to a workflow for a particular composite application. For example, a business rule can be, but is not limited to, "If no response from supplier, then analyze previous response and if response rate is >95% then allow 8 more hours."

At reference numeral 6104, at least one node can correspond to the business rule in order to represent the business rule. In particular, a node can correspond to at least a portion of functionality, wherein a group of nodes can be assembled and/or clustered together in order to perform a particular process associated with the business rule(s). For instance, the node can be, but is not limited to being, a process node, a display node, a purchase node, an interface node, a computation node, a link node, any node capable of representing a portion of a business rule, etc. Furthermore, it is to be appreciated and understood that the corresponding node can be ascertained by a user, a machine based on analysis, and/or any combination thereof.

At reference numeral 6106, the at least one node that corresponds to the business rule can be executed to automatically create a composite application, wherein the application's control flow is dictated by the business rule(s). It is to be appreciated that the clustering of nodes can formulate the business rule while providing a visual layout of the workflow and/or composite application. In addition, the created clustering of nodes can perform a process, wherein a plurality of processes can be strung together in order to automatically create a complex and/or composite application (e.g., business applications, a web page, a document, an electronic mail message, an electronic document, a hypertext markup language (HTML) document, a complex interactive web site, etc.). Additionally, it is to be appreciated that the business rule can be represented with at least one node by a user, automatically based on machine analysis, and/or any combination thereof. In other words, the complex application can be created by utilizing various nodes that can be grouped to perform specific processes, wherein the collection of groups can employ the particular functionality (and having various aesthetics) within the boundaries of the business rule(s).

FIG. 62 illustrates a methodology 6200 for employing a dynamic complex application accessible via a plurality of devices based on a business rule represented by a collection of node structures. At reference numeral 6202, at least one of a user input and a business rule can be received. The user input can be, for example, a node selection, a node upload, a business rule, a portion of a business rule, etc. At reference numeral 6204, the business rule can be modeled utilizing at least one node to perform a portion of a process. For example, a user can select particular nodes to correlate and represent a business rule and/or create a business rule. In another example, a plurality of nodes can be clustered in order to initiate a particular process, wherein a plurality of processes can be associated to implement a composite application. In another example, a business rule can be received and automatically represented with at least one node. The key concepts can be event-based coupling of processes (e.g., events can be generated by processes or external systems and these events trigger rules that can initiate one or more processes).

At reference numeral 6206, at least one node can be utilized to provide an aesthetic feature to provide a separation of functionality and aesthetics. Specifically, a collection of UI nodes can be utilized wherein each node can include characteristics and settings that can be selected based upon a user preference, company preference, and the like. In other words, there are nodes associated with functionality and disparate nodes that relate to user interfaces and other aesthetics such that a composite application can distinctly separate functionality and aesthetics. However, it is to be appreciated that the functionality is at the core of automatically creating the composite application (e.g. web page),while the aesthetics can be various "skins" applied therewith. At reference numeral 6208, a composite application based on the nodes can be generated and dynamically updated in real-time.

For instance, a first company can create a web page based on a particular business rule and have a first set of aesthetic features associated therewith (e.g., user interface colors, graphics, pull-down menus, open-field text boxes, etc.). Yet, a second company can create a web page based on the same particular business rule and a have a second set of aesthetic features completely disparate in comparison to the first company. In other words, the functionality of the web page can be substantially similar based on the employment of a comparable business rule (represented by at least one node), yet the node structure and properties can be manipulated to provide a specific look and/or feel to the particular company, user, client, and the like.

Figure 63:
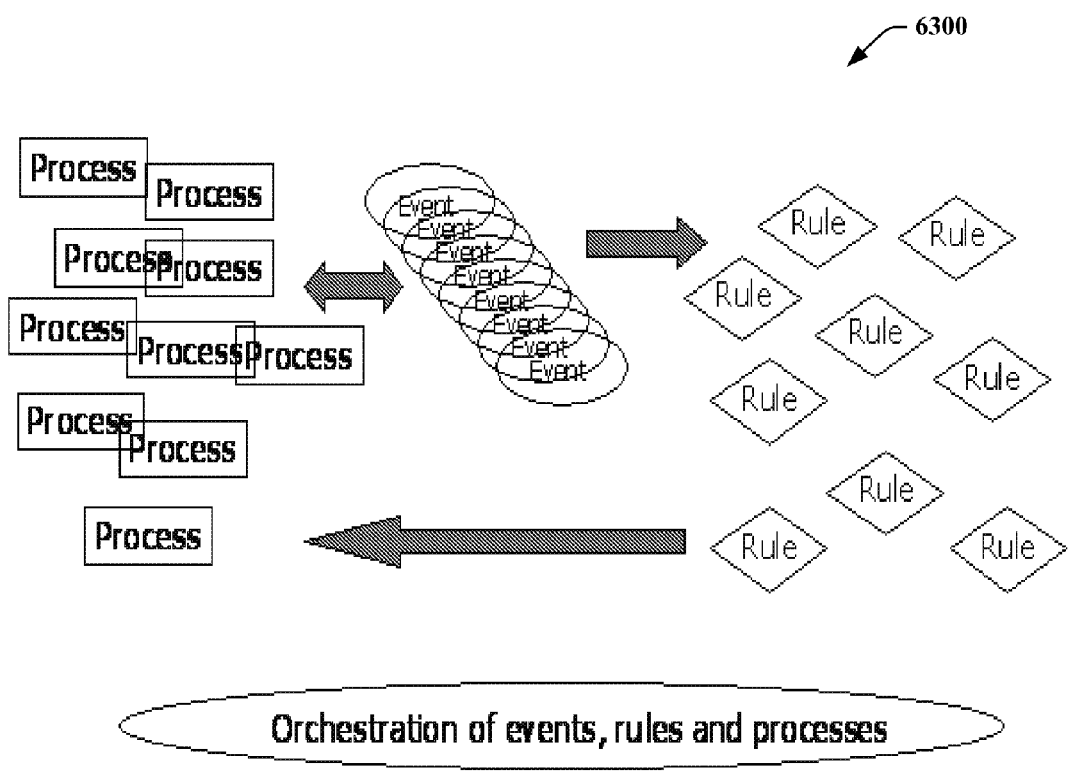
FIG. 63 illustrates a block diagram of structure of elements in accordance with the claimed subject matter.

FIG. 63 illustrates a structure of elements 6300 in accordance with the claimed subject matter. The structure of elements 6300 can represent the structure of execution elements in the system described supra. Processes can represent the bulk of the functional logic of a website/application including, but not limited to, application logic, user and external application interfaces, other application processing, etc. Events can represent asynchronous situations such as a message arriving from an external system or application, a process generated event and/or a time of day event. Rules can be user-defined logic elements that generally contain simple to complex conditional constructs that can trigger one or more processes. The process controller (e.g., model architecture component and/or dynamic engine as discussed supra) can orchestrate the processing of events, the execution of rules and processes as a set of asynchronous elements that execute to support a long-running process.

Figure 64:
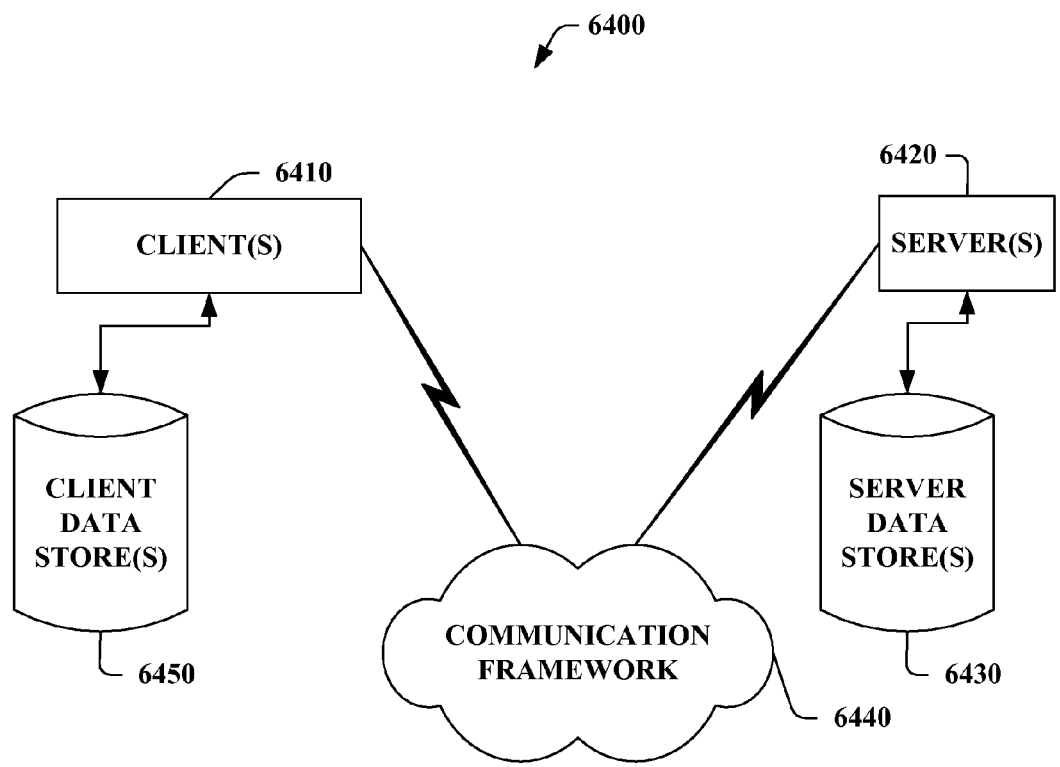
FIG. 64 illustrates an exemplary networking environment, wherein the novel aspects of the claimed subject matter can be employed.
Figure 65:
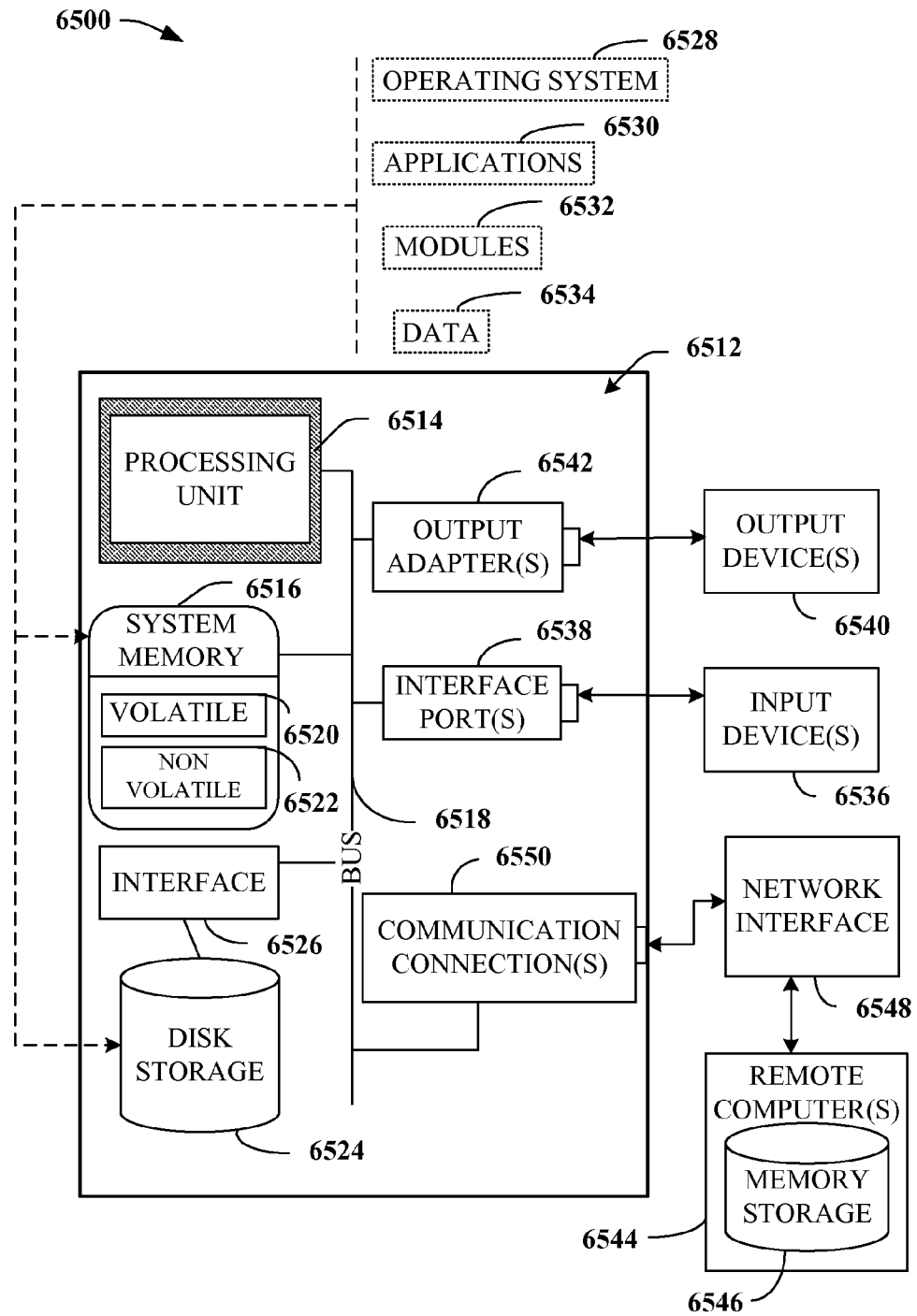
FIG. 65 illustrates an exemplary operating environment that can be employed in accordance with the claimed subject matter.

In order to provide additional context for implementing various aspects of the claimed subject matter, FIGS. 64-65 and the following discussion is intended to provide a brief, general description of a suitable computing environment in which the various aspects of the subject innovation may be implemented. For example, a model architecture component that can represent a business rule with at least one node in order to automatically create a composite application that separates workflow and aesthetics associated therewith. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 64 is a schematic block diagram of a sample-computing environment 6400 with which the claimed subject matter can interact. The system 6400 includes one or more client(s) 6410. The client(s) 6410 can be hardware and/or software (e.g., threads, processes, computing devices). The system 6400 also includes one or more server(s) 6420. The server(s) 6420 can be hardware and/or software (e.g., threads, processes, computing devices). The servers 6420 can house threads to perform transformations by employing the subject innovation, for example.

One possible communication between a client 6410 and a server 6420 can be in the form of a data packet adapted to be transmitted between two or more computer processes. The system 6400 includes a communication framework 6440 that can be employed to facilitate communications between the client(s) 6410 and the server(s) 6420. The client(s) 6410 are operably connected to one or more client data store(s) 6450 that can be employed to store information local to the client(s) 6410. Similarly, the server(s) 6420 are operably connected to one or more server data store(s) 6430 that can be employed to store information local to the servers 6420.

With reference to FIG. 65, an exemplary environment 6500 for implementing various aspects of the claimed subject matter includes a computer 6512. The computer 6512 includes a processing unit 6514, a system memory 6516, and a system bus 6518. The system bus 6518 couples system components including, but not limited to, the system memory 6516 to the processing unit 6514. The processing unit 6514 can be any of various available processors. Dual microprocessors and other multiprocessor architectures also can be employed as the processing unit 6514.

The system bus 6518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 6516 includes volatile memory 6520 and nonvolatile memory 6522. The basic input/output system (BIOS), containing the basic routines to transfer information between elements within the computer 6512, such as during start-up, is stored in nonvolatile memory 6522. By way of illustration, and not limitation, nonvolatile memory 6522 can include read only memory (ROM), programmable ROM (PROM), electrically programmable ROM (EPROM), electrically erasable programmable ROM (EEPROM), or flash memory. Volatile memory 6520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 6512 also includes removable/non-removable, volatile/non-volatile computer storage media. FIG. 65 illustrates, for example a disk storage 6524. Disk storage 6524 includes, but is not limited to, devices like a magnetic disk drive, floppy disk drive, tape drive, Jaz drive, Zip drive, LS-100 drive, flash memory card, or memory stick. In addition, disk storage 6524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 6524 to the system bus 6518, a removable or non-removable interface is typically used such as interface 6526.

It is to be appreciated that FIG. 65 describes software that acts as an intermediary between users and the basic computer resources described in the suitable operating environment 6500. Such software includes an operating system 6528. Operating system 6528, which can be stored on disk storage 6524, acts to control and allocate resources of the computer system 6512. System applications 6530 take advantage of the management of resources by operating system 6528 through program modules 6532 and program data 6534 stored either in system memory 6516 or on disk storage 6524. It is to be appreciated that the claimed subject matter can be implemented with various operating systems or combinations of operating systems.

A user enters commands or information into the computer 6512 through input device(s) 6536. Input devices 6536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 6514 through the system bus 6518 via interface port(s) 6538. Interface port(s) 6538 include, for example, a serial port, a parallel port, a game port, and a universal serial bus (USB). Output device(s) 6540 use some of the same type of ports as input device(s) 6536. Thus, for example, a USB port may be used to provide input to computer 6512, and to output information from computer 6512 to an output device 6540. Output adapter 6542 is provided to illustrate that there are some output devices 6540 like monitors, speakers, and printers, among other output devices 6540, which require special adapters. The output adapters 6542 include, by way of illustration and not limitation, video and sound cards that provide a means of connection between the output device 6540 and the system bus 6518. It should be noted that other devices and/or systems of devices provide both input and output capabilities such as remote computer(s) 6544.

Computer 6512 can operate in a networked environment using logical connections to one or more remote computers, such as remote computer(s) 6544. The remote computer(s) 6544 can be a personal computer, a server, a router, a network PC, a workstation, a microprocessor based appliance, a peer device or other common network node and the like, and typically includes many or all of the elements described relative to computer 6512. For purposes of brevity, only a memory storage device 6546 is illustrated with remote computer(s) 6544. Remote computer(s) 6544 is logically connected to computer 6512 through a network interface 6548 and then physically connected via communication connection 6550. Network interface 6548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 6550 refers to the hardware/software employed to connect the network interface 6548 to the bus 6518. While communication connection 6550 is shown for illustrative clarity inside computer 6512, it can also be external to computer 6512. The hardware/software necessary for connection to the network interface 6548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates creating a composite application, comprising:
    a memory that stores computer-executable components including:
        an interface component that receives data related to a business rule that represents at least one functionality of the composite application and receives data related to at least one aesthetic feature of the composite application;
        an intelligent component that utilizes a classification scheme employing a probabilistic and/or statistical-based analysis to infer states concerning the system, an environment, or a user from a set of observations as captured via events and/or data wherein inference results in the construction of new events or actions from a set observed events and/or stored event data;
        a model architecture component, comprising:
            a business rule component that analyzes the data related to the business rule and the states concerning the system, the environment, or the user and represents the business rule with a first node structure in a hierarchical structure that initiates the at least one functionality, wherein the first node structure represents a first application logic and comprises parameters and properties that are changed based at least in part on the business rule; and
            an aesthetics component that analyzes the data related to the at least one aesthetic feature and the states concerning the system, the environment, or the user and defines the at least one aesthetic feature of the composite application with a second node structure of the hierarchical structure wherein the second node represents a second logic;
            a dynamic engine that executes the first application logic of the first node structure and the second application logic of the second node structure according to a depth first execution (DFE) approach, and creates the composite application; and
    a processor that facilitates execution of at least one of the computer-executable components.

2. The system of claim 1, further comprising a data store that stores at least one of the following: a template of nodes, a node, a node property, a template representing a particular process comprising at least one node, a business rule, a node structure that correlates to a business rule, a pallet of nodes that can be strung together to create a process, a pre-defined node, a particular functionality employed by at least one node, a user-defined node, a model architecture, a depth first execution (DFE) approach, an execution flow of a hierarchical node structure, a user interface, a visual layout of a node pallet, a user interface to employ creation of a composite application utilizing a node pallet, a node execution sequence, or a node execution rule.

3. The system of claim 1, the composite application interacts with at least one of a mobile communication device, a computer, a machine, a laptop, a tablet pc, a pocket pc, a portable digital assistant (PDA), a document, an electronic document, or an electronic mail message.

4. The system of claim 1, the data related to the business rule further represents at least one process of the composite application.

5. The system of claim 1, the second node structure defines at least one aesthetic feature of a user interface of the composite application.

6. The system of claim 1, the aesthetic feature data relates to one of a plurality of "skins" that manipulate at least one of a look, a feel, or an appearance of the composite application.

7. The system of claim 1, the first node structure comprises at least one of a third node structure representing a composite application function, a fourth node structure representing a process associated with the composite application, a fifth node structure representing a login process, a sixth node structure representing an inventory browsing process, a seventh node structure representing a shopping cart process, an eighth node structure representing a check-out process, or a ninth node structure representing a confirmation process.

8. The system of claim 1, further comprising a security component that determines an authorization related to at least one user with respect to the composite application.

9. The system of claim 1, further comprising a report generator that generates at least one report in accordance with the composite application.

10. The system of claim 1, wherein the composite application is a web page, a complex interactive website, or a website.

11. A method that facilitates automatically generating a complex application, comprising:
  employing a processor to execute computer executable instructions stored on a computer readable storage medium to implement the following:
  receiving a business rule that defines a plurality of functionalities of the complex application;
  inferring one or more states concerning a system, an environment or a user from a set of observations as captured via events and/or data wherein inference results in the construction of new events or actions from a set observed events and/or stored event data utilizing a classification scheme employing a probabilistic and/or statistical-based analysis;
  representing the business rule with a first node cluster in a hierarchical structure, wherein the first node cluster comprises a plurality of nodes corresponding to the plurality of functionalities, and wherein the first node cluster represents a first application logic and comprises parameters and properties that are changed based at least in part on the business rule and at least one of the one or more states; receiving at least one aesthetic feature;
  representing the at least one aesthetic feature with a second node cluster in the hierarchical structure disparate from the first node cluster based on at least one of the one or more states;
  creating the complex application by executing the first node cluster and the second node cluster according to a depth first execution (DFE) approach; and
  dynamically updating the complex application.

12. The method of claim 11, further comprising:
  receiving a user input to define the business rule; and
  receiving a user input to define the at least one aesthetic feature.

13. A method for creating a composite application, comprising:
  employing a processor to execute computer executable instructions stored on a computer readable storage medium to implement the following:
  receiving data related to a business rule relating to a functionality of the composite application;
  employing a classification scheme employing a probabilistic and/or statistical-based analysis to infer states concerning the system, an environment, or a user from a set of observations as captured via events and/or data wherein inference results in the construction of new events or actions from a set observed events and/or stored event data;
  providing a first node structure in a hierarchical structure correlating to the data related to the business rule, wherein the node structure initiates the functionality of the composite application, wherein the first node structure represents a first application logic and comprises parameters and properties that are changed based at least in part on the business rule and the state;
  receiving data related to an aesthetic feature of the composite application;
  providing a second node structure in the hierarchical structure correlating to the data related to the aesthetic feature, wherein the second node structure is disparate from the first node structure and where the second node represents a second logic;
  executing the first node structure and the second node structure according to a depth first execution (DFE) approach; and
  creating the composite application.

14. The method of claim 13, wherein the act of providing the second node structure further comprises providing a plurality of nodes corresponding to a plurality of aesthetic features.

15. The method of claim 13, wherein the act of providing the second node structure further comprises providing the second node structure corresponding to a "skin" for the composite application.

16. The method of claim 13, further comprising changing the functionality of the composite application by modifying at least one node from the first node structure according to a business rule.

17. The method of claim 13, wherein the act of creating further comprises creating a web page based on the business rule and the aesthetic feature.

* * * * *